United States Patent
Ruedinger et al.

(10) Patent No.: US 6,374,548 B1
(45) Date of Patent: Apr. 23, 2002

(54) COLUMN-BASED WORKSPACE DEFINITION SYSTEM

(75) Inventors: Patricia D. Ruedinger, Grand Haven; Michael W. Eastman, West Olive, both of MI (US)

(73) Assignee: Trendway Corporation, Holland, MI (US)

( * ) Notice: Subject to any disclaimer, the term of this patent is extended or adjusted under 35 U.S.C. 154(b) by 0 days.

(21) Appl. No.: 09/325,437

(22) Filed: Jun. 3, 1999

Related U.S. Application Data

(60) Provisional application No. 60/088,069, filed on Jun. 5, 1998, and provisional application No. 60/127,083, filed on Mar. 31, 1999.

(51) Int. Cl.[7] ............................................. A47F 10/00
(52) U.S. Cl. .................... 52/36.1; 52/732.1; 52/736.3
(58) Field of Search ............................. 52/36.1, 36.2, 52/731.1, 732.1, 732.3, 239, 220.7, 736.3, 737.4, 738.1; 74/48, 49, 50; 312/223.5, 223.6, 223.3; 108/50.02, 23; 403/292, 294

(56) References Cited

U.S. PATENT DOCUMENTS

| | | | |
|---|---|---|---|
| 3,559,813 A | 2/1971 | Sosinski | |
| 3,698,104 A | 10/1972 | Stutton | |
| 4,133,153 A | * 1/1979 | Hage | ........................ 52/220.7 |
| 4,224,769 A | 9/1980 | Ball et al. | |
| 4,265,502 A | 5/1981 | Blodee et al. | |
| 4,404,776 A | 9/1983 | Ball et al. | |
| 4,551,792 A | * 11/1985 | Hoke et al. | |
| 4,625,633 A | 12/1986 | Martin | |
| 4,634,212 A | 1/1987 | Boundy et al. | |
| 4,771,583 A | 9/1988 | Ball et al. | |
| 4,793,111 A | * 12/1988 | Shewchuk | ............. 52/732.3 X |
| 4,831,791 A | 5/1989 | Ball | |
| 5,015,203 A | 5/1991 | Furrow | |
| 5,031,371 A | 7/1991 | Davister | |
| 5,044,135 A | 9/1991 | Kroon et al. | |
| 5,065,556 A | * 11/1991 | DeLong et al. | ............ 52/220.7 |
| 5,106,173 A | 4/1992 | Kelley et al. | |
| 5,116,235 A | 5/1992 | Nienhuis et al. | |
| 5,150,554 A | * 9/1992 | Quinlan, Jr. et al. | ... 52/220.7 X |
| 5,155,955 A | 10/1992 | Ball et al. | |
| 5,158,472 A | 10/1992 | Juhlin | |
| 5,178,555 A | 1/1993 | Kilpatrick et al. | |
| 5,209,035 A | 5/1993 | Hodges et al. | |
| 5,252,086 A | 10/1993 | Russell et al. | |
| 5,277,609 A | 1/1994 | Ondrejka | |
| 5,423,605 A | * 6/1995 | Liu | ........................ 312/256.6 |
| 5,547,272 A | * 8/1996 | Paterson et al. | ...... 312/265.6 X |
| 5,562,469 A | 10/1996 | Nienhuis et al. | |
| 5,606,919 A | * 3/1997 | Fox et al. | ................. 108/50.02 |
| 5,626,404 A | 5/1997 | Kelley et al. | |
| 5,724,778 A | 3/1998 | Cornell et al. | |
| 5,765,932 A | 6/1998 | Domina et al. | |
| 5,768,840 A | 6/1998 | Feldpausch et al. | |
| 5,784,843 A | 7/1998 | Greer et al. | |
| 5,794,392 A | 8/1998 | Forslund, III et al. | |
| 5,809,708 A | 9/1998 | Greer et al. | |
| 5,813,177 A | 9/1998 | Wu | |
| 5,816,001 A | 10/1998 | Goodman et al. | |
| 5,822,935 A | 10/1998 | Mitchell et al. | |
| 5,826,385 A | 10/1998 | Dykstra et al. | |
| 5,836,121 A | 11/1998 | Hofman | |

(List continued on next page.)

*Primary Examiner*—Peter M. Cuomo
*Assistant Examiner*—Gerald A. Anderson
(74) *Attorney, Agent, or Firm*—Rader, Fishman, Grauer & McGarry, an Office of Rader, Fishman & Grauer PLLC

(57) ABSTRACT

A workspace definition system is provided which comprises a plurality of columns having a hollow interior, a plurality of overhead beam assemblies having at least one internal channel, each overhead beam assembly mounted between the columns. Several intermediate beam assemblies also having an internal channel can be provided between some of the columns as well. The internal channel of each of the beams communicates with the hollow interior of the plurality of columns for uninterrupted passage of electrical/data conduit therethrough.

172 Claims, 27 Drawing Sheets

U.S. PATENT DOCUMENTS

| | | | |
|---|---|---|---|
| 5,839,239 A | * 11/1998 | Jang | 52/123.1 |
| 5,867,955 A | 2/1999 | Russell | |
| D407,501 S | 3/1999 | Shipman et al. | |
| 5,886,295 A | 3/1999 | Carino et al. | |
| D407,587 S | 4/1999 | Grabowski | |
| D408,355 S | 4/1999 | Welsh et al. | |
| 5,890,325 A | 4/1999 | Corcorran et al. | |
| 5,893,616 A | 4/1999 | MacDonald et al. | |
| 5,896,710 A | * 4/1999 | Hoyle | 52/36.1 |
| D409,419 S | 5/1999 | Wilkinson | |
| 5,899,025 A | 5/1999 | Casey et al. | |
| 5,899,035 A | 5/1999 | Waalkes et al. | |
| 5,899,036 A | 5/1999 | Seiber et al. | |
| 5,906,079 A | 5/1999 | Brickner et al. | |
| 5,907,285 A | 5/1999 | Toms et al. | |
| 5,918,432 A | * 7/1999 | Mahone et al. | 52/220.2 |
| 5,934,204 A | 8/1999 | Oberle | |
| 5,943,834 A | 8/1999 | Jeffers et al. | |
| 5,947,569 A | 9/1999 | Rheault et al. | |
| 5,950,371 A | 9/1999 | Rives et al. | |
| 5,950,386 A | 9/1999 | Shipman et al. | |
| 5,970,662 A | 10/1999 | Corcorran et al. | |
| D415,901 S | 11/1999 | Arko et al. | |
| 6,017,228 A | * 6/2000 | Verbeek et al. | 174/49 X |

* cited by examiner

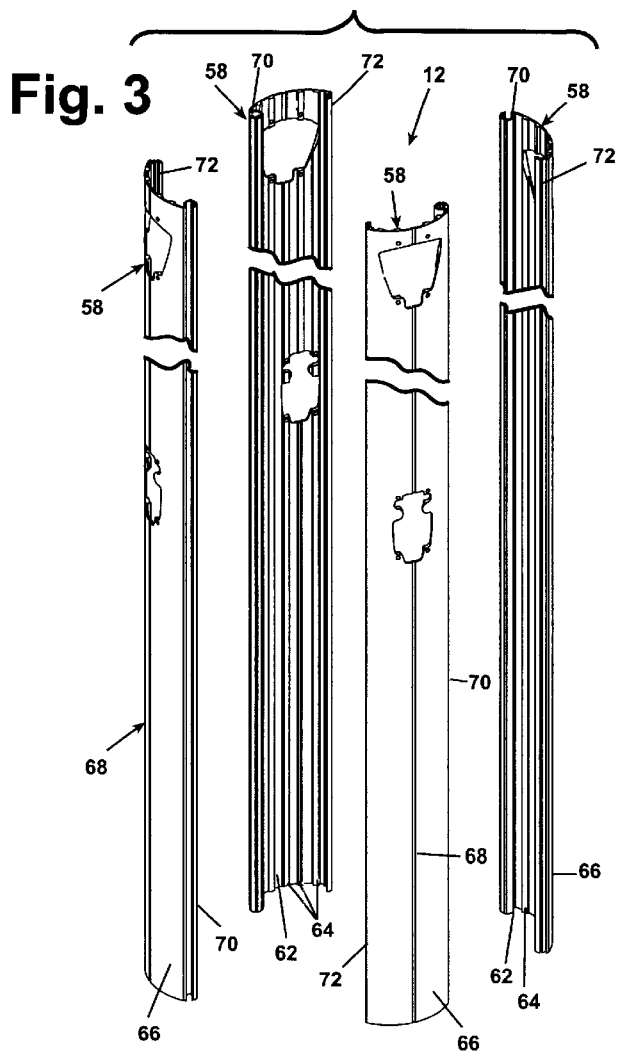
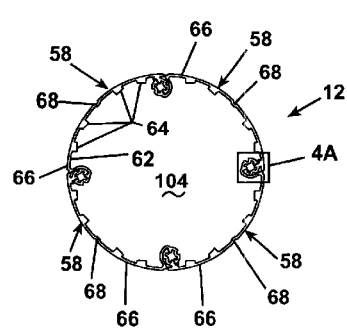
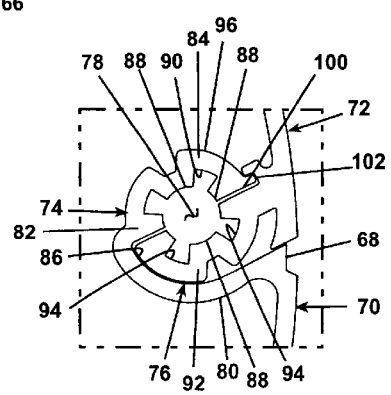
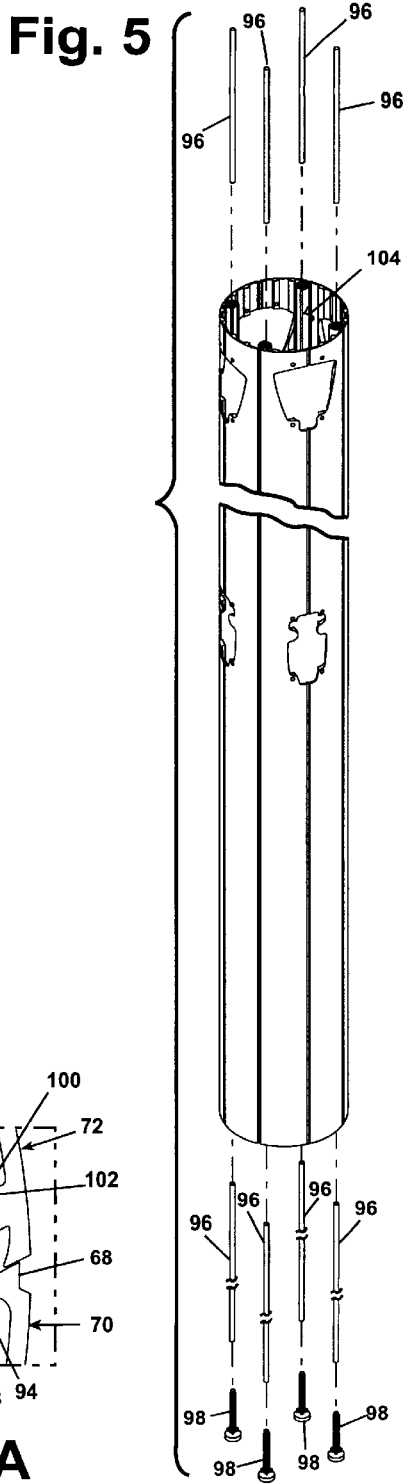
Fig. 3
Fig. 4
Fig. 4A
Fig. 5

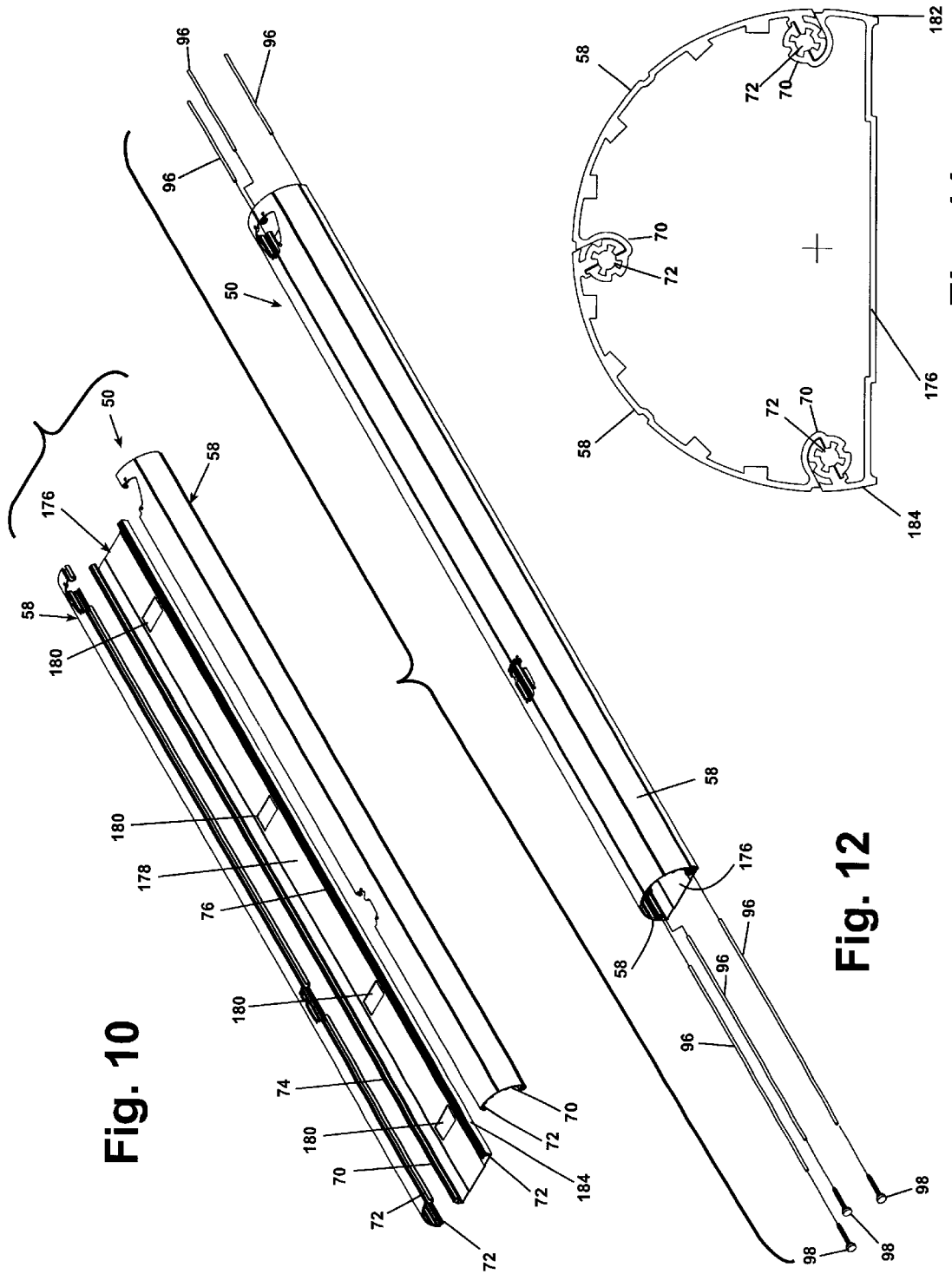

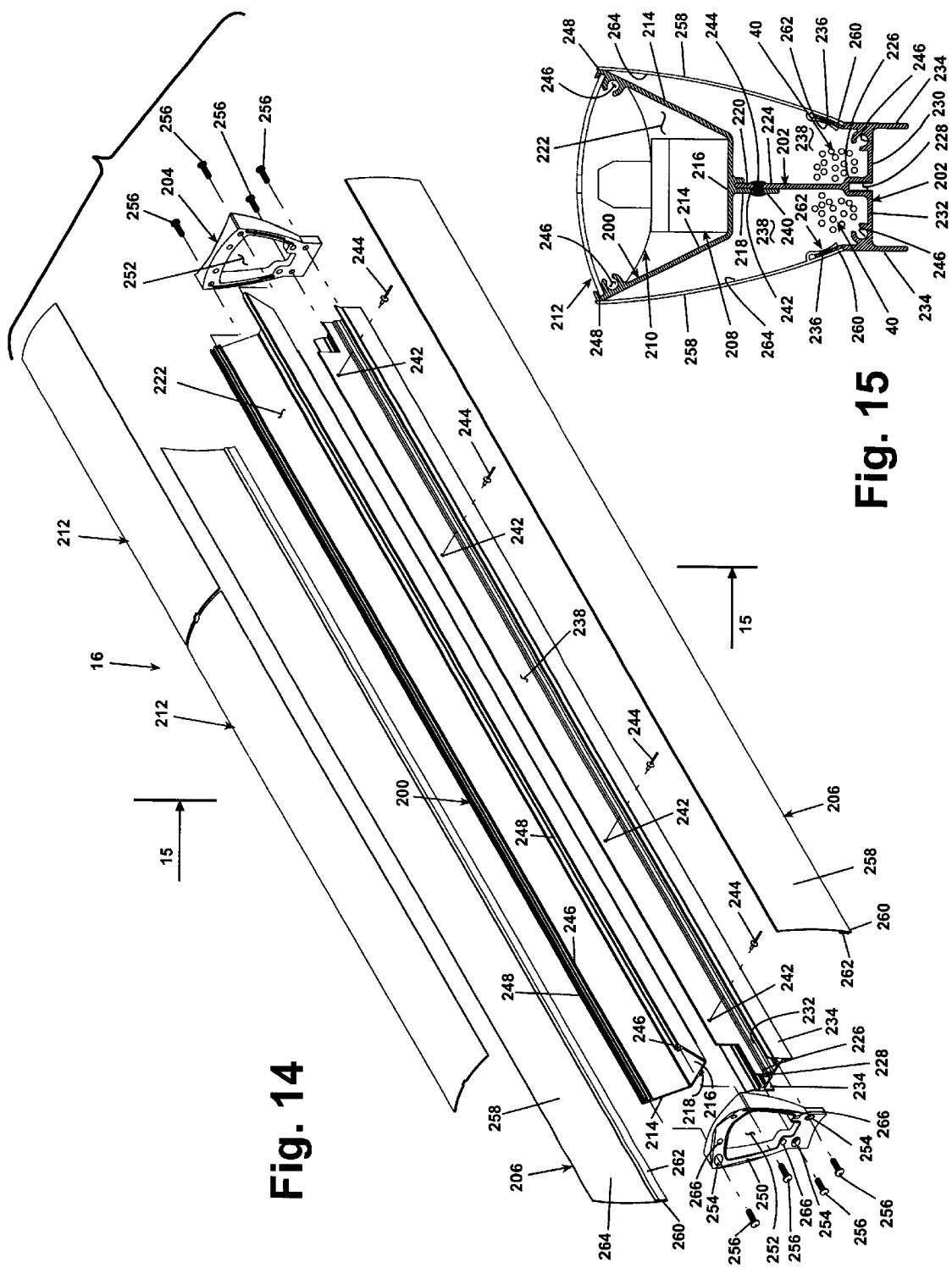

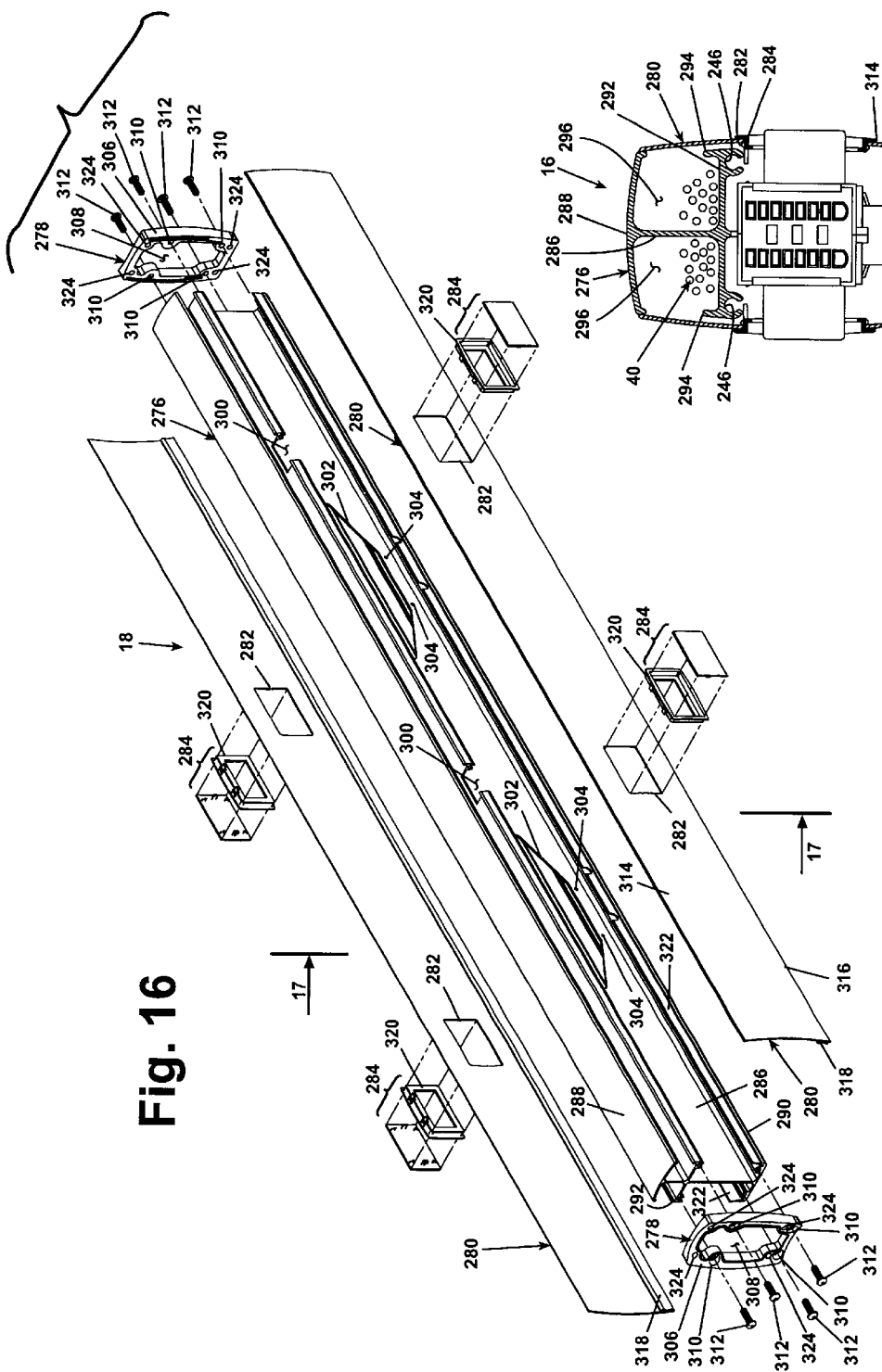

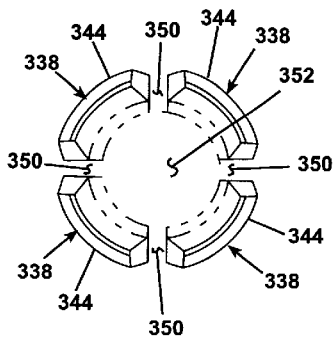
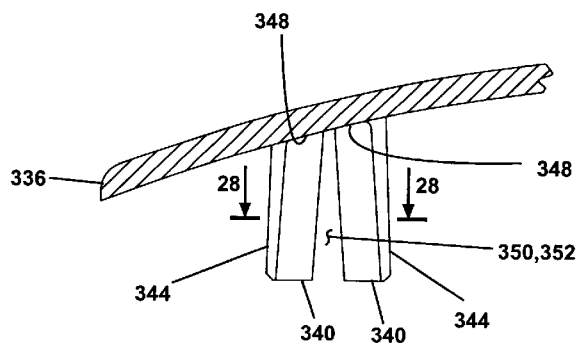
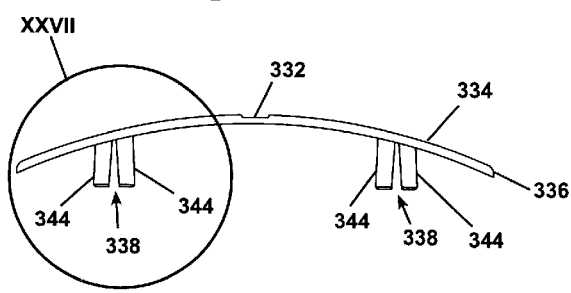
Fig. 28
Fig. 27
Fig. 26
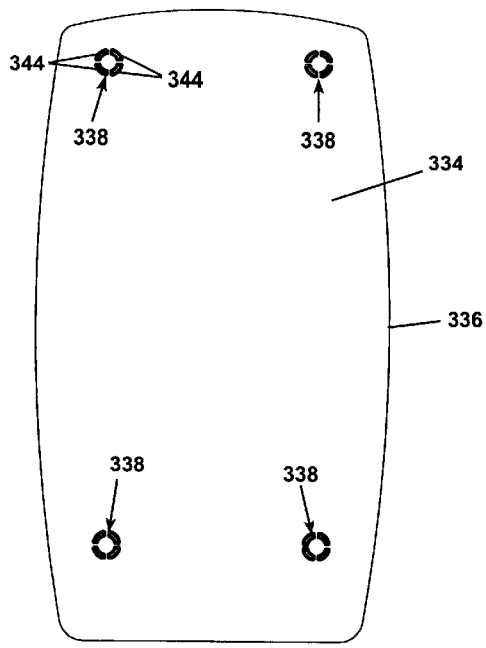
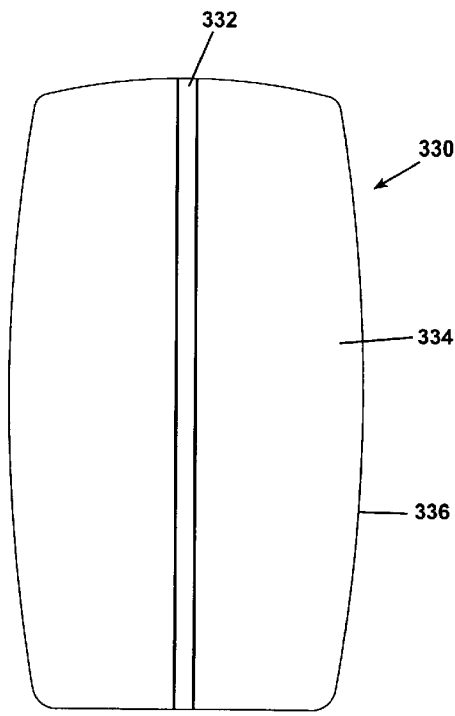
Fig. 25
Fig. 24

COLUMN-BASED WORKSPACE DEFINITION SYSTEM

CROSS-REFERENCE TO RELATED APPLICATIONS

This application claims the benefit of U.S. patent application Ser. Nos. 60/088,069, filed Jun. 5, 1998 and 60/127,083, filed Mar. 31, 1999.

BACKGROUND OF THE INVENTION

1. Field of the Invention

The invention relates in general to a workspace definition system, such as for dividing office space, and more particularly to a column-based workspace definition system.

2. Description of the Related Art

In typical office-space dividing systems, a series of interconnected frames or walls further subdivide the workspace into smaller spaces commonly referred to as "cubicles." Each of these cubicles is often occupied by one or more occupants and requires multiple electrical and data ports for each. In less-finished workspaces, it is often prohibitively expensive to install electrical and data conduit because typical office-space dividing systems require special connectors and non-standard components for routing and providing sockets for the electrical and data conduit.

It is desirable to dispose electrical and data conduit as well as ambient lighting throughout the workspace in various locations so that many occupants as well as electrical and data transmitting devices can operate within the workspace. The electrical and data conduit is typically routed throughout a workspace within false flooring or above removable ceiling panels and "drop down" within poles or within existing walls. Conventional sockets are mounted to the poles or to the ceiling tiles or flooring to allow occupants to interconnect devices to the electrical and data conduit circuits defined therein.

Further, the installation of the movable ceiling panels and false flooring can add to the expense of dividing large workspace, such as loft areas with high ceilings and rigid floors, so that existing office-space dividing systems are insufficient to allow the definition of a workspace while providing for the interconnection of electrical and data components such as office equipment and ambient lighting in a quick, easy, and cost-efficient manner.

SUMMARY OF THE INVENTION

In one aspect, the invention relates to a workspace definition system comprising a plurality of columns, each comprising a plurality of opaque panels interconnected at lateral edges thereof and defining an enclosure with a substantially uninterrupted hollow interior. At least one of the plurality of opaque panels in at least two of said columns has a first port at an upper portion thereof at an overhead height communicating with the hollow interior, the overhead height being above a height sufficient for anyone using the system to walk upright beneath. Each arcuate wall has a first lateral edge with a first flange forming a portion of a socket and a second lateral edge with a second flange forming another portion of the socket, the socket being located within the first and second flanges when the second flange on one of the at least two arcuate walls is in an interlocked position with the first flange on an adjacent one another of the at least two arcuate walls. A rod is positioned within the socket to prevent the first and second flanges from becoming dislodged from the interlocked position. A plurality of overhead beam assemblies has at least one internal channel, each overhead beam assembly mounted between the columns at respective first ports thereof. The at least one internal channel of each of the plurality of overhead beam assemblies thereby communicates with the hollow interior of the at least two of the columns via the first ports for uninterrupted passage of electrical/data conduit therethrough from the overhead height above any users of the system into the columns.

In various embodiments of the invention, the workspace definition system further comprises at least one intermediate beam assembly having an internal channel, the at least one intermediate beam assembly mounted between a pair of the plurality of columns at an intermediate height, the internal channel of the at least one intermediate beam assembly also communicating with the hollow interiors of the adjacent pair of columns. At least one of the plurality of columns can have a light fixture mounted thereon. The light fixture can have a reflector for directing light upwardly with respect to the columns. The light fixture can have a channel which communicates with the hollow interior of the column for uninterrupted passage of electrical/data conduit between the light fixture and the column.

The at least one of the plurality of columns can have an open upper end, and a cap can be mounted to the at least one of the plurality of columns to close the open upper end thereof. The cap can include an opening for the uninterrupted passage of electrical/data conduit into the open upper end of the at least one of the plurality of columns. The cap can further comprise an upper surface and the light fixture is mounted to the upper surface of the cap.

A plurality of floor-engaging glides can be mounted within a bottom end of the sockets defined by the interlocked arcuate walls. Each of the columns can comprise four arcuate walls. Each of the plurality of columns can comprise four arcuate walls interlocked together to form a circular configuration. Each of the plurality of columns are open at an upper end thereof and further comprising a trim ring mounted to the open upper end of at least some of the plurality of columns to cover the open upper end of the at least some of the plurality of columns. The trim ring can comprise an opening therein which communicates with the hollow interior of the at least some of the plurality of columns for routing electrical/data conduit from above the at least some of the plurality of columns into the hollow interior thereof. A cap can be mounted to an upper surface of the trim ring. A light fixture can be mounted to an upper surface of the trim ring.

The invention can also comprise a base trim ring assembly comprising an anchor plate mountable to a floor and having a surface thereon adapted to support a lower portion of one of the plurality of columns, a stabilizer base positioned within the anchor plate having positioning surfaces thereon, and a plurality of glides in retaining contact with the positioning surfaces of the stabilizer base and mounted to the lower portion of the one of the plurality of columns. The glides can be adjustably mounted within the column. The anchor plate and stabilizer base each can have openings in register with the opening in the other which communicate with the hollow interior of the column for the uninterrupted passage of electrical/data conduit into the hollow interior of the column from beneath the base trim ring assembly. The anchor plate and stabilizer base each can have mounting apertures in register with the mounting apertures in the other for fastening the anchor plate and stabilizer base to one another. The base trim ring assembly can further comprise a trim ring mounted around a lower portion of the one of the plurality of columns to conceal the interface between the base trim ring assembly and the lower portion of the one of the plurality of columns. The anchor plate can have at least one recess and the stabilizer base can have at least one protrusion in register with and received within the at least one recess to align the stabilizer base with the anchor plate.

At least one of the plurality of columns can comprise at least one arcuate wall, and at least one bracket mountable to an existing wall in a workspace and mounted to the at least one arcuate wall, whereby the assembly of the at least one arcuate wall and the bracket creates an interface with the existing wall. The bracket can comprise at least one flat wall mountable to the existing wall in the workspace, the at least one arcuate wall and the at least one flat wall can be interlocked together at lateral edges thereof. The at least one arcuate wall and the at least one flat wall can have a first lateral edge with a first flange forming a portion of a socket and a second lateral edge with a second flange forming another portion of the socket. The socket can be located within the first and second flanges when the second flange on one of the at least one arcuate wall and the at least one flat wall can be in an interlocked position with the first flange on an adjacent one another of the at least one arcuate wall and the at least one flat wall. A rod can be positioned within the socket to prevent the first and second flanges from being dislodged from the interlocked position.

Each of the plurality of overhead beam assemblies can comprise an elongated web defining at least two channels, brackets mounted to the elongated web and to the columns, and covers removably mounted to the elongated web to enclose the at least two channels. The brackets can have a peripheral rim defining a central opening which interconnects the hollow interior of the column and the at least two channels. Each bracket can have a first lateral surface in contact with the column and a second lateral surface in contact with the overhead beam assembly wherein the first lateral surface can be shaped complementary to an outer surface of the column. The elongated web and the covers can be substantially flush with the second lateral surface of the bracket.

The at least two channels can comprise first, second and third channels. The first channel can be upwardly opening, and the second and third channels can open laterally in an opposed relationship on either lateral side of the elongated web. The first channel can further comprise an upwardly-opening light fixture for providing ambient light to a workspace. The elongated web can have an opening interconnecting the second and third channels to allow for the uninterrupted passage of electrical/data conduit therethrough. One of the covers can comprise a first cover disposed over the first channel. The first cover can be translucent. The covers can comprise a second and a third cover disposed over the second and third channels. The second and third covers each can comprise an elongated panel having a mounting clip at a lower edge thereof. The elongated web can have flanges at a lower portion thereof adapted to receive the mounting clip on the second and third covers. The elongated web can further comprise a plurality of spaced slotted fastener retainers integrally formed therewith and adapted to retain fasteners, and the brackets can further comprise several spaced mounting apertures in register with the slotted fastener retainers. The elongated web can comprise a first beam forming a first upwardly-opening channel and a second beam mounted thereto forming second and third laterally-opening channels in cooperation with the first beam. The first beam can comprise a generally horizontal wall having diverging walls extending upwardly at an acute angle with respect to the generally horizontal wall. The first beam can have a depending inverted U-shaped flange adapted to receive an upper edge of the second beam. An underside of the elongated web can comprise an upwardly-extending slot adapted to receive hanging accessories.

The plurality of intermediate beam assemblies can comprise an elongated web defining at least two channels, brackets mounted to the elongated web and to the columns, and covers removably mounted to the elongated web to enclose the at least two channels. The brackets can have a peripheral rim defining a central opening which interconnects the hollow interior of the column and the at least two channels. Each bracket can have a first lateral surface in contact with the column and a second lateral surface in contact with the intermediate beam assembly wherein the first lateral surface can be shaped complementary to an outer surface of the column. The elongated web and the covers can be substantially flush with the second lateral surface of the bracket. The elongated web can have at least one opening interconnecting the at least two channels to allow for the uninterrupted passage of electrical/data conduit therethrough. The at least one opening can comprise a plurality of longitudinally spaced openings. The at least one opening can receive an electrical/data block therein whereby electrical/data conduit can be routed through the at least two channels to the electrical/data block disposed in the at least one opening. A first socket can be mounted to the electrical/data block and accessible in one of the at least two channels. One of the covers can have an opening in register with the first socket. A second socket can be provided which is accessible in the other of the at least two channels whereby electrical/data components can be interconnected to the first and second sockets on either side of the elongated web. Another of the covers can have an opening in register with the second socket.

The covers each can comprise an elongated panel having a mounting clip at a lower edge thereof. The elongated web can have flanges at a lower portion thereof adapted to receive the mounting clip on the covers. The elongated web can further comprise a plurality of spaced slotted fastener retainers integrally formed therewith and adapted to retain fasteners, and the brackets cam further comprise several spaced mounting apertures in register with the slotted fastener retainers. The elongated web can comprise an I-shaped beam having slotted fastener retainers at outer edges thereof.

First ports not having an overhead beam assembly mounted thereto can have a first port cover removably mounted thereto to conceal the first ports not having an overhead beam assembly mounted thereto. The first port cover can comprise an outer surface substantially conforming in curvature to the outer surface of the column. The column can have several mounting apertures adjacent to the first port, and the first port cover can comprise a rear surface provided with several spaced spring arms in register with the mounting apertures. The spring arms on the first port cover can be urged within the mounting apertures on the column to removably retain the first port cover over the first port. At least two spring arms can be in register with each mounting aperture, the at least two spring arms can be resiliently spaced from each other for flexing upon insertion and removal of the first port cover with respect to the first port.

The invention can further comprise a cabinet having a port which receives one of a lower portion of one of the plurality of columns, an end portion of one of the plurality of overhead beam assemblies and an end portion of one of the plurality of intermediate beam assemblies. The cabinet can have at least one of an electrical receptacle and a data receptacle thereon. An electrical/data conduit can pass through the one of the lower portion of the column, the end portion of the overhead beam and the end portion of the intermediate beam assembly and into the cabinet.

An adapter rail can be mounted to at least one of the columns, wherein the adapter rail can have a mounting flange thereon adapted to mount a panel at an edge thereof and a panel mounted to the adapter rail. The panel can be interconnected to an adjacent column at another edge thereof. The panel can be interconnected to a frame-based workspace definition system comprising several frames having removable panels thereon at another edge thereof.

In another aspect, the invention relates to a workspace definition system comprising a plurality of columns, each comprising a plurality of opaque panels interconnected at lateral edges thereof and defining an enclosure with a substantially uninterrupted hollow interior, a plurality of overhead beam assemblies having at least one internal channel, each overhead beam assembly mounted between adjacent columns at a first height, the plurality of overhead beam assemblies having elongated openings therein allowing access to the internal channel from at least three sides thereof, a plurality of intermediate beam assemblies having at least one internal channel, each intermediate beam assembly mounted between adjacent columns at a second height, the plurality of intermediate beam assemblies having elongated openings therein allowing access to the internal channel from at least two sides thereof, wherein the internal channel of each of the overhead and intermediate beam assemblies communicate with the hollow interior of the adjacent columns for uninterrupted passage of electrical/data conduit therethrough.

Each of the columns can comprise at least two arcuate walls which can be interlocked together at lateral edges thereof. Each arcuate wall can have a first lateral edge with a first flange forming a portion of a socket and a second lateral edge with a second flange forming another portion of the socket, the socket being located within the first and second flanges when the second flange on one of the at least two arcuate walls can be in an interlocked position with the first flange on an adjacent one of the at least two arcuate walls, and a rod can be positioned within the socket to prevent the first and second flanges from becoming dislodged from the interlocked position. Each of the plurality of columns can comprise four arcuate walls interlocked together to form a circular configuration.

At least one of the plurality of columns can comprise a half-column assembly comprising at least one arcuate wall, and at least one bracket mountable to an existing wall in a workspace and mounted to the at least one arcuate wall, whereby the assembly of the at least one arcuate wall and the bracket creates an interface with the existing wall. Each of the plurality of overhead beam assemblies can comprise an elongated web defining at least two channels, brackets mounted to the elongated web and to the columns, and covers removably mounted to the elongated web to enclose the at least two channels. Each of the plurality of intermediate beam assemblies can comprise an elongated web defining at least two channels, brackets mounted to the elongated web and to the columns, and covers removably mounted to the elongated web to enclose the at least two channels. Each of the plurality of columns can include a first port at an upper end thereof, wherein the first port can include a first port cover removably mounted thereto.

The workspace definition system can further comprise a cabinet having a port which receives one of a lower portion of one of the plurality of columns, an end portion of one of the plurality of overhead beam assemblies and an end portion of one of the plurality of intermediate beam assemblies.

In another aspect, the invention relates to a workspace definition system comprising a plurality of columns, each comprising a plurality of opaque panels interconnected at lateral edges thereof and defining an enclosure with a substantially uninterrupted hollow interior, a plurality of overhead beam assemblies having at least one internal channel, each overhead beam assembly mounted between adjacent columns at a first height, a plurality of intermediate beam assemblies having at least one internal channel, each intermediate beam assembly mounted between adjacent columns at a second height, wherein the internal channel of each of the overhead and intermediate beam assemblies communicate with the hollow interior of the adjacent columns for uninterrupted passage of electrical/data conduit therethrough, and wherein at least one of the plurality of columns can have a first light fixture mounted thereon and at least one of the plurality of overhead beam assemblies can have an upwardly-facing opening and second light fixture mounted in the at least one internal channel and aligned to direct light out of the opening for providing ambient lighting to the workspace in cooperation with the first light fixture in the at least one of the plurality of columns.

The light fixture can have a reflector for directing light upwardly with respect to the columns. The light fixture can have a channel which communicates with the hollow interior of the column for uninterrupted passage of electrical/data conduit between the light fixture and the column. At least one of the plurality of columns can have an open upper end, and can further comprise a cap mounted to the at least one of the plurality of columns to close the open upper end thereof. The cap can include an opening for the uninterrupted passage of electrical/data conduit into the open upper end of the at least one of the plurality of columns. The cap can further comprise an upper surface and the light fixture can be mounted to the upper surface of the cap.

In a further aspect, the invention relates to a workspace definition system comprising a plurality of columns, each comprising at least two arcuate walls interconnected at lateral edges thereof and defining an enclosure with a substantially uninterrupted hollow interior, a plurality of overhead beam assemblies having at least one internal channel, each overhead beam assembly mounted between a pair of the plurality of columns at a first height, and a plurality of intermediate beam assemblies having at least one internal channel, each intermediate beam assembly mounted between a pair of the plurality of columns at a second height, each arcuate wall can have a first lateral edge with a first flange forming a portion of a socket and a second lateral edge with a second flange forming another portion of the socket, the socket being located within the first and second flanges when the second flange on one of the at least two arcuate walls can be in an interlocked position with the first flange on an adjacent one of the at least two arcuate walls, and a rod positioned within the socket to prevent the first and second flanges from becoming dislodged from the interlocked position.

A plurality of floor-engaging glides can be mounted within a bottom end of the sockets defined by the interlocked arcuate walls. The at least two arcuate walls can comprise four arcuate walls interlocked together in a circular configuration.

In an additional aspect, the invention relates to a workspace definition system comprising a plurality of columns, each comprising a plurality of panels interconnected at lateral edges thereof and defining an enclosure with a substantially uninterrupted hollow interior, and wherein each of the plurality of columns can be open at an upper end thereof and further comprising a trim ring mounted to the open upper end of at least some of the plurality of columns to cover the open upper end of the at least some of the plurality of columns, wherein the trim ring can further comprise an aperture aligned with each of the interconnections between adjacent panels and a fastener disposed through the opening and engaging the lateral interconnection, a plurality of overhead beam assemblies having at least one internal channel, each overhead beam assembly mounted between a pair of the plurality of columns at a first height, and a plurality of intermediate beam assemblies having at least one internal channel, each intermediate beam assembly mounted between a pair of the plurality of columns at a second height.

The trim ring can comprise an opening therein which communicates with the hollow interior of the at least some of the plurality of columns for routing electrical/data conduit from above the at least some of the plurality of columns into the hollow interior thereof. A cap can be mounted to an upper surface of the trim ring. A light fixture can be mounted to an upper surface of the trim ring.

In another aspect, the invention relates to a workspace definition system comprising a plurality of columns having a hollow interior, a plurality of overhead beam assemblies having at least one internal channel, each overhead beam assembly mounted between adjacent columns at a first height, a plurality of intermediate beam assemblies having at least one internal channel, each intermediate beam assembly mounted between adjacent columns at a second height, and a base trim ring assembly comprising an anchor plate mountable to a floor and having a surface thereon adapted to support a lower portion of one of the plurality of columns, a stabilizer base positioned within the anchor plate having positioning surfaces thereon, and a plurality of glides in retaining contact with the positioning surfaces of the stabilizer base and mounted to the lower portion of the one of the plurality of columns.

The glides can be adjustably mounted within the column. The anchor plate and stabilizer base each can have openings in register with the opening in the other which communicate with the hollow interior of the column for the uninterrupted passage of electrical/data conduit into the hollow interior of the column from beneath the base trim ring assembly. The anchor plate and stabilizer base each can have mounting apertures in register with the mounting apertures in the other for fastening the anchor plate and stabilizer base to one another. The base trim ring assembly can further comprise a trim ring mounted around a lower portion of the one of the plurality of columns to conceal the interface between the base trim ring assembly and the lower portion of the one of the plurality of columns. The anchor plate can have at least one recess and the stabilizer base can have at least one protrusion in register with and received within the at least one recess to align the stabilizer base with the anchor plate.

In another aspect, the invention relates to a workspace definition system comprising a plurality of columns having a hollow interior, wherein at least one of the plurality of columns can comprise at least one arcuate wall and at least one plate mountable to an existing wall in a workspace, wherein first lateral edge flanges on the at least one arcuate wall can be interlocked to second lateral edge flanges of the plate whereby the assembly of the at least one arcuate wall and the plate creates an interface with the existing wall.

The plate can comprise at least one flat wall mountable to the existing wall in the workspace. The at least one arcuate wall can further comprise at least two arcuate walls, the first lateral edge flange of each of the at least two arcuate walls can form a portion of a socket and the second lateral edge flange of the bracket forms another portion of the socket, the socket being located within the first and second flanges when the second flange on one of the at least two arcuate walls can be in an interlocked position with the first flange on another of the at least two arcuate walls, and a rod can be positioned within the socket to prevent the first and second flanges from becoming dislodged from the interlocked position.

In yet another aspect, the invention relates to a workspace definition system comprising a plurality of columns, each comprising a plurality of opaque panels interconnected at lateral edges thereof and defining an enclosure with a substantially uninterrupted hollow interior, a plurality of overhead beam assemblies having at least one internal channel, each overhead beam assembly mounted between a pair of the plurality of columns at a first height, wherein each of the plurality of overhead beam assemblies comprises a elongated web defining at least two channels, brackets mounted to the elongated web and to the pair of the plurality of columns, and covers removably mounted to the elongated web to enclose the at least two channels, wherein one of the at least two channels can further comprise an upwardly-opening light fixture for providing ambient light to a workspace.

The brackets can have a peripheral rim defining a central opening which interconnects the hollow interior of the column and the at least two channels. Each bracket can have a first lateral surface in contact with the column and a second lateral surface in contact with the overhead beam assembly wherein the first lateral surface can be shaped complementary to an outer surface of the column. The elongated web and the covers can be substantially flush with the second lateral surface of the bracket.

The at least two channels can comprise first, second and third channels. The first channel can be upwardly opening, and the second and third channels open laterally in an opposed relationship on either lateral side of the elongated web. The elongated web can have an opening interconnecting the second and third channels to allow for the uninterrupted passage of electrical/data conduit therethrough. One of the covers can comprise a first cover disposed over the first channel. The first cover can be translucent. The covers can comprise a second and a third cover disposed over the second and third channels. The second and third covers each can comprise an elongated panel having a mounting clip at a lower edge thereof. The elongated web can have flanges at a lower portion thereof adapted to receive the mounting clip on the second and third covers. The elongated web can further comprise a plurality of spaced slotted fastener retainers integrally formed therewith and adapted to retain fasteners, and the brackets further comprise several spaced mounting apertures in register with the slotted fastener retainers.

The elongated web can comprise a first beam forming a first upwardly-opening channel and a second beam mounted thereto forming second and third laterally-opening channels in cooperation with the first beam. The first beam can comprise a generally horizontal wall having diverging walls extending upwardly at an acute angle with respect to the generally horizontal wall. The first beam can have a depending inverted U-shaped flange adapted to receive an upper edge of the second beam. An underside of the elongated web can comprise an upwardly-extending slot adapted to receive hanging accessories.

In yet an additional aspect, the invention relates to a workspace definition system comprising a plurality of columns, each comprising a plurality of panels interconnected at lateral edges thereof and defining an enclosure with a substantially uninterrupted hollow interior, a plurality of intermediate beam assemblies having at least one internal channel, each intermediate beam assembly mounted between adjacent columns at a height, wherein each of the plurality of intermediate beam assemblies comprises a elongated web defining at least two channels, the web having a central wall separating the at least two channels from one another, wherein the web can have at least one opening interconnecting the at least two channels and adapted to receive a power block assembly therein, wherein the elongated web can comprise an I-shaped beam having slotted fastener retainers at outer edges thereof, brackets mounted to the elongated web and to the adjacent columns, and covers removably mounted to the elongated web to enclose the at least two channels.

The brackets can have a peripheral rim defining a central opening which interconnects the hollow interior of the column and the at least two channels. Each bracket can have a first lateral surface in contact with the column and a second lateral surface in contact with the intermediate beam assembly wherein the first lateral surface can be shaped complementary to an outer surface of the column. The elongated web and the covers can be substantially flush with the second lateral surface of the bracket. The at least one opening can comprise a plurality of longitudinally spaced openings. The at least one opening receives an electrical/data block therein whereby electrical/data conduit can be routed through the at least two channels to the electrical/data block disposed in the at least one opening. A first socket can be mounted to the electrical/data block and accessible in one of the at least two channels. One of the covers can have an opening in register with the first socket. A second socket can be provided that is accessible in the other of the at least two channels whereby electrical/data components can be interconnected to the first and second sockets on either side of the elongated web. Another of the covers can have an opening in register with the second socket.

The covers each can comprise an elongated panel having a mounting clip at a lower edge thereof. The elongated web can have flanges at a lower portion thereof adapted to receive the mounting clip on the covers. The elongated web can further comprise a plurality of spaced slotted fastener retainers integrally formed therewith and adapted to retain fasteners, and the brackets further comprise several spaced mounting apertures in register with the slotted fastener retainers.

In another aspect, the invention relates to a workspace definition system comprising a plurality of columns, each comprising a plurality of panels interconnected at lateral edges thereof and defining an enclosure with a substantially uninterrupted hollow interior and the plurality of panels have ports at a height, a plurality of beam assemblies having at least one internal channel, each beam assembly mounted between some of the ports of the plurality of columns at the height, and other of the ports have a port cover removably mounted thereto, wherein the port cover can have at least one vertical groove in an exterior surface thereof in vertical alignment with at least one interconnection between adjacent panels for an aesthetically-pleasing outer appearance thereof when the port cover can be mounted to the column.

The port cover can comprise an outer surface substantially conforming in curvature to the outer surface of the column. The column can have several mounting apertures adjacent to the port, and the port cover can comprise a rear surface provided with several spaced spring arms in register with the mounting apertures, wherein the spring arms on the port cover can be urged within the mounting apertures on the column to removably retain the port cover over the port. At least two spring arms can be in register with each mounting aperture, the at least two spring arms can be resiliently spaced from each other for flexing upon insertion and removal of the port cover with respect to the port.

In an additional aspect, the invention relates to a workspace definition system comprising a plurality of columns having a hollow interior, each column having a first port at an upper portion thereof at an overhead height communicating with the hollow interior, the overhead height being above a height sufficient for anyone using the system to walk upright beneath, wherein each of the columns can comprise at least two arcuate walls which can be interlocked together at lateral edges thereof, each arcuate wall can have a first lateral edge with a first flange forming a portion of a socket and a second lateral edge with a second flange forming another portion of the socket, the socket being located within the first and second flanges when the second flange on one of the at least two arcuate walls can be in an interlocked position with the first flange on an adjacent one of the at least two arcuate walls, and a rod positioned within the socket to prevent the first and second flanges from becoming dislodged from the interlocked position, a plurality of overhead beam assemblies having at least one internal channel, each overhead beam assembly mounted between the columns at at least some of the first ports thereof, wherein the at least one internal channel of each of the plurality of overhead beam assemblies communicates with the hollow interior of the plurality of columns via the ports for uninterrupted passage of electrical/data conduit therethrough from the overhead height above any users of the system into the columns.

A plurality of floor-engaging glides can be mounted within a bottom end of the sockets defined by the interlocked arcuate walls. Each of the columns can comprise four arcuate walls.

In an additional aspect, the invention relates to a workspace definition system comprising a plurality of columns having a hollow interior, each column having a first port at an upper portion thereof at an overhead height communicating with the hollow interior, the overhead height being above a height sufficient for anyone using the system to walk upright beneath, wherein at least one of the plurality of columns can comprise at least one arcuate wall, and at least one bracket mountable to an existing wall in a workspace and mounted to the at least one arcuate wall, wherein the bracket can comprise at least one flat wall mountable to the existing wall in the workspace, the at least one arcuate wall and the at least one flat wall can be interlocked together at lateral edges thereof, whereby the assembly of the at least one arcuate wall and the bracket creates an interface with the existing wall, a plurality of overhead beam assemblies having at least one internal channel, each overhead beam assembly mounted between the columns at at least some of the first ports thereof, wherein the at least one internal channel of each of the plurality of overhead beam assemblies communicates with the hollow interior of the plurality of columns via the ports for uninterrupted passage of electrical/data conduit therethrough from the overhead height above any users of the system into the columns.

The at least one arcuate wall and the at least one flat wall can have a first lateral edge with a first flange forming a portion of a socket and a second lateral edge with a second flange forming another portion of the socket, the socket being located within the first and second flanges when the second flange on one of the at least one arcuate wall and the at least one flat wall can be in an interlocked position with the first flange on an adjacent one of the at least one arcuate wall and the at least one flat wall, and a rod can be positioned within the socket to prevent the first and second flanges from being dislodged from the interlocked position.

In a further aspect, the invention relates to a workspace definition system comprising a plurality of columns having a hollow interior, each column having a first port at an upper portion thereof at an overhead height communicating with the hollow interior, the overhead height being above a height sufficient for anyone using the system to walk upright beneath, a plurality of overhead beam assemblies having at least one internal channel, each overhead beam assembly mounted between the columns at at least some of the first ports thereof, wherein each of the plurality of overhead beam assemblies includes an elongated web comprising a first beam forming a first upwardly-opening channel and a second beam mounted thereto forming second and third laterally-opening channels in cooperation with the first beam defining at least two channels, brackets mounted to the elongated web and to the columns, and covers removably mounted to the elongated web to enclose the channels, wherein the at least one internal channel of each of the plurality of overhead beam assemblies communicates with the hollow interior of the plurality of columns via the ports for uninterrupted passage of electrical/data conduit therethrough from the overhead height above any users of the system into the columns.

The first beam can comprise a generally horizontal wall having diverging walls extending upwardly at an acute angle with respect to the generally horizontal wall. The first beam can have a depending inverted U-shaped flange adapted to receive an upper edge of the second beam.

In yet an additional aspect of the invention, the invention relates to a workspace definition system comprising a plurality of columns having a hollow interior, each column having a first port at an upper portion thereof at an overhead height communicating with the hollow interior, the overhead height being above a height sufficient for anyone using the system to walk upright beneath, a plurality of overhead beam assemblies comprising an elongated web defining at least one internal channel, each overhead beam assembly mounted between the columns at at least some of the first ports thereof, the at least one internal channel being divided into an upwardly-opening portion and a pair of opposed laterally-opening portions located beneath the upwardly-opening portion, a plurality of intermediate beam assemblies having an elongated web defining at least two opposed laterally-opening channels, brackets mounted to the elongated web and to the plurality of columns, and covers removably mounted to the elongated web to enclose the at least two channels, wherein the at least one internal channel of each of the plurality of overhead beam assemblies communicates with the hollow interior of the plurality of columns via the ports for uninterrupted passage of electrical/data conduit therethrough from the overhead height above any users of the system into the columns.

The brackets can have a peripheral rim defining a central opening which interconnects the hollow interior of the column and the at least two channels. Each bracket can have a first lateral surface in contact with the column and a second lateral surface in contact with the intermediate beam assembly wherein the first lateral surface can be shaped complementary to an outer surface of the column. The elongated web and the covers can be substantially flush with the second lateral surface of the bracket. The elongated web can have at least one opening interconnecting the at least two channels to allow for the uninterrupted passage of electrical/data conduit therethrough. The at least one opening can comprise a plurality of longitudinally spaced openings.

The at least one opening can receive an electrical/data block therein whereby electrical/data conduit can be routed through the at least two channels to the electrical/data block disposed in the at least one opening. A first socket can be mounted to the electrical/data block and accessible in one of the at least two channels. One of the covers can have an opening in register with the first socket. A second socket can be provided that is accessible in the other of the at least two channels whereby electrical/data components can be interconnected to the first and second sockets on either side of the elongated web. Another of the covers can have an opening in register with the second socket. The covers each can comprise an elongated panel having a mounting clip at a lower edge thereof. The elongated web can have flanges at a lower portion thereof adapted to receive the mounting clip on the covers. The elongated web can further comprise a plurality of spaced slotted fastener retainers integrally formed therewith and adapted to retain fasteners, and the brackets further comprise several spaced mounting apertures in register with the slotted fastener retainers. The elongated web can comprise an I-shaped beam having slotted fastener retainers at outer edges thereof.

In a further aspect, the invention relates to a workspace definition system comprising a plurality of columns having a hollow interior, each of the plurality of columns can comprise at least two arcuate walls which can be interlocked together at lateral edges thereof, each arcuate wall can have a first lateral edge with a first flange forming a portion of a socket and a second lateral edge with a second flange forming another portion of the socket, the socket being located within the first and second flanges when the second flange on one of the at least two arcuate walls can be in an interlocked position with the first flange on an adjacent one of the at least two arcuate walls, and a rod positioned within the socket to prevent the first and second flanges from becoming dislodged from the interlocked position, a plurality of overhead beam assemblies having at least one internal channel, each overhead beam assembly mounted between adjacent columns at a first height, a plurality of intermediate beam assemblies having at least one internal channel, each intermediate beam assembly mounted between adjacent columns at a second height, wherein the internal channel of each of the overhead and intermediate beam assemblies communicate with the hollow interior of the adjacent columns for uninterrupted passage of electrical/data conduit therethrough.

The at least two arcuate walls can comprise four arcuate walls interlocked together to form a circular configuration. At least one of the plurality of columns can comprise a half-column assembly comprising at least one arcuate wall, and at least one bracket mountable to an existing wall in a workspace and mounted to the at least one arcuate wall, whereby the assembly of the at least one arcuate wall and the bracket creates an interface with the existing wall.

In another aspect, the invention relates to a workspace definition system comprising a plurality of columns having a hollow interior, a plurality of overhead beam assemblies having at least one internal channel, each overhead beam assembly mounted between adjacent columns at a first height, each of the plurality of overhead beam assemblies can comprise a elongated web defining at least two channels, brackets mounted to the elongated web and to the columns, and covers removably mounted to the elongated web to enclose the at least two channels, a plurality of intermediate beam assemblies having at least one internal channel, each intermediate beam assembly mounted between adjacent columns at a second height, wherein the internal channel of each of the overhead and intermediate beam assemblies communicate with the hollow interior of the adjacent columns for uninterrupted passage of electrical/data conduit therethrough.

In one more aspect, the invention relates to a workspace definition system comprising a plurality of columns having a hollow interior, a plurality of overhead beam assemblies having at least one internal channel, each overhead beam assembly mounted between adjacent columns at a first height, a plurality of intermediate beam assemblies having at least one internal channel, each intermediate beam assembly mounted between adjacent columns at a second height, each of the plurality of intermediate beam assemblies can comprise a elongated web defining at least two channels, brackets mounted to the elongated web and to the columns, and covers removably mounted to the elongated web to enclose the at least two channels, wherein the internal channel of each of the overhead and intermediate beam assemblies communicate with the hollow interior of the adjacent columns for uninterrupted passage of electrical/data conduit therethrough.

In another aspect, the invention relates to a workspace definition system comprising a plurality of columns having a hollow interior, wherein each of the plurality of columns can comprise at least two arcuate walls which can be interlocked together at lateral edges thereof, each arcuate wall can have a first lateral edge with a first flange forming a portion of a socket and a second lateral edge with a second flange forming another portion of the socket, the socket being located within the first and second flanges when the second flange on one of the at least two arcuate walls can be in an interlocked position with the first flange on an adjacent one of the at least two arcuate walls, and a rod positioned within the socket to prevent the first and second flanges from becoming dislodged from the interlocked position, a plurality of overhead beam assemblies having at least one internal channel, each overhead beam assembly mounted between a pair of the plurality of columns at a first height, and a plurality of intermediate beam assemblies having at least one internal channel, each intermediate beam assembly mounted between a pair of the plurality of columns at a second height. A plurality of floor-engaging glides can be mounted within a bottom end of the sockets defined by the interlocked arcuate walls.

In another aspect, the invention relates to a workspace definition system comprising a plurality of columns having a hollow interior, wherein at least one of the plurality of columns can comprise at least two arcuate walls, and at least one bracket mountable to an existing wall in a workspace, wherein the at least two arcuate walls can be interlocked to the bracket at lateral edges thereof whereby the assembly of the at least one arcuate wall and the bracket creates an interface with the existing wall, each of the at least two arcuate wall can have a first lateral edge with a first flange forming a portion of a socket and a second lateral edge with a second flange forming another portion of the socket, the socket being located within the first and second flanges when the second flange on one of the at least two arcuate walls can be in an interlocked position with the first flange on an adjacent wall of the at least two arcuate walls, and a rod positioned within the socket to prevent the first and second flanges from becoming dislodged from the interlocked position. The bracket can comprise at least one flat wall mountable to the existing wall in the workspace.

In a further aspect, the invention relates to a workspace definition system comprising a plurality of columns having a hollow interior, a plurality of overhead beam assemblies, each overhead beam assembly mounted between a pair of the plurality of columns at a first height, wherein each of the plurality of overhead beam assemblies comprises a elongated web defining a first upwardly opening channel, and a second and third laterally opening channels in an opposed relationship on either lateral side of the elongated web, brackets mounted to the elongated web and to the pair of the plurality of columns, covers removably mounted to the elongated web to enclose the second and third laterally opening channels, and a light fixture located in the first upwardly opening channel for providing ambient light to a workspace.

The brackets can have a peripheral rim defining a central opening which interconnects the hollow interior of the column and the channels. Each bracket can have a first lateral surface in contact with the column and a second lateral surface in contact with the overhead beam assembly wherein the first lateral surface can be shaped complementary to an outer surface of the column. The elongated web and the covers can be substantially flush with the second lateral surface of the bracket.

BRIEF DESCRIPTION OF THE DRAWINGS

In the drawings:

FIG. 3 is an exploded, perspective view of the column assembly of FIG. 1 comprising a plurality of arcuate column portions aligned in a generally circular configuration;

FIG. 4 is a top plan view of the arcuate portions of the column assembly of FIG. 3 interconnected to one another to form a circular configuration;

FIG. 4A is an enlarged top plan view of the area marked 4A in FIG. 4;

FIG. 5 is an exploded perspective view showing the assembly of FIGS. 3–4 provided with reinforcing rods in sockets defined at interconnecting regions of adjacent arcuate portions of the column assembly and several glides mounted at a lower portion thereof for abutment with a floor surface;

FIG. 10 is an exploded, perspective view of a half-column assembly shown in the workspace definition system of FIG. 1 comprising a plurality of arcuate column portions and a rear plate portion aligned in a generally semicircular configuration;

FIG. 11 is a top plan view of the arcuate portions and rear plate portion of the half-column assembly of FIG. 10 interconnected to one another to form a semicircular configuration;

FIG. 12 is an exploded perspective view showing the assembly of FIGS. 10–11 provided with reinforcing rods in sockets defined at interconnecting regions of adjacent arcuate and rear plate portions of the half-column assembly and several glides mounted at a lower portion thereof for abutment with a floor surface;

FIG. 14 is an exploded, perspective view of the overhead beam assembly shown in FIG. 1 comprising first and second beams mounted to one another, a pair of beam support brackets located at each end thereof, a pair of lateral beam covers, and an optional upwardly-directed lamp, reflector, lens and diffuser;

FIG. 15 is a cross-sectional view of the assembled overhead beam assembly taken along lines 15—15 of FIG. 14;

FIG. 16 is an exploded, perspective view of an intermediate beam assembly of FIG. 1 comprising an elongated beam, a pair of beam support brackets at each end thereof, and a pair of lateral beam covers having optional apertures for receipt of electrica socket blanks and covers;

FIG. 17 is a cross-sectional view of the assembled intermediate beam assembly along lines 17—17 of FIG. 16;

FIG. 24 is a front elevational view of the intermediate height cover of FIG. 18;

FIG. 25 is a rear elevational view of the intermediate height cover of FIG. 18;

FIG. 26 is a top plan view of the intermediate height cover of FIG. 18;

FIG. 27 is an enlarged, fragmentary top plan view of the region marked XXVII of FIG. 26 showing a mounting member for the overhead and intermediate height covers;

FIG. 28 is a cross-sectional view of the mounting stud taken along lines 28—28 of FIG. 27;

DETAILED DESCRIPTION OF THE PREFERRED EMBODIMENTS

Figure 1:
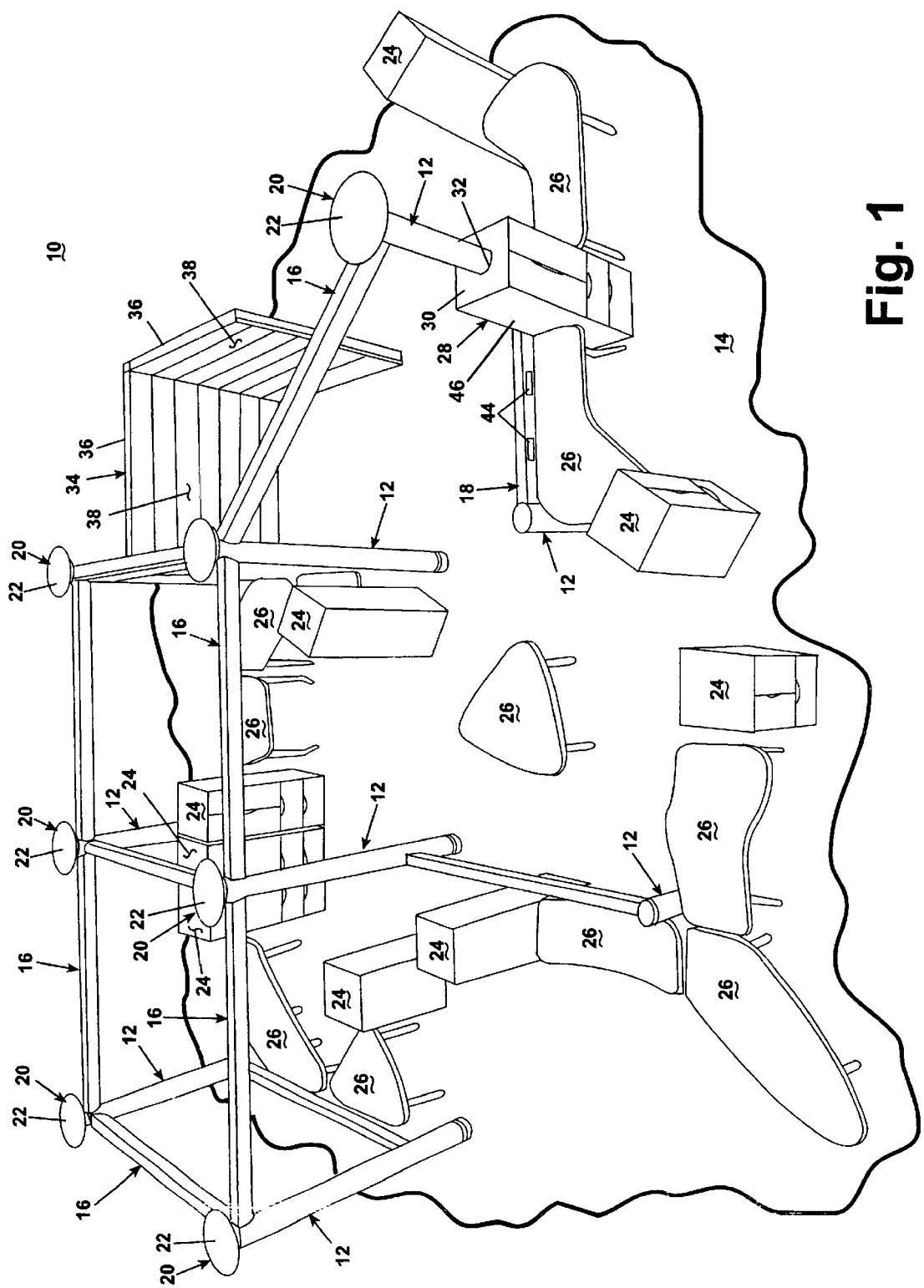
FIG. 1 is a perspective view of the column-based workspace definition system according to the invention formed by interengaging column assemblies, overhead beam assemblies, intermediate beam assemblies and column-top light fixtures shown interfacing with and surrounding existing office furniture systems.

Referring now to FIG. 1, a general overview of a workspace definition system 10 according to the invention is shown comprising several column assemblies 12 of varying heights which are supported generally orthogonal with respect to a floor surface 14 and can extend completely between the floor surface 14 and a ceiling, not shown, or can extend only a portion of the distance between the floor surface 14 and the ceiling.

An overhead beam assembly 16 is provided between pairs of selected column assemblies 12, preferably adjacent to an upper end of each column assembly 12 and disposed generally parallel to the floor surface 14 such as in a generally horizontal plane. The overhead beam assemblies 16 cooperate with the column assemblies 12 to which they are attached to define an overhead archway such as to define a doorway or to cooperate with other column assemblies 12 mounted to a particular overhead beam assembly 16 to defme general limits within a larger workspace in which the workspace definition system 10 is employed.

An intermediate beam assembly 18 is shown mounted between a pair of column assemblies 12 intermediate upper and lower ends of each column assembly 12 and preferably disposed generally parallel to the floor surface 14 such as in a generally horizontal plane. It has been found that location of the intermediate beam assembly 18 at an approximate desk-height level provides desirable results although a particular vertical height is not required and can be pre-selected depending upon the desired aesthetics and functionality desired for the workspace. For example, the intermediate beam assembly 18 can be provided with electrical sockets/data ports 44 so that a computer, telephone, or other office equipment can be operably interconnected with electric and data conduit routed within the workspace definition system 10 to supply electricity and networking capabilities as required.

A column-top light fixture 20 can be provided atop a column assembly 12 as desired. The column-top light fixture 20 can include a conventional light source (not shown) located axially and concentrically within a conical reflector 22 for directing light into the workspace in which the workspace definition system 12 is located. For example, the reflectors 22 located atop the column assemblies 12 of FIG. 1 are provided with an upwardly-opening reflector 22 for each of the column-top light fixtures 20 which would operate to direct illumination from the light source within each column assembly 12 upwardly toward the ceiling of the workspace. This type of 5 lighting is often employed in offices to provide a soft-lighting effect rather than more intense illumination provided by downwardly-directed light sources.

Once a particular configuration of a workspace definition system 10 comprising the column assemblies 12 interconnected by overhead beam and intermediate beam assemblies 16 and 18 are spaced throughout the floor surface 14 in 10 a particular workspace, several free-standing cabinets 24 and work surfaces 26 can be strategically placed adjacent to, within, around or interconnected to the workspace definition system 10 to create a highly functional and aesthetically-pleasing environment in which office personnel can function. In addition, the workspace definition system 10 provides increased functionality over prior art office-spaced 15 dividing systems by allowing the cabinets 24 and work surfaces 26 to be freely moved around within the workspace definition system 10 as the needs of the office personnel dictate. Further, for more complex office space divisions, the column assemblies 12 and the overhead and intermediate assemblies 16 and 18 can be detached from one another and reassembled to define a different volume or office layout as desired.

The cabinets 24 can be conventional pedestals, file cabinets, wardrobes, or any other container for storage of files, paper, or clothing, such as overcoats and suit jackets, etc. The cabinets 24 can also comprise a column interface cabinet 28, shown in FIG. 1, which has an upper surface 30 or a rear surface 46 through which a portion 32 of a column assembly 12 or a beam assembly 16, 18 can pass therein for 25 transporting electrical and communications conduits to the interior of the column interface cabinet 28. Thus, a powered or communication device, such as a computer, telephone, printer, facsimile machine, or any other suitable device, can be stored within the column interface cabinet and be provided with electrical and data connections as required for the optimal operation of the device without requiring the 30 provision of apertures within the column interface cabinet 28 to receive the electrical and data conduit. Further, an exterior surface of the interface cabinet 28 can be provided with electrical sockets/data ports 366. This type of interface cabinet 28 is described in U.S. Provisional Patent Application 60/127,083 filed Mar. 31, 1999 and in greater detail in FIGS. 41–42.

It will also be understood that the column-based workspace definition system 10 can be interfaced with other known frame-based workspace definition systems 34 so that the column-based workspace definition system 10 can seamlessly interface with an existing cubicle-defining or other office-spaced dividing system to provide a functional and efficient open area such as that shown in FIG. 1. These types of frame-based workspace definition systems 34 typically have a plurality of interconnected frames 36 on which tiles 38 are secured. These types of frame-based workspace definition systems 34 are well known in the art so that the identification of more specific components of these types of frame-based workspace definition systems 34 need not be described herein.

Figure 2:
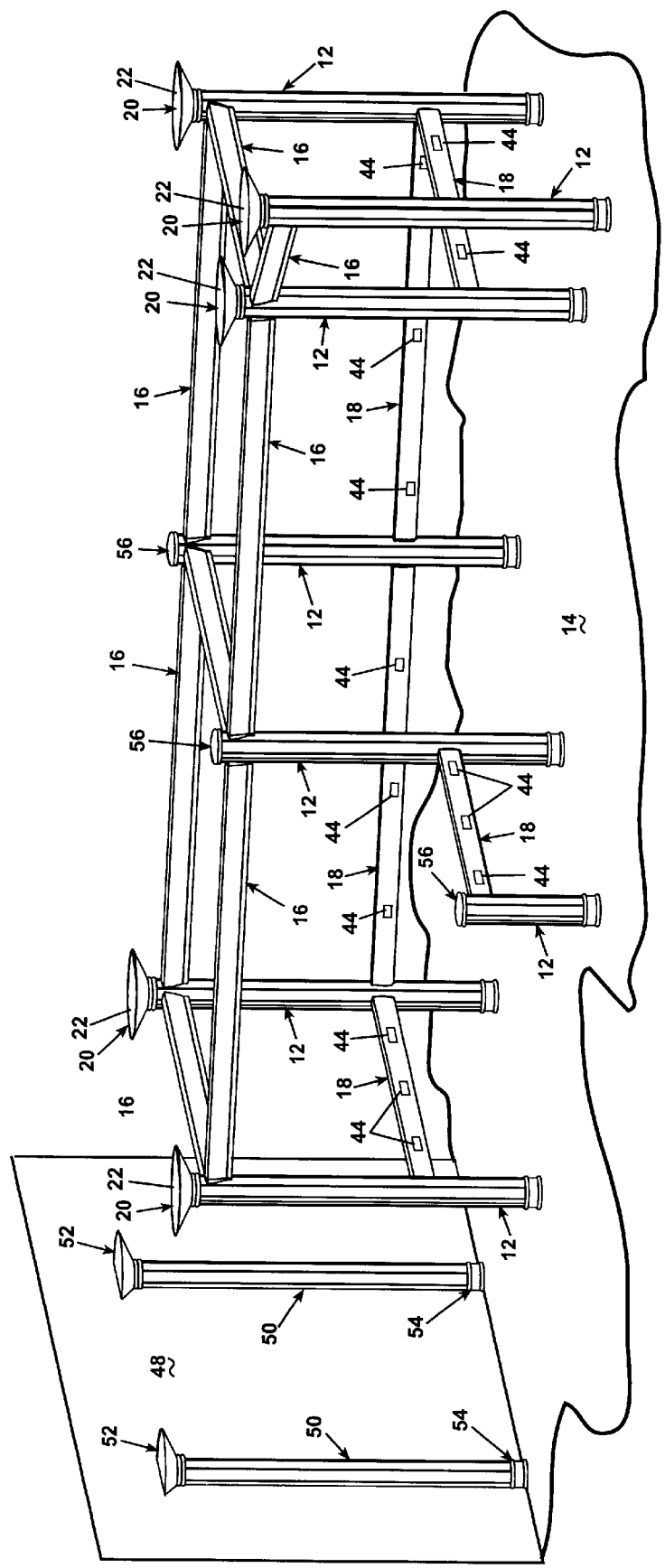
FIG. 2 is a perspective view of the column-based workspace definition system of FIG. 1 with the existing office furniture systems and freestanding and interconnected furniture removed for clarity.

FIG. 2 shows a minimal view of another configuration of the column-based workspace definition system 10 of FIG. I which has the remaining components of FIG. 1 removed for clarity and shows greater detail of the column assemblies 12, overhead beam assemblies 16 and intermediate beam assemblies 18. In addition, FIG. 2 also shows an existing wall 48 in the workspace on which half-column assemblies 50 are mounted which are provided with a half-column-top light fixture 52 at an upper portion thereof and a half-base trim ring assembly 54 at a lower portion thereof. The half components 50-54 are employed to act as a wall sconce so that the half-column assemblies can have the appearance of extending from the existing wall 48. FIG. 2 also shows some of the column-top light fixtures 20 of the configuration shown in FIG. 1 replaced with a column-top trim ring assembly 56.

The various components of the column-based workspace definition system 10 and their interconnection to one another will now be explained in detail.

FIGS. 3–5 show the column assemblies 12 of FIG. 1 in greater detail comprising a plurality of elongated, generally opaque, arcuate column portions 58 aligned in a generally circular configuration. Although four arcuate portions 58 are shown in the exploded view of FIG. 3, it will be understood that as many arcuate portions 58 can be employed as needed to form a generally circular or elliptical configuration for the column assembly 12, i.e., having an arcuate cross section generally corresponding in circular angular span to a fraction of the number of arcuate portions 58 required to be disposed in a desired closed configuration of the column assembly 12.

Each of the arcuate portions 58 comprises an elongated member 60 having an inner surface 62 with a plurality of reinforcing ribs 64 thereon and an outer surface 66 with aesthetic grooves 68 thereon, preferably aligned with a medial vertical axis of the elongated member 60 and adjacent each of the first and second lateral edges 70 and 72.

The arcuate portions 58 of the column assembly 12 are interconnected at first and second lateral edges 70 and 72 of adjacent arcuate portions 58. The first lateral edge 70 has a first flange 74 which is adapted to interconnect with a second flange 76 on the second lateral edge 72 of an adjacent arcuate portion 58 to form a socket 78 therebetween.

The first flange 74 on the first lateral edge 70 of the arcuate portion 58 comprises an inverted U-shaped member which has a first leg 80 integrally formed with the first lateral edge 70. The first leg extends beyond the first lateral edge 70 both rearwardly and laterally and terminates in a bight portion 82 which, in turn, terminates in a cantilevered arcuate second leg 84. The first leg 80 and bight portion 82 have an inner surface 86 which is recessed and adapted to receive the second flange 76 on the second lateral edge 72 of an adjacent arcuate portion 58. The second leg 84 of the first flange 74 has a plurality of spaced centering flanges 88 extending inwardly from an inner surface 90 of the second leg 84.

The second flange 76 on the second lateral edge 72 of the arcuate portion 58 comprises a C-shaped member which has an arcuate member 92 having one end integrally formed with the second lateral edge 72 of the arcuate portion 58 and extending rearwardly of the second lateral edge 72. The arcuate member 92 has an outer surface adapted to be positioned generally flush with the inner surface 86 of the first flange 74 and an inner surface 94 having centering flanges 88 extending inwardly therefrom.

The arcuate portions 58 are designed so that their respective outer surfaces 66 are aligned in a generally flush manner with the grooves 68 thereon providing an aesthetically-pleasing appearance to the column assembly 12. As shown in FIGS. 3, 4, 4A and 5, the second flange 76 of one arcuate portion 58 is received within the first flange 74 of another, adjacent arcuate portion 58 so that the inner surfaces 90 and 94 of the two flanges 74 and 76 cooperate to define the socket 78 therein.

As best shown in FIG. 5, the column assembly 12 is constructed by mating the flanges 74 and 76 in this manner and inserting reinforcing rods 96 into each of the defined sockets 78. The insertion of the reinforcing rods 96 abut the centering flanges 88 on each of the flanges 74 and 76 to urge the flanges 74 and 76 against one another. A firm mounting of the adjacent lateral edges 70 and 72 of adjacent arcuate portions 58 is thereby achieved. Glides 98 for supporting the column assembly 12 above the floor surface 14 can be mounted within the socket 78 adjacent a lower edge of the column assembly 12 as shown in FIG. 5. It can be shown the interengagement of a nub 100 on the second leg 84 of the first flange 74 fits within a groove 102 adjacent to the second lateral edge 72 of the adjacent arcuate portion 58 to prevent disengagement of the first and second flanges 74 and 76 when the reinforcing rod 96 is inserted within the socket 78 defined between the first and second flanges 74 and 76, respectively.

The arcuate portions 58 provide substantial structural integrity for the column assembly 12 which, in turn, eliminates the need for bracing located within an interior region 104 defined by the interconnected arcuate portions 58 which, further in turn, increases the available volume of the interior region 104 for accommodating electrical/data conduit 40 therein and therethrough.

While the column assembly 12 has been disclosed as comprising a plurality of interconnected arcuate portions 58, it is likewise contemplated that the column assembly 12 could be fabricated from an extruded unitary piece of metal, preferably aluminum, or synthetic resin. It will be understood, of course, that any known sufficiently rigid and strong material can be used to fabricate the column assembly 12 without departing from the scope of this invention. The insertion of the reinforcing rod 96 into the socket 78 defined by the flanges 74 and 76 reduces any "play" between the interlocked arcuate portions 58 to provide additional rigidity to the column assembly 12.

When a light fixture 20 is not applied onto a column assembly 12, a columntop trim cover 56 can be frictionally secured atop the plurality of interlocked arcuate panels 58. Although not shown, it is contemplated that any electrical and/or data conduit 40 that runs through the column assembly 12 can be controllably positioned 10 by brackets, as illustrated in FIGS. 32–40.

Figure 7:
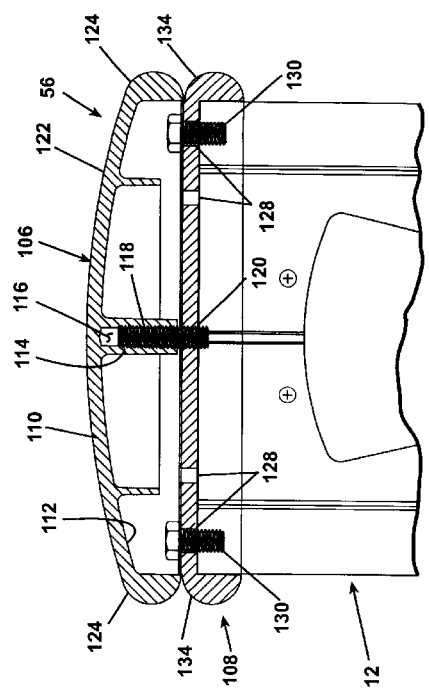
Figure 6:
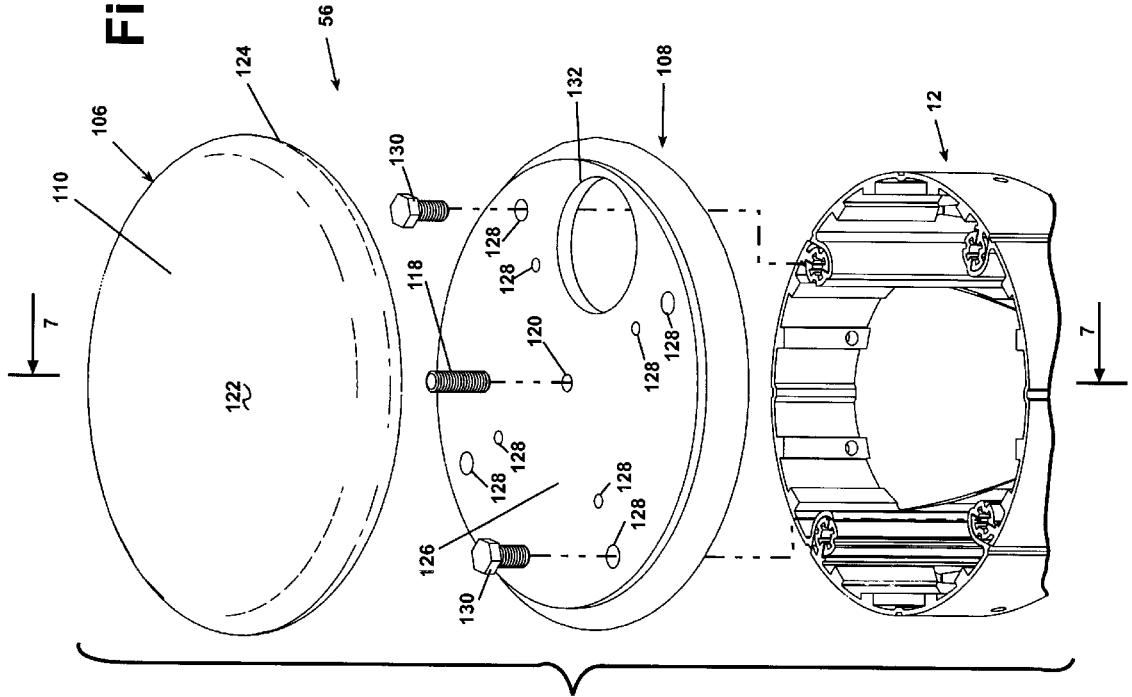
FIG. 6 is an exploded perspective view of a top portion of the column assembly of FIGS. 1–5 provided with a top trim cover comprising an upper portion and a lower portion for providing an aesthetically-pleasing upper surface to the FIG. 7 is a cross-sectional view of the top trim cover taken along lines 7—7 of FIG. 6.

FIGS. 6–7 show the column-top trim cover 56 in greater detail comprising an cap 106 and a trim ring 108 for providing an aesthetically-pleasing upper surface to the column assembly 12 when a column-top light fixture 20 is not employed.

The cap 106 comprises a generally circular member 110 having an underside 112 with a depending central boss 114 with a generally vertically-oriented threaded bore 116 adapted to receive a conventional threaded shaft 118 for engaging a complimentary tapped bore 120 aligned co-axially in an upper portion of the trim ring 108. The engagement of the threaded shaft 118 within the aligned bores 116 and 120 allows the cap 106 to be attached to the trim ring 108 independently and removed independently of the attachment of the trim ring 108 to a column assembly 12.

The cap 106 can be provided with an aesthetically pleasing upper surface 122 while the underside 112 can be provided with a rounded peripheral flange 124 which extends from the underside 112 to the upper surface 122. The peripheral flange 124 has the purpose of providing a smooth transition from the cap 106 provided around the exterior of the column assembly 12 to an upper surface 126 of the trim ring 108 so that the column assemblies 12 have a smooth exterior appearance.

The upper surface 126 of the trim ring 108 can also include a plurality of threaded mounting apertures 128 some of which are preferably aligned with the socket 78 defined by the flanges 74 and 76 of the interengaged arcuate portions 58 of the column assembly 12. Conventional threaded fasteners 130 can be mounted within the aligned apertures 128 and sockets 78 to mount the trim ring 108 to the upper portion of the column assembly 12. The trim ring 108 can have a larger opening 132 for routing electrical/data conduit 40 therethrough as needed, especially since the trim ring 108 can double for use with the column-top light fixture 20 as described below. The trim ring 108 can also include an optional peripheral flange 134 which preferably corresponds in configuration to the peripheral flange 124 on the cap 106.

Figure 9:
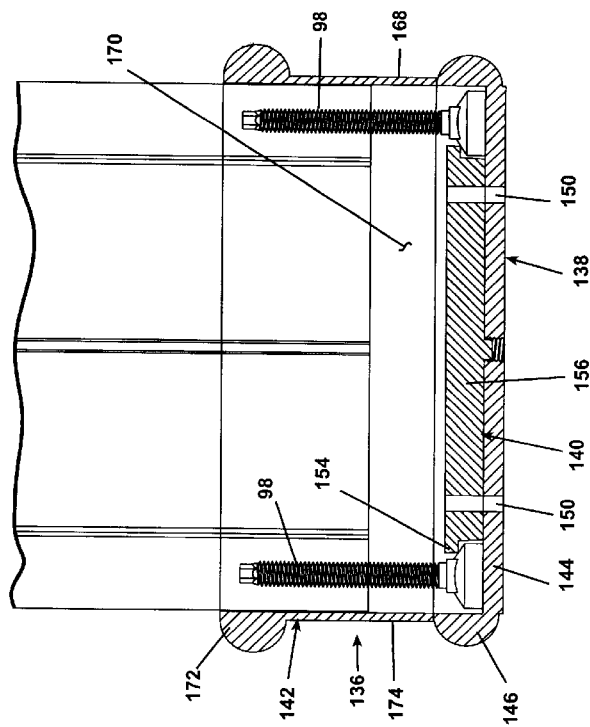
FIG. 9 is a cross-sectional view of the base trim ring assembly taken along lines 9—9 of FIG. 8.
Figure 8:
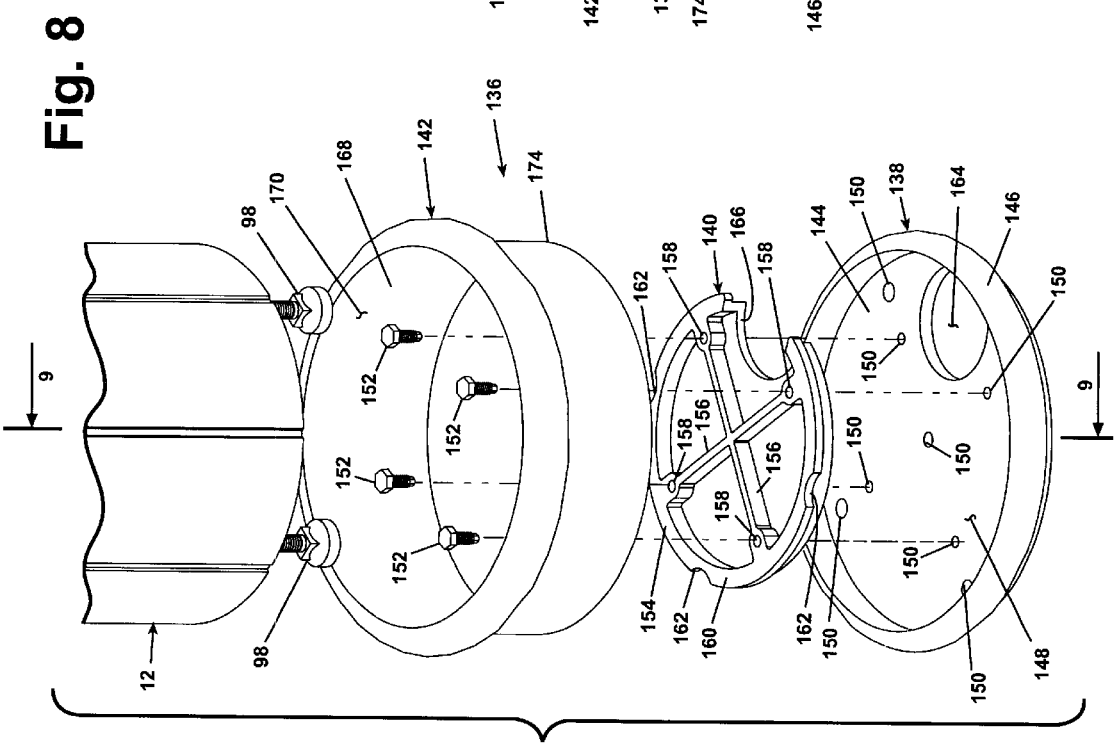
FIG. 8 is an exploded perspective view of a base trim ring assembly for the column assembly of FIGS. 1–5 comprising an anchor plate, stabilizer base, and trim ring for receiving a lower portion of the column assembly having glides mounted thereto.

FIGS. 8–9 show a base trim ring assembly 136 for the column assembly 12 comprising an anchor plate 138, stabilizer base 140, and a base trim ring 142 for receiving a lower portion of the column assembly 12 having glides 98 mounted thereto.

The anchor plate 138 of the base trim ring assembly 136 cooperates with the glides 98 on the column assembly 12 to provide a secure and stable interface between the column assembly 12 and the floor surface 14 to prevent the column assembly 12 from inadvertently tipping or sliding with respect to the floor surface 14. The stabilizer base 140 is mounted between the anchor plate 138 and the glides 98 mounted to the column assembly 12 to prevent the column assembly 12 from tipping with respect to the floor surface 14. The base trim ring 142 provides a smooth transition between a lower portion of the column assembly 12 and the floor surface 14 by covering the glides 98, stabilizer base 140 and anchor plate 138 on the floor surface 14 from view.

The anchor plate 138 of the base trim ring assembly 136 is shown in greater detail in FIG. 8 and comprises a generally planar member 144 having an upstanding peripheral flange 146 which defines an interior recess 148 therein. The planar member 144 can be provided with a several aligned spaced mounting apertures 150 adapted to receive a conventional threaded fastener 152 therein. The anchor plate 138 is preferably mounted to the floor surface by the threaded fasteners 152 which also mount the stabilizer base 140 to the anchor plate 138.

The stabilizer base 140 of the base trim ring assembly 136 comprises an annular wall 154 having a pair of cross braces 156 extending therebetween. The annular wall 154 and cross braces 156 preferably include several mounting apertures 158 which are aligned with corresponding mounting apertures 150 on the anchor plate 138. The threaded fasteners 152 can thereby be mounted within the aligned apertures 150 and 158 to mount the anchor plate 138 and stabilizer base 140 together, and optionally to the floor surface 14.

An outer edge 160 of the annular wall 154 of the stabilizer base 140 can preferably be provided with several circumferentially spaced rounded indentations 162 adapted to receive a portion of a glide 98 therein. Further, the anchor plate 138 and the stabilizer base 140 are preferably provided with an opening 164 and a cut-out portion 166, respectively, for accommodating the routing of electrical/data conduit 40 from a point adjacent to, or from within, the floor surface 14 (such as a "false" floor or other type of sub-floor surface).

A column assembly 12 provided with glides 98 can thereby rest around the annular wall 154 so that the glides 98 rest in part within the indentations 162 thereon when the stabilizer base 140 is mounted to the anchor plate 138 as previously described. The column assembly 12 is then ready to receive a base trim ring 142 to conceal the interface between the lower portion of the column assembly 12 and the floor surface 14.

The base trim ring 142 of the base trim ring assembly 136 generally comprises a cylindrical shell 168 which defines an interior recess 170 therein. A decorative peripheral flange 172 can be molded into an exterior surface 174 of the shell 168. The diameter of the recess 170 of the shell 168 is preferably generally equal to an interior diameter of the recess 148 of the anchor plate 138 so that the shell 168 of the base trim ring 142 can sit atop the peripheral flange 146 of the anchor plate 138. The base trim ring 142 thereby covers the anchor plate 138, stabilizer base 140, a lower portion of the column assembly 12, and the glides 98 to provide a smooth transition between the column assembly 12 and the floor surface 14.

FIGS. 10–13 show a half-column assembly 50 comprising a plurality of the arcuate column portions 58 mounted to a rear plate 176 aligned in a generally semicircular configuration. The arcuate portions have been referred to with reference numeral 58 because they are configured as shown above and described with respect to the column assembly 12 in FIGS. 1–5.

The rear plate 176 comprises an elongated member 178 having several spaced openings 180 thereon. The elongated member 178 has first and second lateral edges 182 and 184, respectively. The first lateral edge 182 is provided with a first flange 70 and the second lateral edge 184 is provided with a second flange 72. The first and second flanges have been referred to with reference numerals 70 and 72 because they are configured as shown above with respect to the arcuate portions 58 of the column assembly 12 of FIGS. 1–5.

The assembly of the arcuate portions 58 to the rear plate 176 for the halfcolumn assembly 50 is accomplished with the reinforcing rods 96 as described above by insertion into the socket 78 defined between the flanges 70 and 72 between the arcuate portions 58 and the rear plate 176 (as well as between the interface between the edges of the adjacent arcuate portions 58 opposite from the rear plate 176). Glides 98 can be mounted within the sockets 78 as shown in FIG. 12.

Figure 13:
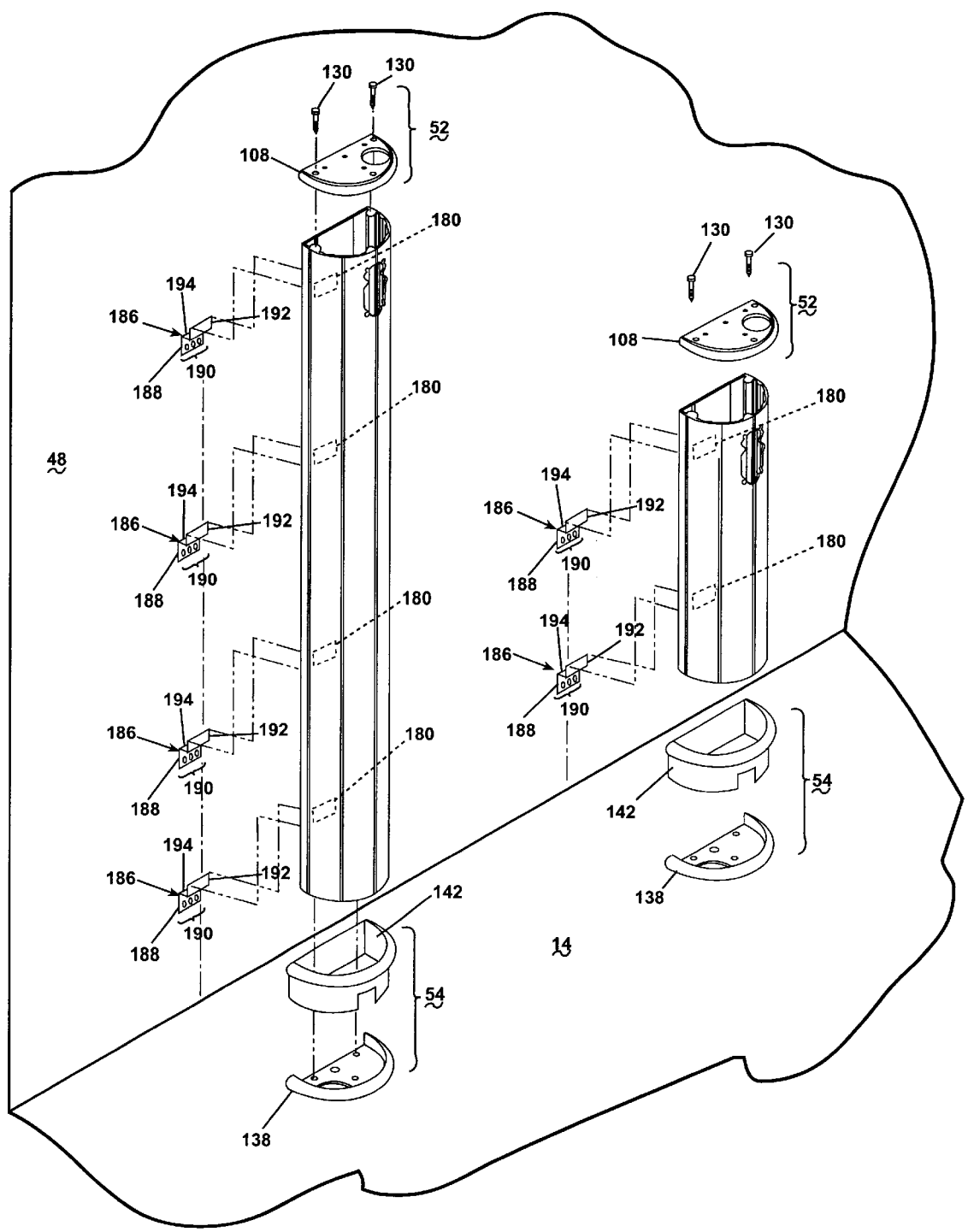
FIG. 13 is an exploded perspective view of a pair of half-column assemblies of FIGS. 10–12 of differing heights provided with mounting brackets for interengagement between an existing wall in the workspace and the rear plate portion of the half-column assembly as well as a pair of top trim ring and base trim ring assemblies as shown in FIGS. 6–7 and 8–9, respectively.

FIG. 13 shows a pair of assembled half-column assemblies 50 of differing heights provided with mounting brackets 186 for interengagement between the existing wall 48 in the workspace and the rear plate 176 of the half-column assembly 50. The mounting bracket 186 comprises a first plate 188 having mounting apertures 190 adapted to receive conventional fasteners (not shown) for mounting the bracket 186 to the wall 48. It will be understood that as many brackets 186 can be mounted to the wall 48 as are needed for supporting the half-column assembly 50 as needed, however, the brackets 186 should be mounted so as to align with the openings 180 in the rear plate 176.

The bracket 186 also includes a second plate 192 offset from the first plate 188 by a web 194. To mount the half-column assembly 50 to the wall 48, the spaced brackets 186 are mounted to the wall 48 at regular intervals corresponding to the spacing of the openings 180 in the rear plate 176. The rear plate 176 is then "hung" on the second plate 192 and web 194 of the brackets 186 by insertion of the openings 180 on the rear plate 176 thereon.

FIGS. 13 also shows a half-column top trim ring assembly 52 and a halfcolumn base trim ring assembly 54 configured substantially similar to, and having the same function as, the column-top trim ring assembly 56 and the base trim ring assembly 136, respectively. In fact, sub-components of the trim ring assemblies 52 and 54 for the half-column assembly 50 have been numbered the same as corresponding subcomponents of the column-top trim ring assembly 56 and the base trim ring assembly 136, respectively, for convenience and clarity purposes.

FIGS. 14–15 show the overhead beam assembly 16 shown in FIG. 1 in greater detail comprising first and second beams 200 and 202 mounted to one another, a pair of beam support brackets 204 located at each end thereof, and a pair of lateral beam covers 206. An optional upwardly-directed lamp 208, reflector 210, and a lens/diffuser 212 can be provided thereon for providing "soft" or ambient lighting to the surroundings in the workspace.

The first beam 200 comprises a Y-shaped member defined by a pair of angularly-disposed upper walls 214 which terminate in a horizontally-oriented lower central wall 216. The central wall 216 preferably includes an inverted U-shaped flange 218 adapted to receive an upper edge 220 of the second beam 202. The walls 214 and 216 cooperate to define an upper chamber 222 therebetween. In particular, the upper channel 222 is provided for routing electrical/data conduit 40 or for housing lighting such as the lamp 208 which can be any conventional fluorescent, bulb or other lighting which can be conveniently mounted within the upper chamber 222.

The second beam 202 comprises a vertically-oriented wall 224 depending from the upper edge 220 thereof which includes a lower vertical flange 226. The flange 226 has a vertical bore 228 extending therein from an underside of the flange 226 to allow for accessory parts such as lighting, blinds, window panels, wall panels and other hanging components to be mounted therein and hang downwardly from the overhead beam 16. An H-shaped flange 230 defined by a horizontal wall 232 and a pair of distal vertical walls 234 extends outwardly from the flange 226. Each of the vertical walls 234 has an outwardly-extending angular flange 236 thereon adapted to receive a portion of a corresponding lateral beam cover 206. An intermediate channel 238 is defined on either side of the vertical wall 234 for routing additional electrical/data conduit 40.

The flange 218 on the underside of the central wall 214 of the first beam includes several spaced mounting apertures 240 and the vertical wall 234 of the second beam 202 also includes several spaced mounting apertures 242 in alignment with the apertures 240 in the first beam 200. Conventional fasteners can be mounted within the aligned mounting apertures 240 and 242 to securely mount the first beam 200 atop the second beam 202 to form the overhead beam 16.

Upper ends of the angular walls 214 of the first beam 200 are provided with slotted fastener retainers 246 (such as the elongated C-shaped receptacle shown in FIGS. 14–15) adapted to securely receive a threaded fastener therein. Similarly configured retainers 246 are provided adjacent to the intersection between the horizontal wall 232 of the H-shaped flange 230 at a lower end of the second beam 202 and each of the vertical walls 234. A groove 248 extends along the upper edge of the angular walls 214 of the first beam 200 adapted to receive an edge of the lens/diffuser 212.

The beam support bracket 204 comprises a rim 250 shaped to generally conform to the cross-section of the overhead beam 16 having an opening 252 therein which communicates with the intermediate chambers 238 and the upper chamber 222. Several mounting apertures 254 are formed in the rim 252, preferably aligned with the retainers 246 on the first and second beams 200 and 202. Fasteners 256 are mounted through the apertures 254 and into the retainers 246 to mount the beam support brackets to each end of the assembly of the first and second beams 200 and 202. Once secured to the beams 200 and 202, the bracket 204 serves as a mount between the overhead beam assembly 16 and a column assembly 12 of the present invention. Electrical and/or data conduit 40 can be routed between the interior region 104 of the column assembly 12 and the chambers 222 and 238 of the overhead beam 16 through the opening 252 in the beam support brackets 204 as needed.

The lateral beam cover 206 comprises an elongated panel 258 having a lower edge 260 provided with a mounting clip 262 provided integrally with an interior surface 264 of the panel 258.

FIG. 15 shows a cross section of an assembled overhead beam assembly 16. A pair of lateral beam covers 206 is shown mounted to either side of the first and second beams 200 and 202 by inserting the mounting clip 262 of each cover 206 upon a corresponding angular flange 236 on each vertical wall 234 located at a lower portion of the second beam 202. The covers 206 cooperate with interior surfaces of the first and second beams 200 and 202 to define outer limits for the intermediate chambers 238 located on either side of the vertically-oriented wall 224 of the second beam 202.

The assembly of the first and second beams 200 and 202 and the beam support brackets 204 mounted to each end thereof by fasteners 256 is mounted to a corresponding column assembly by aligning a set of second mounting apertures 266 on the beam support brackets 204 with a corresponding set of aligned mounting apertures 268 on an arcuate portion 58 of a column assembly 12, 50.

As can be seen from FIGS. 3–5 and 18–20, each of the arcuate portions 56 of the column assembly configurations 12, 50 can be provided with the mounting apertures 268 around a first port 270 and mounting apertures 272 around a second port 274. Preferably, several ports 270 and 274 are provided generally at the vertical height of the overhead and intermediate height beam assemblies 16 and 18, respectively. The ports 270 and 274 are preferably provided around the circumference of the column assembly 12, 50 at common radial intervals such as 45 degrees, 90 degrees, 120 degrees, 135 degrees 180 degrees, etc.

Thus, rather than manufacture several specially-configured column assemblies 12 for the workspace definition system 10, one or a few column assemblies 12 can be configured to receive the overhead and intermediate beam assemblies 16 and 18 at regular radial intervals. If the column assembly 12 is formed as a series of arcuate portions 58 as previously described, the arcuate portions 58 can be arranged to align the ports 270 and 274 in the desired angular spacing as needed. In addition, "blank" arcuate portions 58 not provided with the ports 270 and 274 can also be employed to create a column assembly 12 without facility for interconnection with the beam assemblies 16 and 18. Further, combinations of the apertured arcuate portions 56 having the ports 270 and 274 can be interconnected to blank arcuate portions not having the ports 270 and 274 to provide a column assembly 12 with ports 270 and 274 only at a desired angular spacing without requiring concealment of any ports 270 and 274 not interconnected to a beam assembly 16 or 18.

FIGS. 16–17 show the intermediate beam assembly 18 of FIG. 1 in greater detail comprising an elongated beam 276, a pair of beam support brackets 278 at each end thereof, and a pair of lateral beam covers 280 having optional apertures 282 for receipt of electrical socket blanks and covers 284.

The elongated beam 276 is a generally I-shaped member comprising a vertical wall 286 having upper and lower rounded horizontal walls 288 and 290, respectively. An intermediate wall 292 extends laterally from each side of the vertical wall 286 between the upper and lower walls 288 and 290 Distal ends 294 of the intermediate wall 292 are provided with an upturned end so that upper chambers 296 are defined on either side of the vertical wall 286 between the upper wall 288 and the intermediate wall 292 to create a bed-type channel for the routing of electrical/data conduit 40. Lower chambers 298 are defined on either side of the vertical wall 286 between the intermediate wall 292 and the lower wall 290 to create a channel for the routing of electrical/data conduit 40 as well.

The vertical wall 286 and the lower chamber 298 cooperate to define a mounting area for supporting electrical components such as sockets and data ports. The intermediate wall can be provided with several cut-out portions 300 to allow electrical/data conduit 40 to be routed between the upper and lower chambers 296 and 298 on one side of the vertical wall 286. Further, the vertical wall 286 is provided with openings 302 spaced along the longitudinal length thereof, preferably interconnecting the lower chambers 298 on either side of the vertical wall 286, provided for mounting an electrical block as will be further described below. Mounting apertures 304 are located directly adjacent the opening 302. The lower wall 290 is provided with distal ends 320 having upturned ends with angular flanges 322 thereon adapted to receive a portion of a corresponding lateral beam cover 280.

Distal ends of an underside of the intermediate wall 292 are provided with slotted fastener retainers 246 (similar to those found on the overhead beam of FIGS. 14–15 and also referred to with reference numeral 246) adapted to securely receive a threaded fastener therein. Similarly configured retainers 246 are provided on an upper surface of the lower wall 290 adjacent the upturned ends thereof.

The beam support bracket 278 for the intermediate beam 16 comprises a rim 306 shaped to generally conform to the cross-section of the intermediate beam 16 having an opening 308 therein which communicates with the upper and lower chambers 296 and 298. A first set of mounting apertures 310 are formed in the rim 306, preferably aligned with the retainers 246 on the intermediate and lower walls 292 and 290, respectively. Fasteners 312 are mounted through the apertures 310 and into the retainers 246 to mount the beam support brackets 278 to each end of the elongated member 276.

Once secured to the elongated beam 276, the bracket 278 serves as a mount between the intermediate beam assembly 18 and a column assembly 12 of the present invention. Electrical and/or data conduit 40 can be routed between the interior region 104 of the column assembly 12 and the upper and lower chambers 296 and 298 of the intermediate beam 18 through the opening 308 in the beam support brackets 278 as needed.

The lateral beam cover 280 comprises an elongated panel 314 having a lower edge 316 provided with a mounting clip 318 provided integrally with an interior surface 264 of the panel 258. The elongated panel 314 has several spaced apertures 282 which are adapted to receive a socket bezel 320 of the electrical socket covers 284. The bezel provides a frame for the apertures 282 to allow a user of the workspace definition system 10 to access electrical components mounted to the interior of the intermediate beam assembly.

FIG. 17 shows a cross section of an assembled intermediate beam assembly 18. A pair of lateral beam covers 280 is shown mounted to either side of the elongated member 276 by inserting the mounting clip 318 of each cover 280 upon a corresponding angular flange 322 on each lower wall 290. The covers 280 cooperate with interior surfaces of the elongated beam 276 to define outer limits for the upper and lower chambers 296 and 298 located on either side of the vertical wall 286 of the elongated beam 276.

The assembly of the elongated beam 276 and the beam support brackets 278 mounted to each end thereof by fasteners 312 is mounted to a corresponding column assembly 12, 50 by aligning a set of second mounting apertures 324 on the beam support brackets 278 with a corresponding set of aligned mounting apertures 272 on an arcuate portion 58 of a column assembly 12, 50.

Interconnecting various combinations of the first and second embodiments of the beam support brackets 204 and 278, respectively, around a particular column assembly 12, 50 can allow for the overhead and intermediate beam assemblies 16 and 18, respectively, to be interconnected to a column assembly 12, 50 in a wide variety of configurations. Depending upon the particular configuration of the column assembly 12, 50, the angular spacing of the ports 270 and 274, the predetermined height of various column assemblies 12, 50, the mounting of none, one or both of the overhead and intermediate beam assemblies 16 and 18, a large number of variations can be configured for the workspace definition system 10.

For example, one or both of the overhead and intermediate beam assemblies 16 and 18 can be mounted to a particular column assembly at any angle, including 45-, 90-, 135-, and 180-degrees by mounting the corresponding beam support bracket 204, 278 on the beam assembly 16, 18 to the column assembly 12, 50 with appropriate fasteners. The chambers of the beam assembly 16, 18 can thereby communicate with the interior region 104 of the column assembly 12, 50 to allow for easy routing of electrical/data conduit throughout the system.

In any of these configurations and many others contemplated but not described in detail here due to the sheer number of permutations of the components of the system 10, the overhead and intermediate beam assemblies 16 and 18 can be mounted in a variety of configurations to produce any desired functional and aesthetically pleasing effect within the workspace to be defined by the workspace definition system 10.

Figure 18:
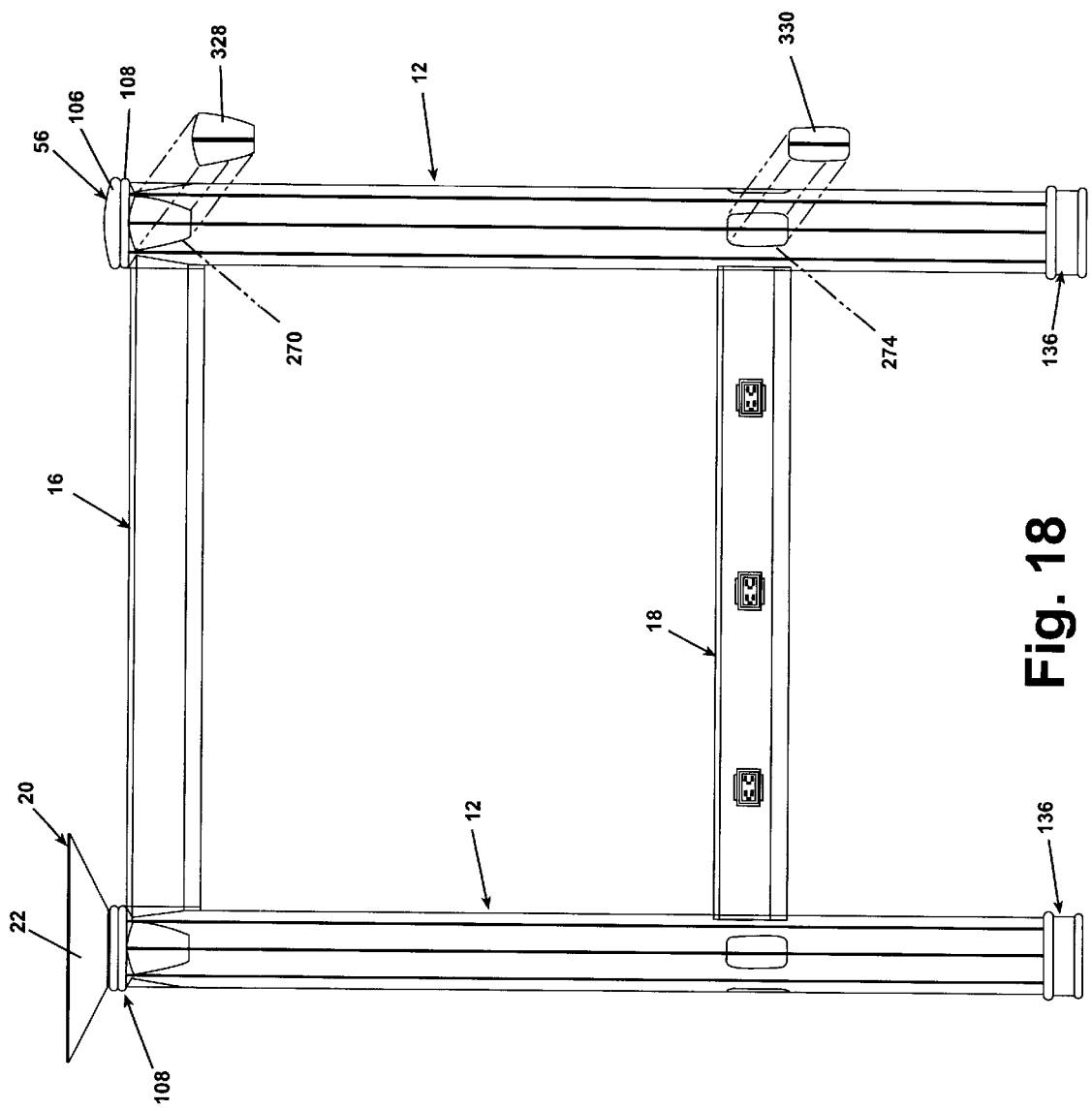
FIG. 18 is a side, elevational view of a portion of the column-based workspace definition system showing a pair of column assemblies interconnected by an overhead beam assembly and an intermediate height beam assembly with a column-top light fixture above one of the column assembly whereby the column assemblies have several ports at the height of the overhead and intermediate height beam assemblies concealed by overhead and intermediate height covers.
Figure 19:
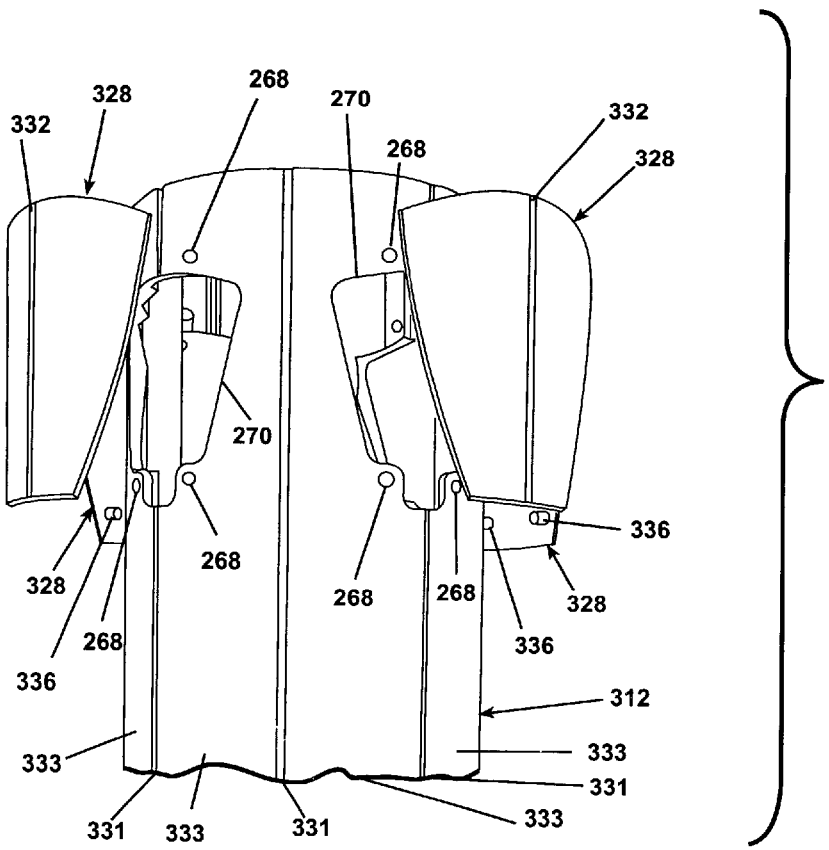
FIG. 19 is an exploded, perspective view of a column assembly of FIG. 18 showing the overhead covers aligned with corresponding ports in an overhead height portion of the column assembly.
Figure 20:
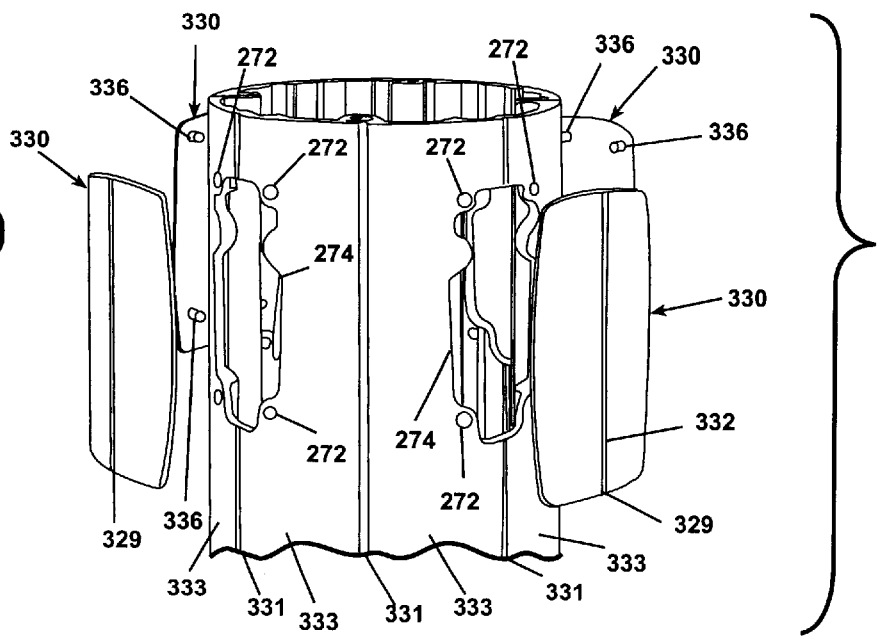
FIG. 20 is an exploded, perspective view of a column assembly of FIG. 18 showing the intermediate height covers aligned with corresponding ports in an intermediate height portion of the column assembly.

FIG. 18 shows one sample configuration of a pair of same-height column assemblies 12 interconnected by an overhead beam assembly 16 and an intermediate beam assembly 18. The overhead and intermediate beam assemblies 16 and 18 are mounted between the column assemblies 12 in a manner as previously described.

To the extent that a particular port 270 or 274 does not receive an overhead or intermediate beam assembly 16 or 18 in a particular layout of the workspace definition system 10, each of the unused ports 270 and 274 can be concealed with a cover 328 and 330, respectively. The covers 328 and 330 preferably are configured to correspond in shape, curvature and outward aesthetic appearance to the outer surface of the arcuate portions 56 of the column assembly 12, 50. The covers 328 and 330 can thereby be mounted over a particular port 270 and 274, respectively, so that the outward visual appearance of the column assembly 12 is not interrupted by the presence of the covers 328 and 330.

For example, the covers 328 and 330 can be provided with a vertical groove 332 aligned with at least one of the grooves 68 on the exterior surface of the arcuate portions 58 of the column assembly 12. The groove 68 on the column assembly 12 can be a result of the formation of the column assembly 12 as a plurality of arcuate portions 58 whereby the groove 68 is a seam between adjacent arcuate portions 58.

Figure 21:
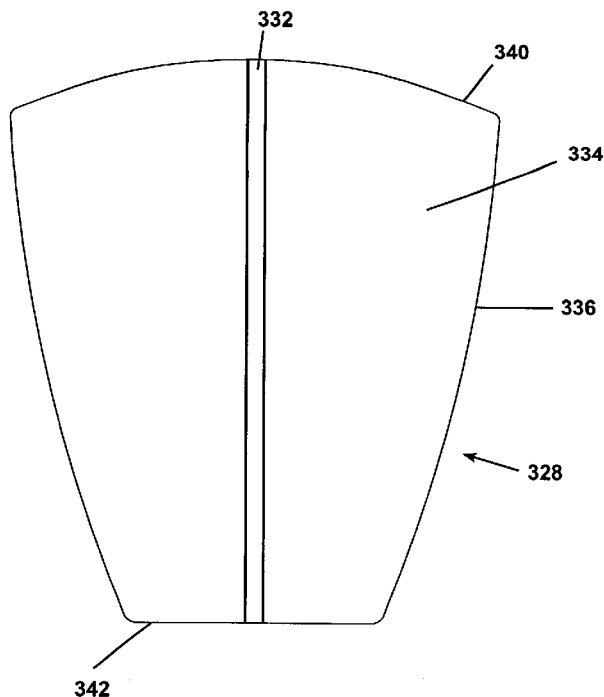
FIG. 21 is a front elevational view of the overhead height cover of FIG. 18.
Figure 23:
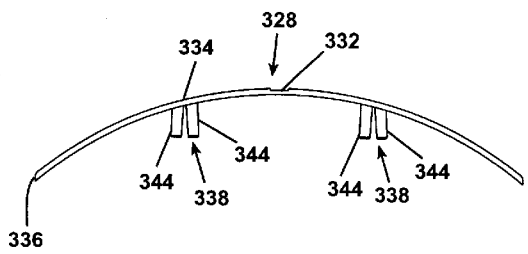
FIG. 23 is a top plan view of the overhead height cover of FIG. 18.
Figure 22:
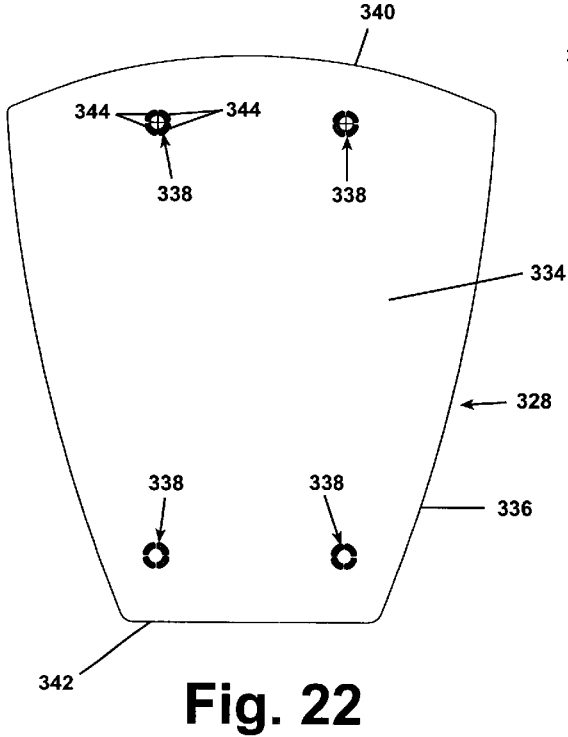
FIG. 22 is a rear elevational view of the overhead height cover of FIG. 18.

FIGS. 21–23 show various views of the cover 328 for use at the overhead height portion of the column assembly 12. The cover 328 comprises a body 334 having a perimeter 336 corresponding to the general outline of the beam corresponding to the port 270 on the column assembly 12. Several mounting studs 338 are provided in a spaced relationship on a rear surface of the body 334 and preferably adjacent upper and lower edges 340 and 342, respectively, thereof.

FIGS. 24–26 show various views of the cover 330 for use at the intermediate height portion of the column assembly 12. It will be understood that the cover 330 is configured similarly to the cover 328, but that the perimeter 336 of the cover 330 corresponds to the general outline of the port 274, rather than to the shape of port 270. The cover 330 of FIGS. 24–26 is referred to with reference numerals common to the cover 328 shown in FIGS. 21–23.

Figure 44:
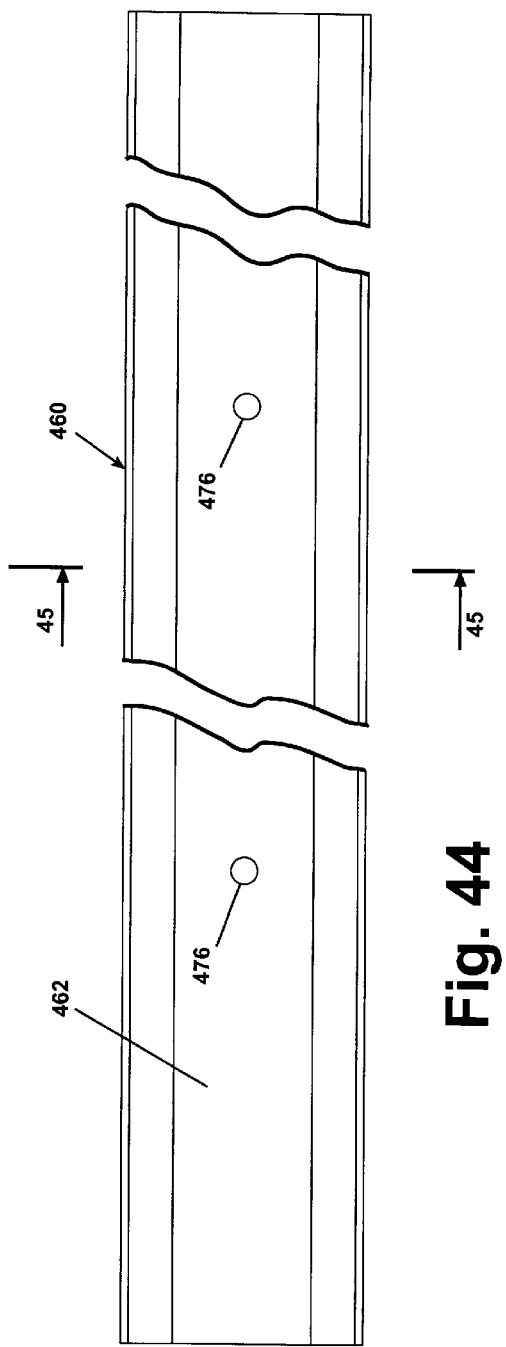
FIG. 44 is a fragmentary elevational view of the adapter rail of FIG. 43.

The mounting studs 338 generally comprise a plurality of resilient spring arms 344 having a collectively radially-increasing diameter therefor. The spring arms 344 of the mounting stud 338 for each of the covers 328 and 330 are shown in much greater detail in FIGS. 27–28. The spring arms 344 each preferably extend outwardly from the body 334 so that a distal end 346 thereof extends laterally a greater extent than a proximate end 348. As shown in FIG. 44, the spring arms 344 are arranged in a generally circular fashion with tangential gaps 350 defined between adjacent lateral edges of successive spring arms 344. A central gap 352 is defined in the interior of the mounting stud 338.

In use, the ports 270 and 274 receive ends of the overhead and intermediate beam assemblies 16 and 18 as previously described. To the extent that one or more of the ports 270 and 274 do not receive one of the beam assemblies 16 and 18, a corresponding cover 270 or 274 is mounted over the corresponding port 270, 274. The sets of mounting apertures 268 and 272 adjacent the periphery of each port 270, 274 are preferably located in a spaced relationship in register with the mounting studs 338 on the corresponding cover 328 and 330.

The mounting of the cover 328 or 330 to their respective port 270 or 274 is accomplished by press-fitting the mounting studs 338 of the particular cover 328, 330 within the mounting apertures 268, 272. The spring arms 344 compress within the gaps 350 and 352 as they are inserted within the aperture 268 due to the resiliency thereof. Once the spring arms 344 are urged within the corresponding mounting aperture 268 to a sufficient extent, the arms 344 resiliently return toward their undeformed state. The angular configuration of the spring arms 344 retains the cover 328, 330 against the column assembly 12, thus concealing the port 270, 274.

Figure 29:
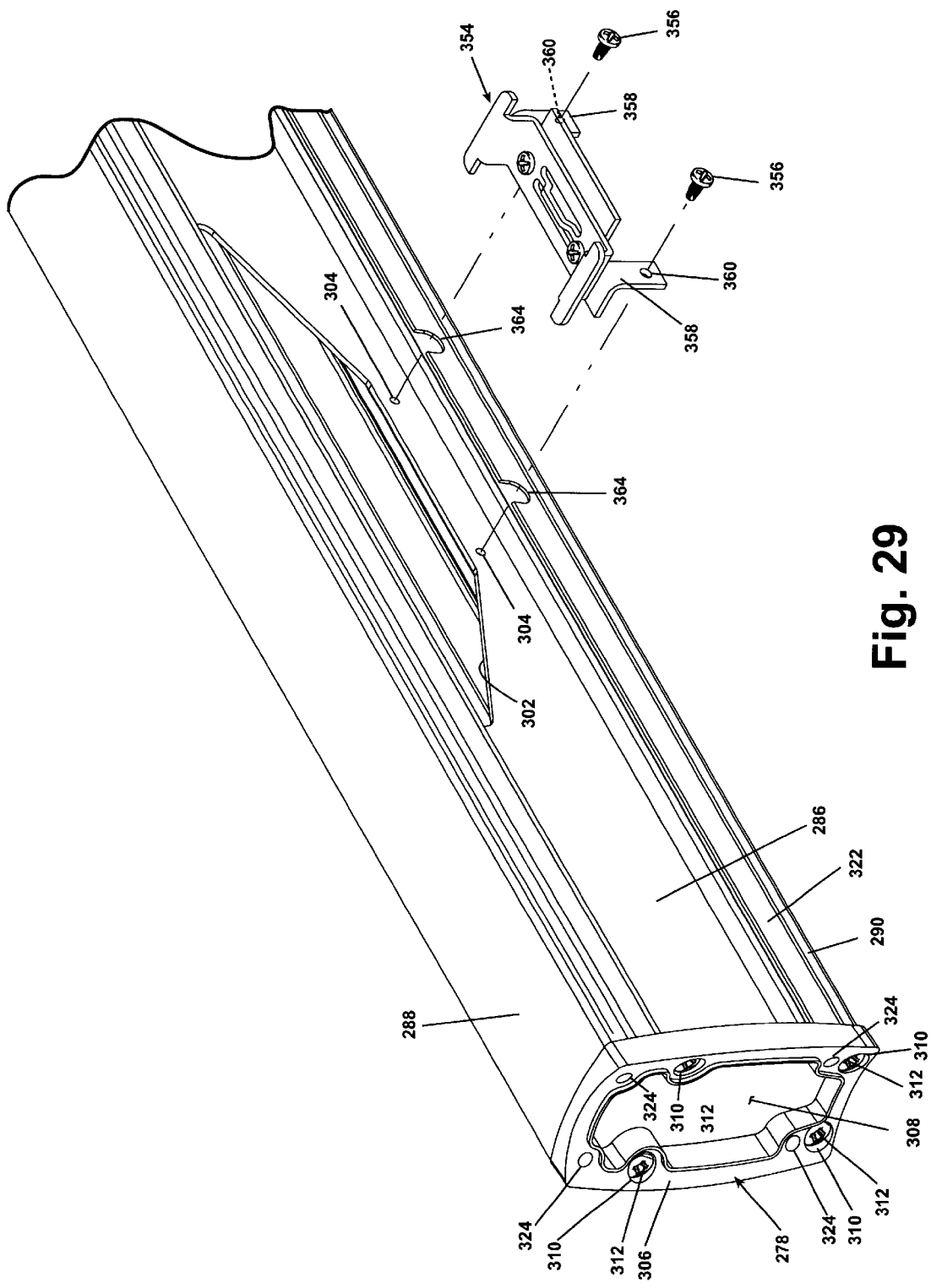
FIG. 29 is a fragmentary, perspective view of an intermediate beam of the column-based workspace definition system of FIG. 1 showing a first step of mounting electrical components thereto wherein a bracket is mounted to mounting apertures of the intermediate beam.
Figure 30:
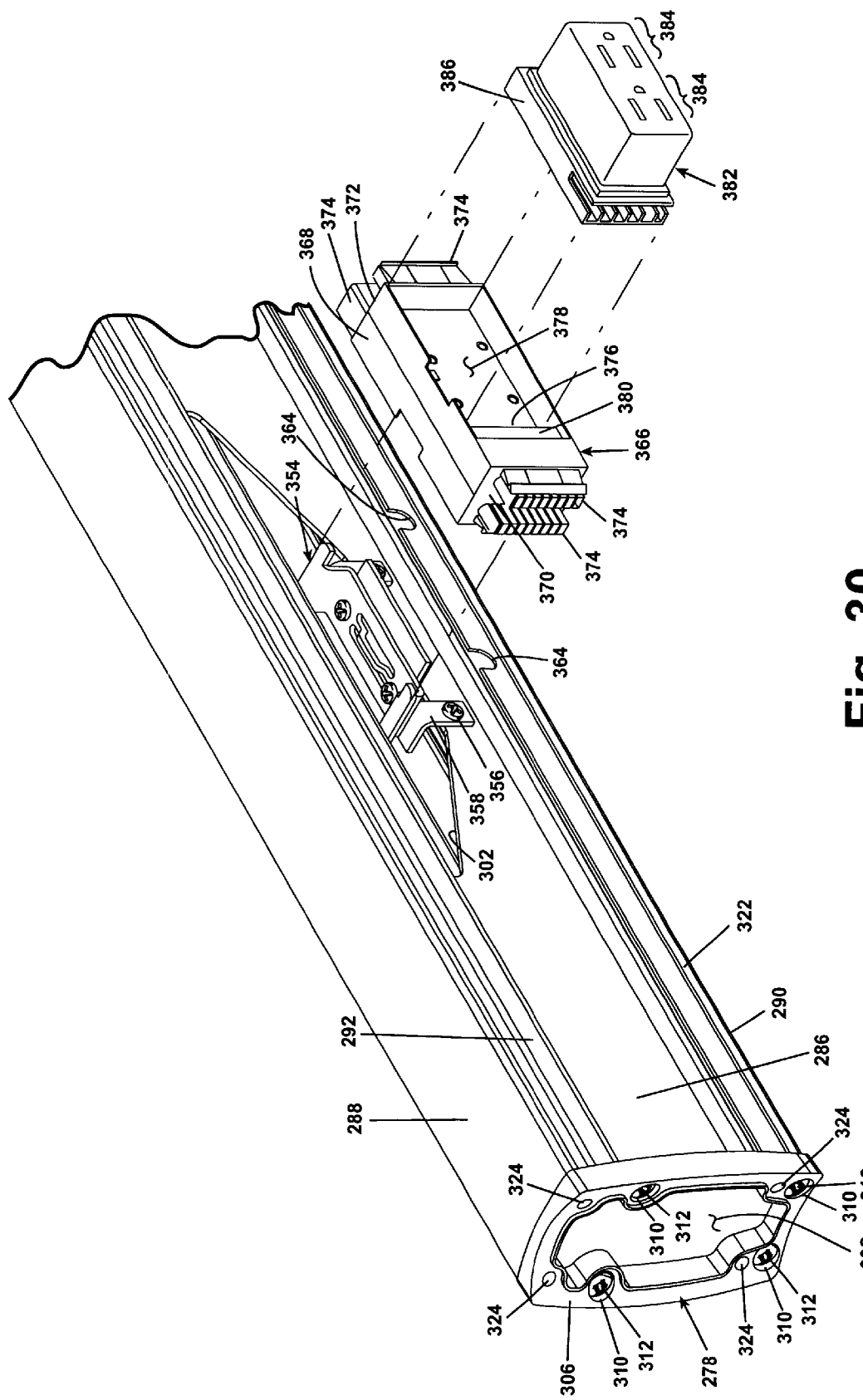
FIG. 30 is a fragmentary, perspective view of the intermediate beam of FIG. 29 showing a second step of mounting electrical components thereto wherein a electrical block and socket module are aligned with the mounting bracket of FIG. 28 mounted to the intermediate beam.
Figure 31:
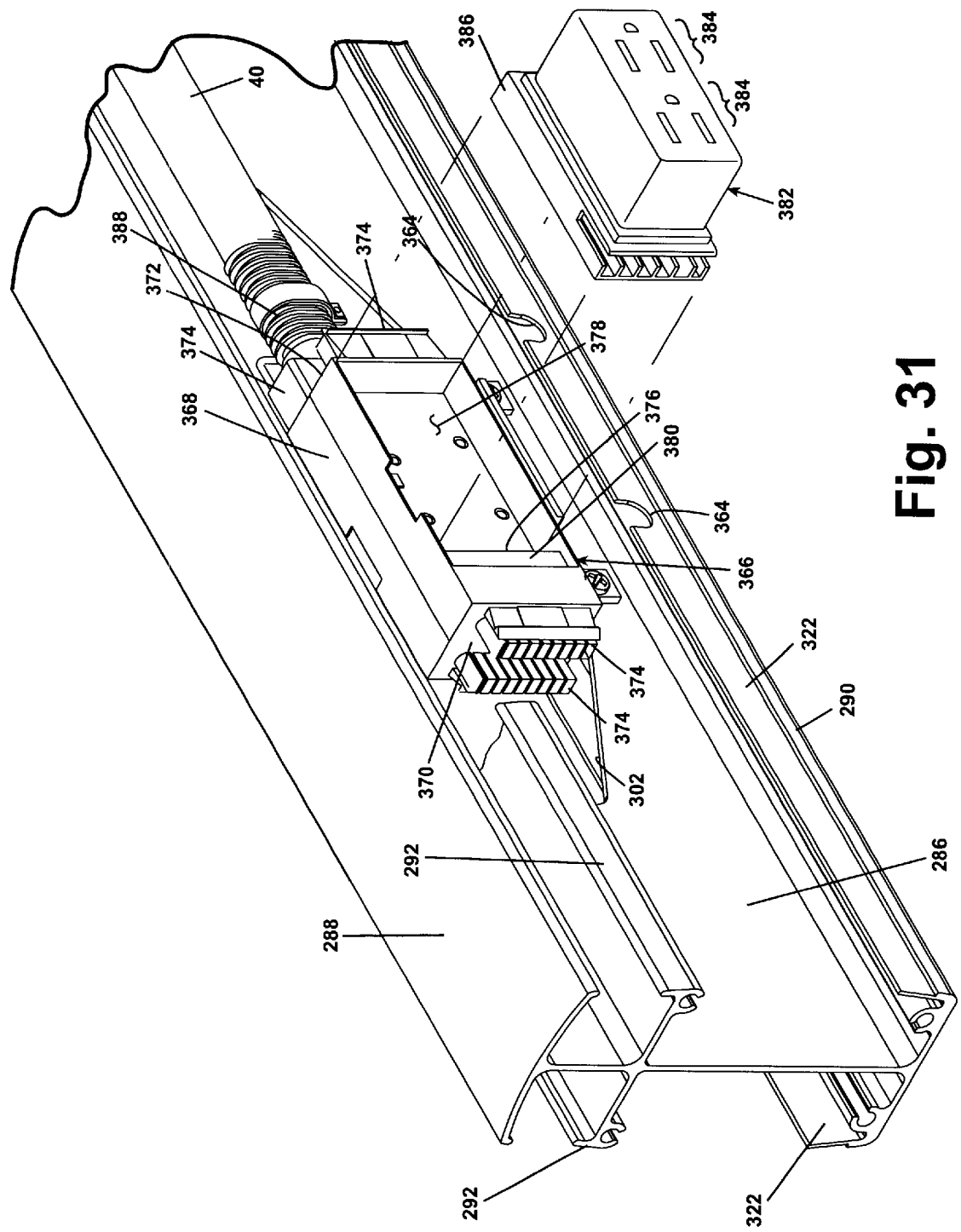
FIG. 31 is a fragmentary, perspective view of the intermediate beam of FIG. 30 with the beam covers removed for clarity showing a third step of mounting electrical components thereto wherein the electrical block has been mounted to existing electrical conduit and the socket module is aligned for insertion into the electrical block.

As was previously described, the workspace definition system 10 provides for easy access to electrical and data ports throughout the system 10. FIGS. 29–31 detail the mounting of an electrical block within one of the overhead and intermediate beam assemblies 16 and 18. It will be understood that the bracket for mounting the electrical block to the beam assembly is part of the inventive features of the system 10, however, the electrical block itself is a commercially available item such as the Power Pac 4 system available from Byrne Electric Corporation so that the structure and operation of the electrical block is not described in great detail herein.

Although the mounting of the electrical block is shown in FIGS. 29–31 with respect to the intermediate beam assembly 18, it is contemplated that the overhead beam assembly 16 could be modified to include the electrical block as well without departing from the scope of this invention.

FIG. 29 shows an intermediate beam assembly 18 of the column-based workspace definition system 10 provided with a bracket 354 is mounted with fasteners 356 to the mounting apertures 304 of the intermediate beam assembly 18. The bracket 354 preferably has a pair of flanges 358 with apertures 360 adapted to receive the fasteners 356 of the bracket 354. The bracket 354 also preferably has a plate 362 adapted to support an electrical/data socket component. When the bracket 354 is mounted to the mounting apertures 304 in the vertical wall 286 of the intermediate beam assembly 18, the plate 362 of the bracket 354 is preferably in register with the opening 302.

The distal ends 320 of the lower wall 290 are preferably provided with rounded indentations 364 in vertical alignment with the mounting apertures 304 in the vertical wall 290 of the intermediate beam assembly 18. The rounded indentations 364 permit easy access of a tool such as a screwdriver or drill bit to drive the fasteners 356 into the mounting apertures 360 and 304 without requiring the installer to uncomfortably or inconveniently angle or tilt the tool.

FIG. 30 shows an electrical block 366 aligned with the mounting bracket 354 described with respect to FIG. 28. The electrical block 366 generally comprises a two-sided housing 368 wherein it will be understood that a description will be made of one side of the housing 368 that is entirely applicable to the opposite side of the housing 268 (which is identical thereto). Further, this description relates to the interconnection of electrical components to the workspace definition system 10, however, equivalent modules, jacks, network cable and other necessary telephone and/or data routing equipment can easily be substituted for the electrical components discussed herein.

The housing 368 has first and second ends 370 and 372 each provided with conventional quick-connect terminals 374 adapted to receive a connector (not shown in FIG. 30) on a length of electrical/data conduit 40. A central wall 376 extends between the first and second ends 370 and 372 which defines a recess 378. A quick connect receptacle 380 is located within the recess 378 and is operably interconnected with the terminals 374. The housing 368 also has an appropriate mounting bracket (not shown) provided on the underside thereof for mounting to the plate 362 on the bracket 354.

A socket block 382 is also shown in FIG. 30 comprising a conventional pair of three-prong electrical sockets 384 thereon operably interconnected to a quick-connect terminal 386 on a rear surface thereof.

To make the intermediate beam assembly 18 electrically capable, the bracket 354 is mounted to the vertical wall 290 thereof so that the bracket 354 is generally horizontally positioned midway through the opening 302 in the vertical wall 290. The housing 368 of the electrical block 366 is mounted onto the plate 362 of the bracket 354 as shown in FIG. 31. An electrical/data conduit 40 routed throughout the system 10 which has a connector 388 thereon can be interconnected to one of the terminals 374 on the electrical block 366.

The socket block 382 is mounted to the electrical block 366 by angularly inserting the terminal 386 on the socket block 382 into the receptacle 380 located in the recess 378 in the electrical block 366. Once the terminal 386 on the socket block 382 is properly inserted into the receptacle 380 of the electrical block 366, the threepronged outlets 384 are operably interconnected to the electrical/data conduit 40 mounted thereto. The socket block 382 is mounted within the recess 378 of the electrical block 366.

It will be noted with reference to FIGS. 16–18 and 31 that the openings 282 of the lateral beam covers 280 are aligned with the socket blocks 382 mounted within the intermediate beam assemblies 18. To the extent that a socket block 382 is not mounted within a particular opening 302 therein via a bracket 354, an electrical socket cover 284 can be mounted within the bezel 320 in a snap-fit manner to cover the opening 282. The cover 284 also prevents unintended access to the electrical/data conduit 40 routed within the beam intermediate beam assembly 18.

FIGS. 1, 2, 18 and 32–38 show the column-based workspace definition system 10 with column assemblies 12 interconnected by one or more overhead and/or intermediate beam assemblies 16 and 18. Only a portion of the interconnected column assemblies 12 of FIG. 1 are shown for the purposes of illustrating the ability of the workspace definition system 10 to accommodate electrical and data conduit 40 throughout the interior of the column assemblies 12, overhead beam assembly 16 and intermediate beam assembly 18.

Each of the assemblies, 12, 16, and 18 have at least one interior chamber surrounded by an exterior shell or cover as will be further described so that the interior of the assemblies 12, 16, and 18 can accommodate substantial lengths and many different types of electrical/data conduit 40.

The electrical/data conduit 40 can be fed throughout the column-based workspace definition system 10 in many ways. For example, the electrical and data conduit 40 can initiate within an existing wall, floor surface 14, or ceiling of the workspace in which the workspace definition system 10 is disposed. The electrical and data conduit 40 can then be fed throughout the interior chambers of the column assemblies 12, overhead beam assemblies 16 and intermediate beam assemblies 18 to accommodate a wide variety of electrical devices.

An example of a component powered by the electrical/data conduit 40 is the track lighting shown in FIG. 1 which is shown mounted to an overhead beam assembly 16. Several conventional electrical/data ports 44, shown provided on a lateral surface of an intermediate beam assembly 18 in FIG. 2. Further, the electrical/data conduit 40 can also be interconnected with the column-top light fixtures 20, if provided, to provide power to a light source within the light fixture 20 as needed. Further illustrations of the large number of possibilities for routing electrical/data conduit 40 within the workspace definition system 10 are illustrated in FIGS. 32–38.

Figure 32:
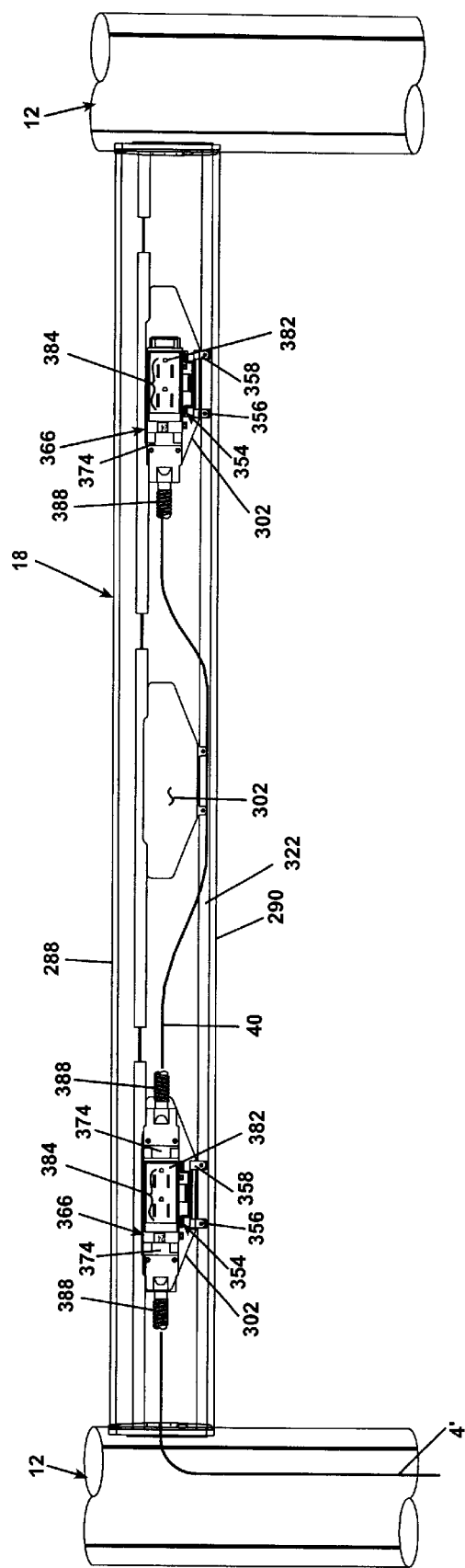
FIG. 32 is a fragmentary elevational view of a pair of column assemblies with an intermediate beam mounted therebetween having a pair of electrical socket modules operably interconnected to one another and routed throughout the column assemblies and intermediate beam showing an instance of the flexibility of routing electrical/data conduit throughout the column-based workspace definition system of FIG. 1.

FIG. 32 shows a pair of column assemblies 12 with an intermediate beam assembly 18 mounted therebetween having a pair of electrical blocks 366 operably interconnected to one another by a length of conduit 40. The conduit 40 is also routed throughout the column assemblies 12 and the intermediate beam assembly 16 showing an instance of the flexibility of routing electrical/data conduit 40 throughout the column-based workspace definition system 10. It should be noted that the intermediate beam assembly 18 shown in FIG. 32 has three openings 302 in which only two of the openings 302 have electrical blocks 366 mounted therein and one opening 302 is left empty. Thus, the possibility remains to easily add an additional electrical block 366 within the unused opening 302.

Figure 33:
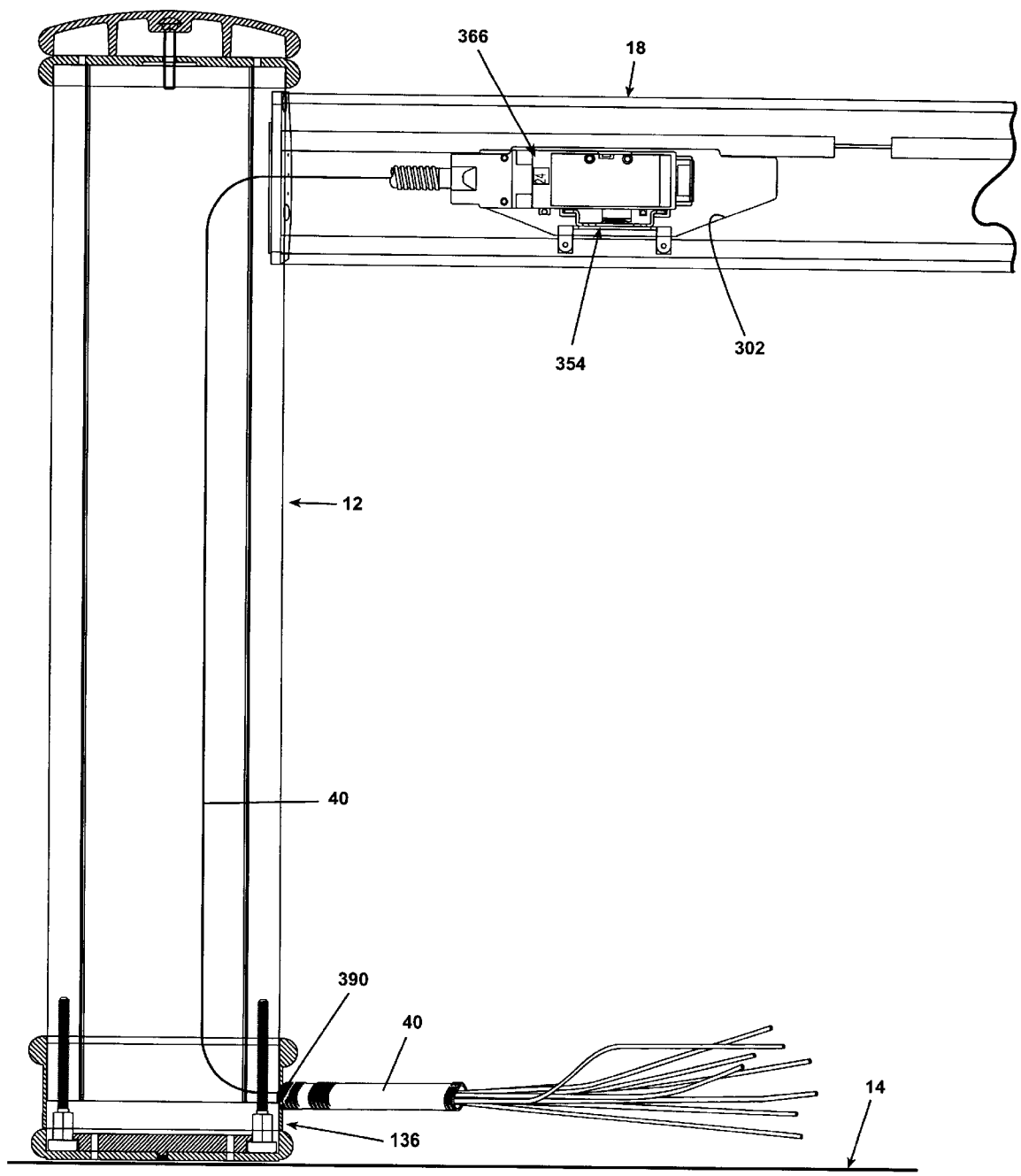
FIG. 33 is a fragmentary elevational view of a reduced-height column assembly with an intermediate beam mounted thereto having an electrical socket module operably interconnected thereto and the electrical/data conduit routed adjacent to a floor surface of the workspace.

FIG. 33 shows a reduced-height column assembly with an intermediate beam assembly 18 mounted thereto having an electrical block 366 operably interconnected thereto and the electrical/data conduit 40 being routed from adjacent to the floor surface 14 of the workspace 10. Thus, if the workspace has a subfloor or false floor, the electrical/data conduit 40 can be easily routed into the interior region 104 of the column assembly 12, such as through an opening 390 in the base trim ring assembly 136.

Figure 34:
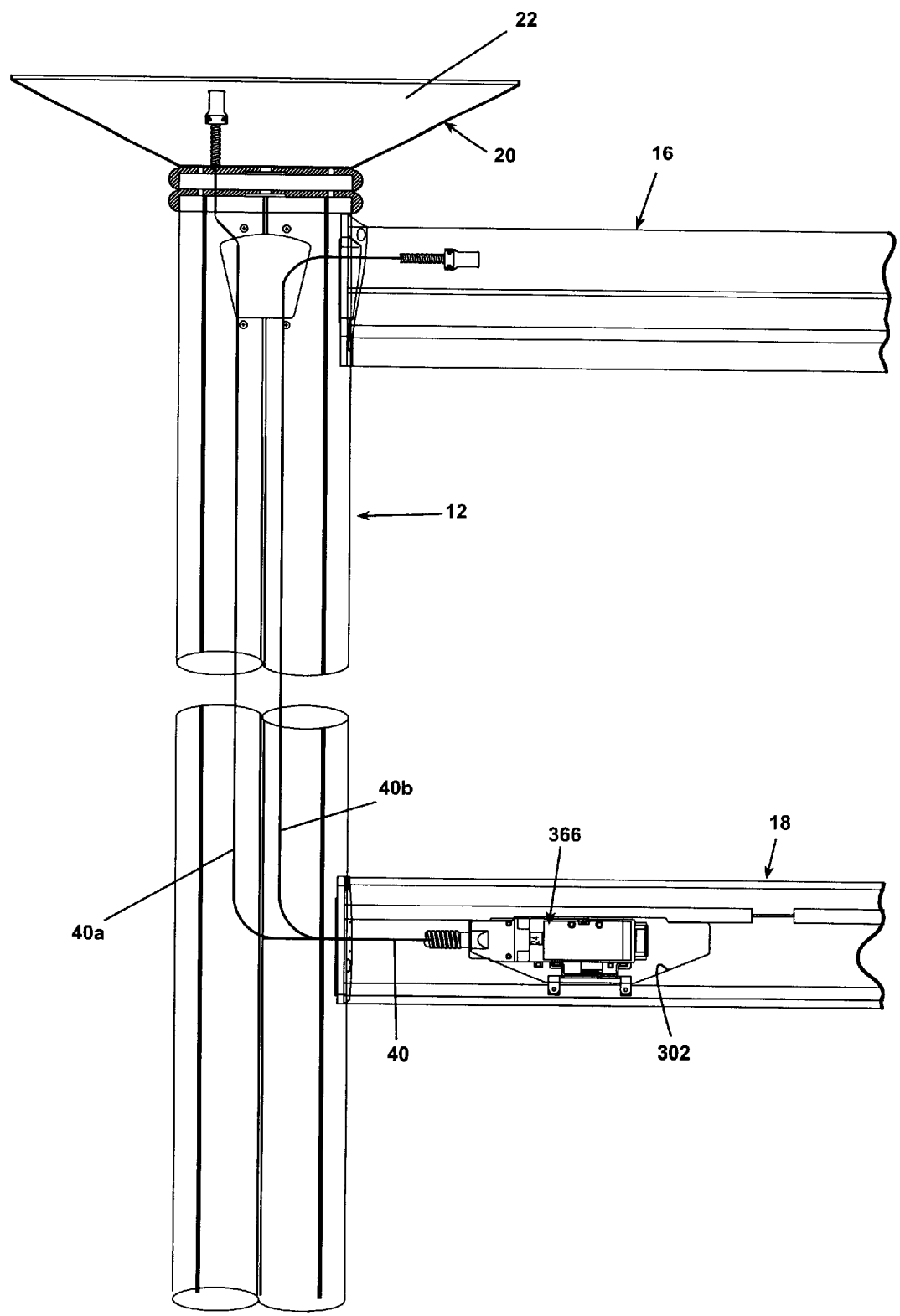
FIG. 34 is a fragmentary elevational view of a column assembly with an overhead beam and an intermediate beam mounted thereto having an electrical socket module operably interconnected thereto and the electrical/data conduit having a pair of leads extending from the socket module and routed to a column-top light fixture as well as to the overhead beam.

FIG. 34 shows a column assembly 12 with overhead and intermediate beam assemblies 16 and 18 mounted thereto. The intermediate beam assembly 18 has at least one electrical block 366 mounted thereto within an opening 302 as previously described. Electrical/data conduit 40 is operably interconnected to the electrical block 366 and is split into a pair of leads 40a and 40b extending therefrom. The first lead 40a is routed to a column-top light fixture 20 while the second lead 40b is routed to one of the interior chambers 222, 238 of the overhead beam assembly 18.

Figure 35:
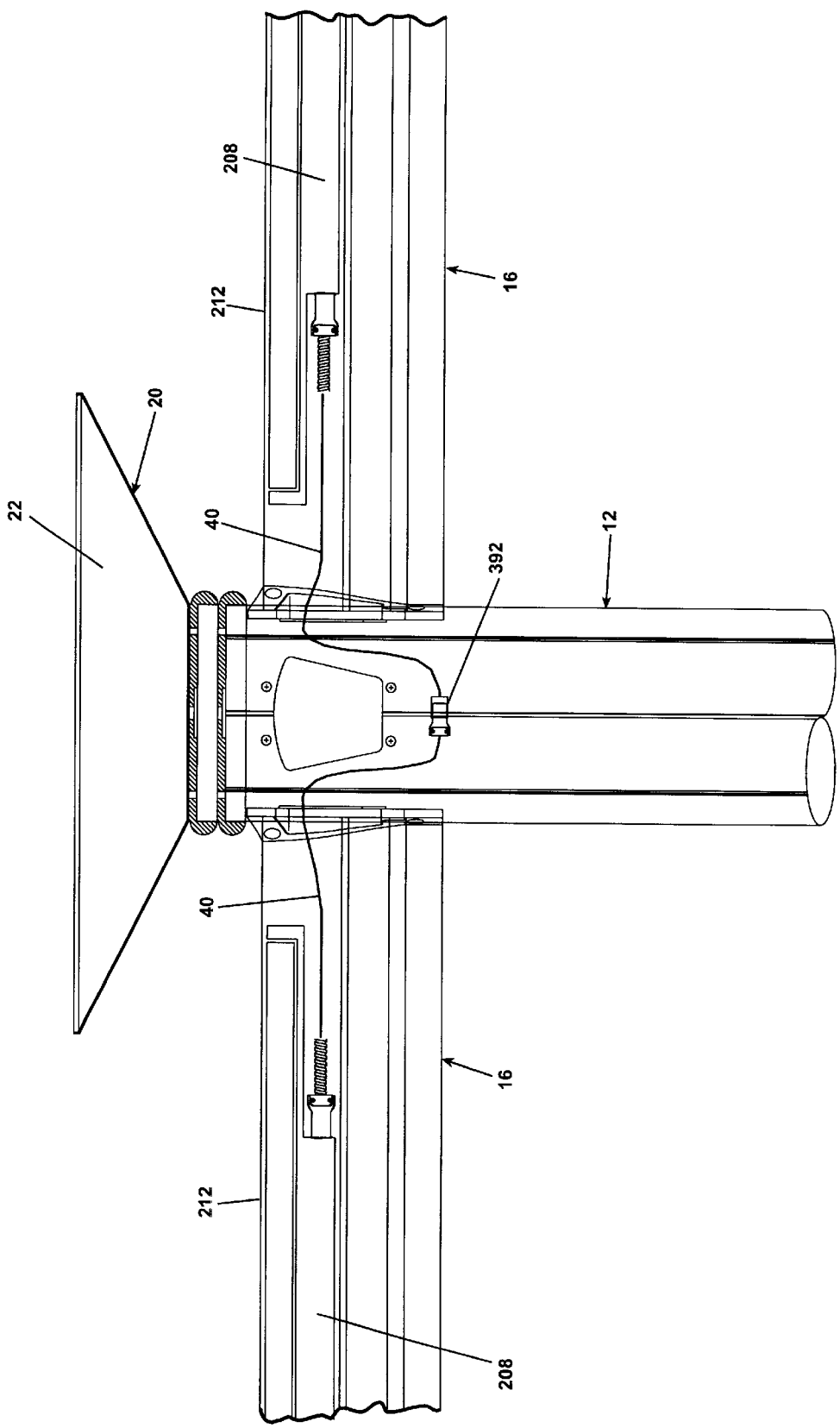
FIG. 35 is a fragmentary elevational view of a column assembly with a pair of overhead beam assemblies mounted in an opposed relationship to the column assembly wherein electrical/data conduit having a pair of leads passes through the column assembly and is operably interconnected to an overhead lighting assembly located in each overhead beam.

FIG. 35 shows a column assembly 12 with a pair of overhead beam assemblies 16 mounted in an opposed relationship to the column assembly 12. Electrical/data conduit 40 passes through the interior region 104 of the column assembly 12 and is operably interconnected to overhead lighting assemblies 208 located in each overhead beam assembly 16. A connector 392 interconnects appropriate segments of the electrical/data conduit 40. Thus, to interconnect the opposed lighting assemblies 208, a length of electrical/data conduit 40 need merely be extended from each lamp 208 into the interior region of the column assembly 12 and interconnected by the connector 392.

Figure 36:
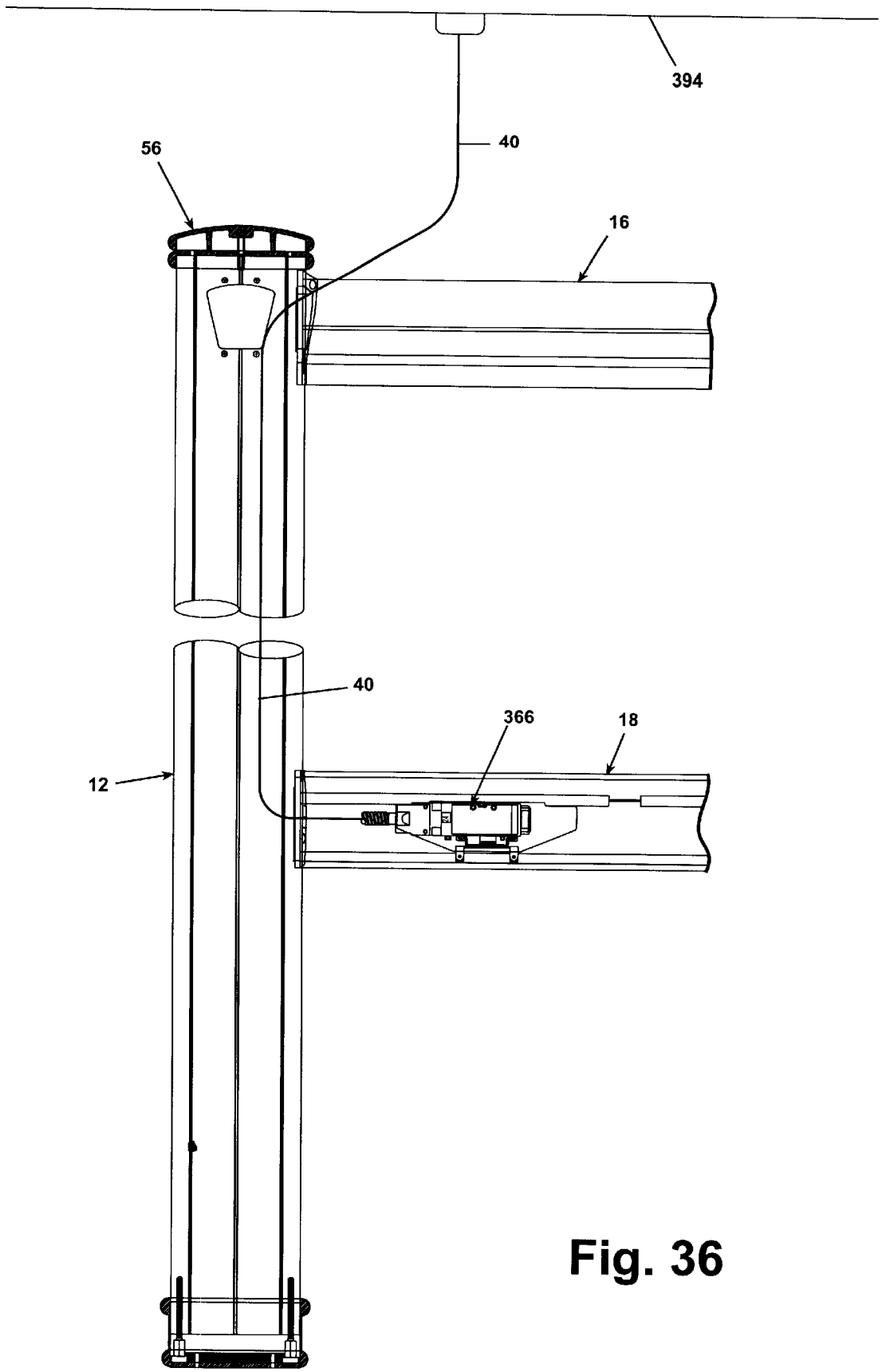
FIG. 36 is a fragmentary elevational view of a column assembly with both an overhead beam and an intermediate beam mounted thereto wherein electrical/data conduits routed into the workspace definition system from a ceiling surface.
Figure 37:
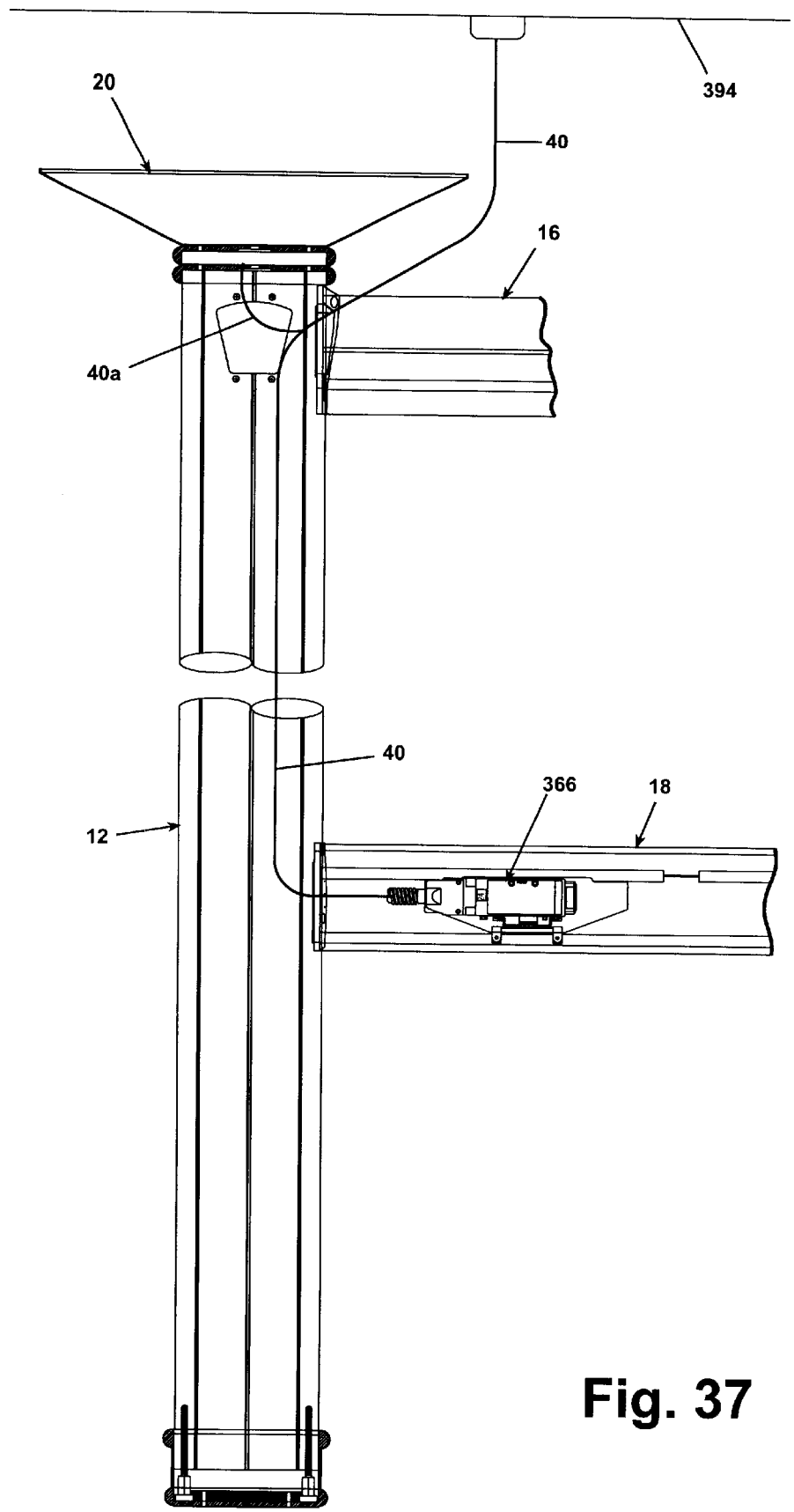
FIG. 37 is a fragmentary elevational view in a similar orientation as FIG. 36 wherein the column assembly is provided with a column-top light fixture and the electrical/data conduit is provided with a lead for powering the light fixture.

FIGS. 36–37 show a column assembly 12 with both overhead and intermediate beam assemblies 16 and 18 mounted thereto. The configuration in FIG. 36 shows the column assembly 12 with a column top trim ring 56 and the configuration in FIG. 37 shows the column assembly 12 with a column-top light fixture 20. In both configurations, the electrical/data conduit 40 is routed into the workspace definition system 10 from a ceiling surface 394. Once the electrical/data conduit 40 has entered the system 10, the conduit 40 can be routed to an electrical block 366 located in the intermediate beam assembly 18, within the column assembly 12 interior region 104, etc. It should be noted that, in FIG. 37, the electrical/data conduit 40 is provided with a lead 40a for direct interconnection with the column-top light fixture 20.

Figure 38:
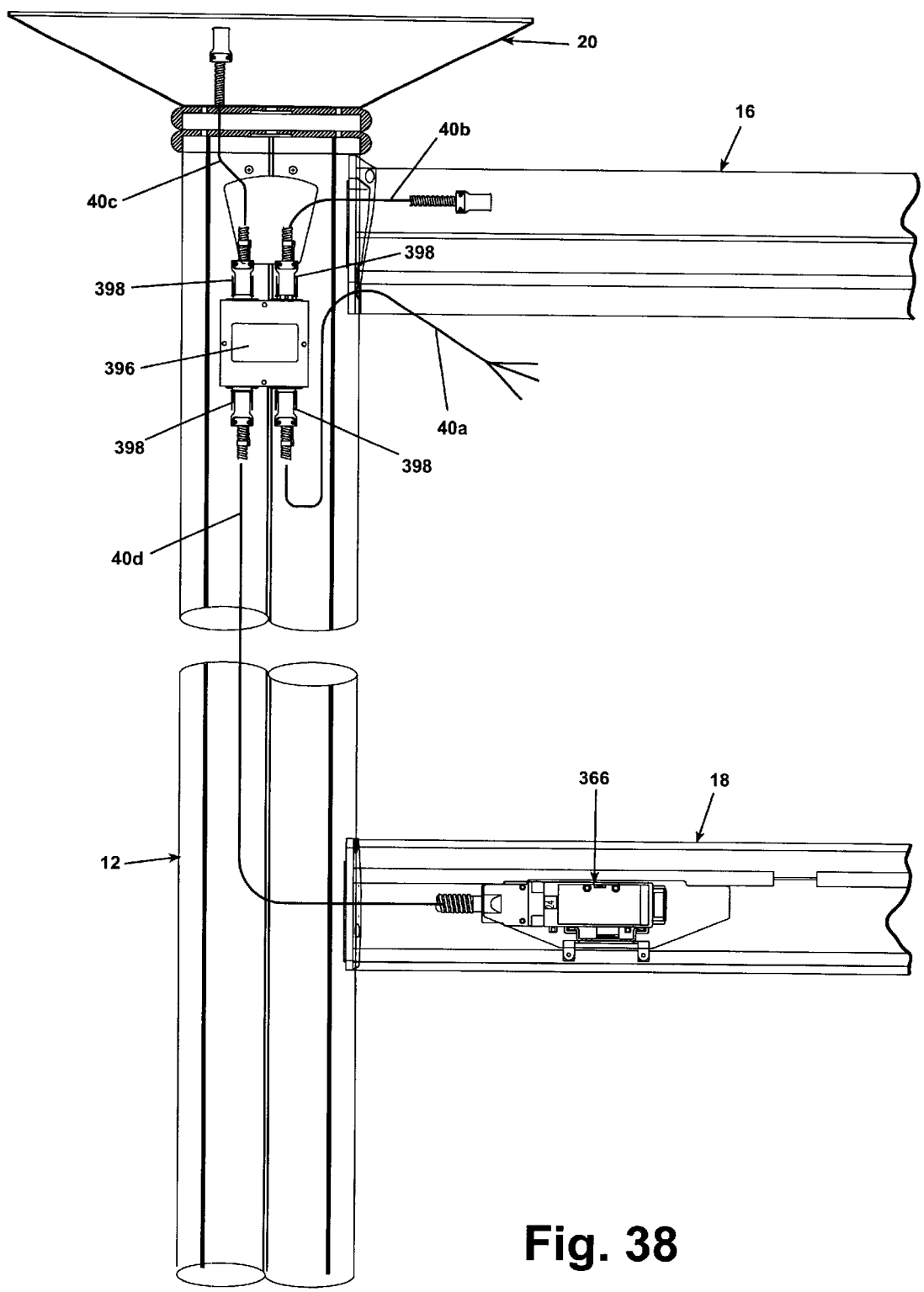
FIG. 38 is a fragmentary elevational view of a column assembly with both an overhead beam and an intermediate beam mounted thereto wherein electrical/data conduit is routed from a junction box to various locations throughout the workspace definition system.

FIG. 38 shows a column assembly 12 with both overhead and intermediate beam assemblies 16 and 18 mounted thereto wherein electrical/data conduit 40 is routed from ajunction box 396 having multiple terminals 398 thereon. Multiple leads 40a, 40b, 40c, 40d are interconnected to an external source (not shown) of electricity, a component within the overhead beam assembly 16, a columnn-top light fixture 20, and to an electrical block 366, respectively. These various locations throughout the workspace definition system 10 should be interpreted as examples of the wide interconnectivity of components within the system 10 and not limiting thereto.

Figure 39:
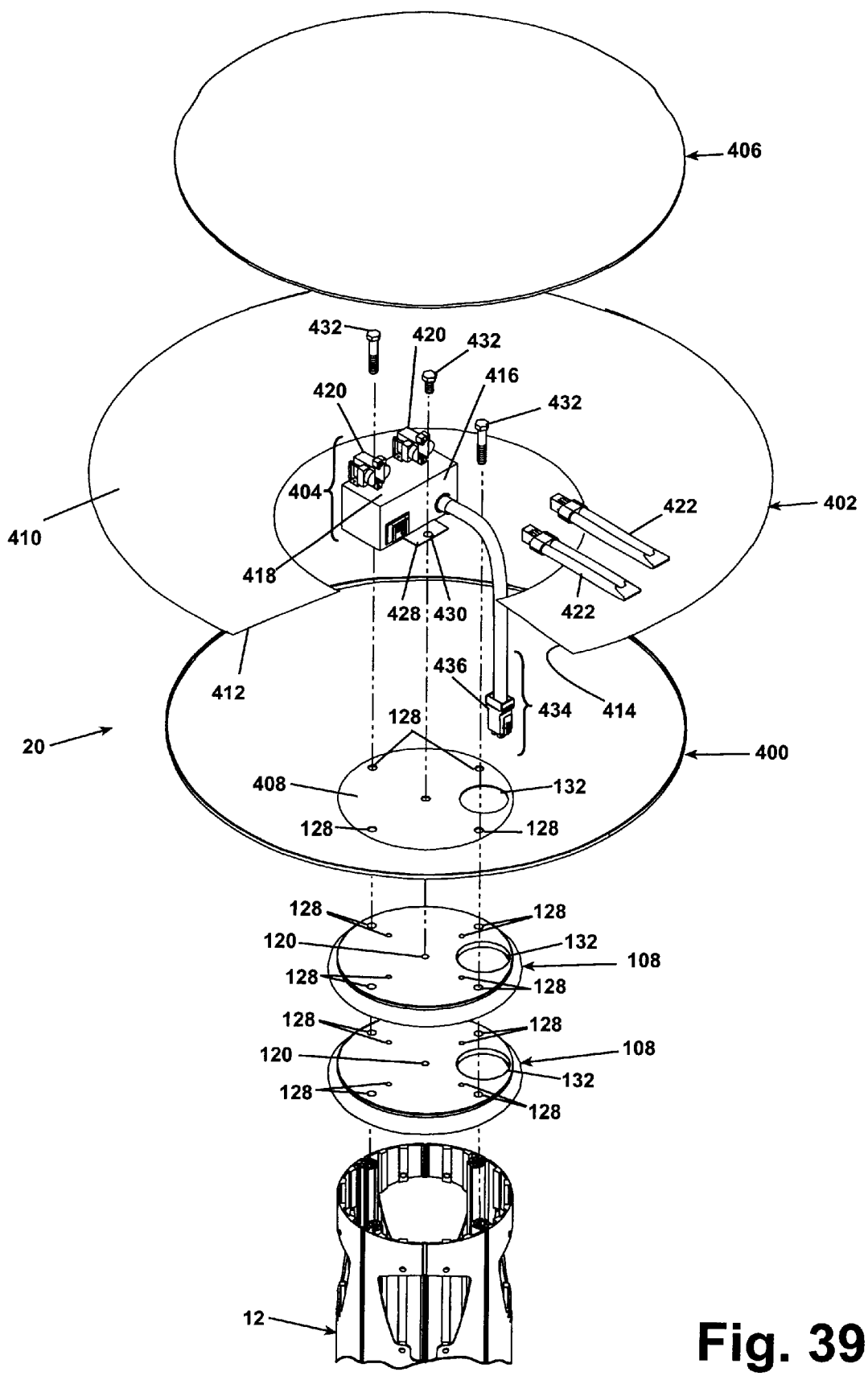
FIG. 39 is an exploded perspective view of a column-top light fixture for the column assembly of FIGS. 1–5.

Frequent mention has been made of the column-top light fixtures 20 which serve as an optional mounting atop a column assembly 12. FIG. 39 shows a columntop light fixture 20 for the column assembly 12 comprising a pair of top trim rings 108 (see FIG. 6), a sconce 400, a reflector 402, a lamp assembly 404 and a lens/diffuser 406.

The sconce 400 comprises a generally inverted conical shaped member having a generally horizontal planar base 408. The planar base 408 has a configuration substantially identical to the configuration of the mounting apertures 128, tapped bore 120 and conduit passthrough opening 132 of the trim ring 108 described earlier with respect to the top trim ring assembly 56. For convenience, the mounting apertures, tapped bore and conduit passthrough opening on the planar base 408 of the sconce 400 have been numbered with the same reference numerals (128, 120 and 132) as the top trim ring assembly 56.

The reflector 402 comprises a sheet of material having a reflective coating on an interior surface 410 thereof. The reflector 402 has a first end 412 and a second end 414 which, when the reflector is mounted to the interior of the conical sconce, are aligned and abutted with one another so that the interior surface 410 of the reflector 402 is a laminate on the sconce.

The lamp assembly 404 comprises a housing 416 having an upper surface 418 provided with a pair of quick connect terminals 420 which are each adapted to receive a halogen-type bulb 422 with a mating terminal 424 thereon. A lower surface 426 of the housing 416 is provided with a mounting flange 428 having a mounting aperture 430.

The lens/diffuser 406 comprises any known light diffusing or focusing member such as opaque or transparent glass or plastic, a Fresnel lens, an optical lens, etc. Various desired lighting effects can be obtained with a standard bulb 422 mounted in the lamp assembly 404 with the selection of a lens/diffuser 406.

The column-top light fixture 20 is assembled by mounting fasteners through aligned apertures 128 in the sconce 400 and trim rings 108 as well as through the mounting aperture 430 in the lamp assembly 404 and through the threaded bores 120 in the sconce 400 and trim rings 108. The bulbs 422 are installed to the housing 416 of the lamp assembly 404. The lamp assembly 404 can also include a length of preinstalled electrical/data conduit 434 with a connector 436 thereon extending from the housing 416 thereof and through the aligned openings 132 in the sconce 400 and trim rings 108. The connector 436 for the length of pre-installed electrical/data conduit 434 can thereby be interconnected to the electrical/data conduit 40 routed throughout the workspace definition system 10.

Figure 40:
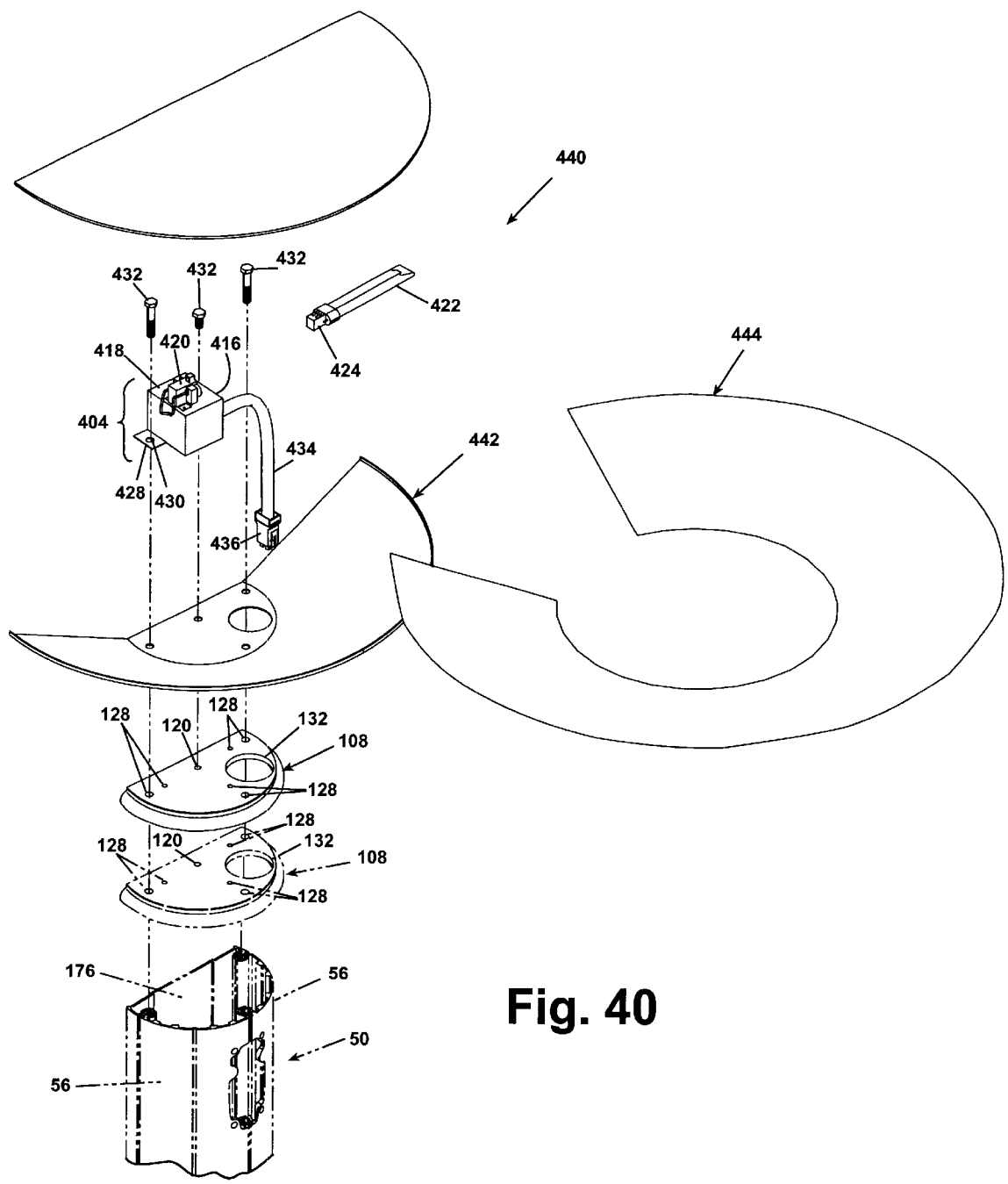
FIG. 40 is an exploded perspective view of a column-top light fixture for the half-column assembly of FIGS. 10–13.

The invention also contemplates a half-column-top light fixture 440 which serve as an optional mounting atop a half-column assembly 50. FIG. 40 shows a halfcolumn-top light fixture 440 for the column assembly 50 comprising a pair of top trim rings 108 (see FIG. 6), a sconce 442, a reflector 444, a lamp assembly 404 and a lens/diffuser 446.

The sconce 442, reflector 444 and lens/diffuser 446 are configured substantially similar to the sconce 400, reflector 402 and lens/diffuser 406 discussed with respect to the full column-top light fixture in FIG. 39. The only difference between the components in FIG. 40 and FIG. 39 is that the components of the halfcolumn-top light fixture 440 are generally semicircular. Thus, the light fixture 440 appears aesthetically pleasing above a half column assembly 50 composed of the pair of arcuate portions 58 and the rear plate 176. Otherwise, the assembly and operation of the half-column-top light fixture 440 is identical to the full column-top light fixture 20 discussed in FIG. 39.

FIG. 1 shows several freestanding pedestals and file cabinets 24 placed within the workspace definition system 10. The cabinets 24 can be of different sizes and can incorporate different combinations of hinged doors and drawers as desired by the designers of the space in which the workspace definition system 10 is used. As discussed with respect to FIG. 1, the invention also contemplates that a cabinet 30 can be specially-configured as an electric/data capable cabinet 30 wherein electrical/data conduit 40 routed throughout the system 10 can be routed directly within the cabinet 30. Further, electrical/data outlets can be provided directly on the cabinet 30 to allow the easy interconnection of office equipment located adjacent thereto.

Figure 42:
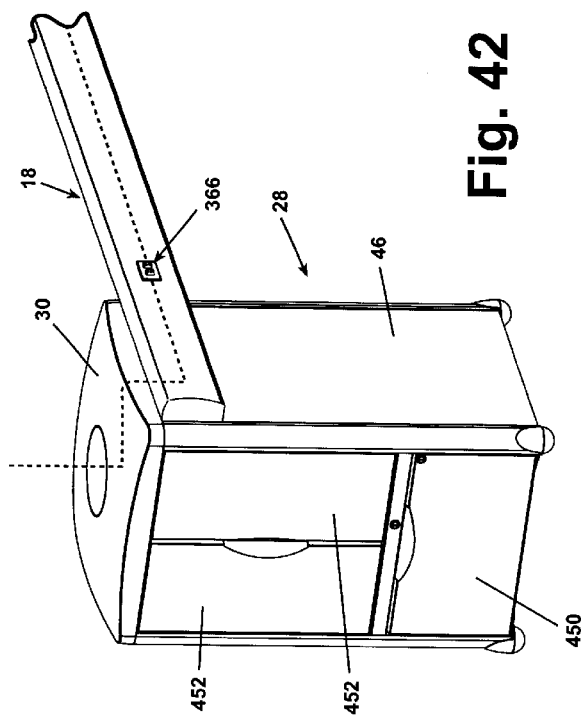
FIG. 42 is a fragmentary perspective view of a reduced-height furniture cabinet of FIG. 41 receiving an intermediate beam mounted to a rear surface thereof.
Figure 41:
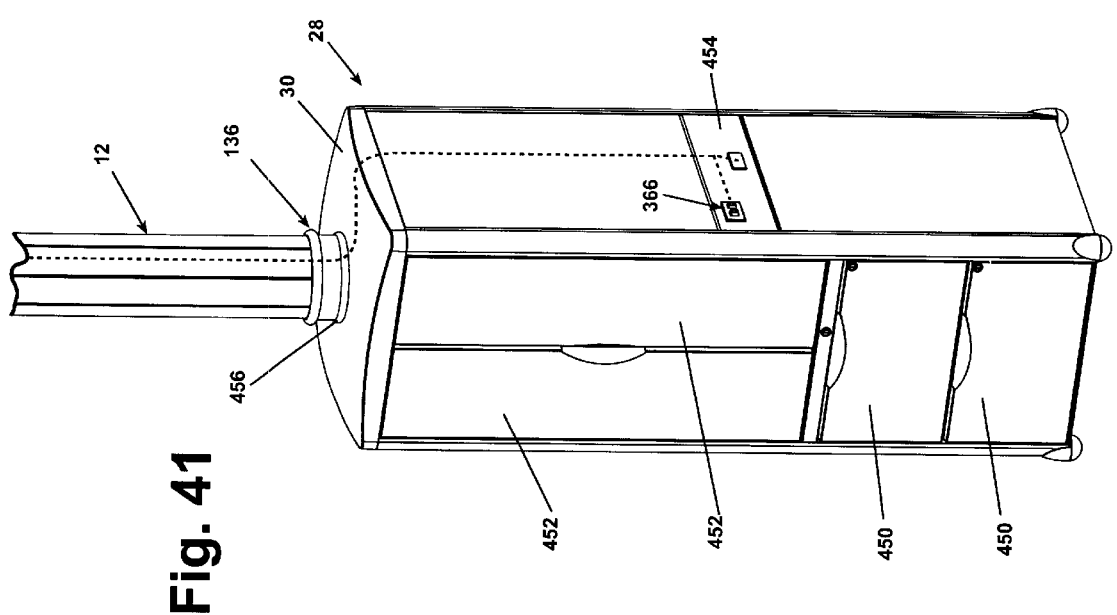
FIG. 41 is a fragmentary perspective view of a furniture cabinet having a port mounted receiving a column assembly on an upper surface thereof.

FIGS. 41 and 42 show the interface cabinet 28 having electrical/data conduit routing capabilities. The cabinet 28, on an outside appearance, looks like a conventional office furniture cabinet with drawers 450, hinged doors 452, etc. A powered panel 454 with an electrical block 366 can be provided on a side wall of the cabinet 28. Further, the cabinet 28 has internal routing capabilities so that a length of electrical/data conduit 40 can be inserted through a port 456 in an upper surface 30 of the cabinet 28 can be routed to the powered panel 454 as shown in FIG. 41. Further, the internal routing capabilities of the cabinet 28 can also be used in the opposite direction whereby an intermediate beam assembly 18 can be mounted to a side wall of the cabinet 28. Thus, a length of electrical/data conduit 40 provided within the intermediate beam assembly 18 in a previously-discussed manner can be routed within the cabinet 28 to the port 456 in the upper surface 458 of the cabinet 28 as shown in FIG. 42.

Further, as shown in FIGS. 1 and 41, a lower portion of a column assembly 12 can be inserted directly within the port 456 on the cabinet 28 to further increase the convenience of routing electrical/data conduit 40 into, out of and through the interior of the cabinet 28. Thus, any electrical/data conduit 40 routed within the column assembly 12 can be also routed within the interior of the cabinet 28. The cabinet 28 can thereby house electrical and data processing equipment, such as a computer or facsimile which can be easily interconnected with the electrical/data conduit 40 routed throughout the workspace definition system 10. A user can thereby conceal computers, printers, facsimile machines, telephones and other equipment within a cabinet 28 without exposing a power cord or data connection cable when the cabinet 28 has its doors 452 and/or drawers 450 in a closed position.

Although only one column assembly 12 is shown mounted within an port 456 on an upper surface 30 of a cabinet 28 in FIGS. 1 and 41, it will be understood that any of the other cabinets shown in FIG. 1 or any suitable cabinets or pedestal furniture component can be interconnected with the interior of the column assembly 12 in similar fashion without departing from the scope of this invention.

Figure 45:
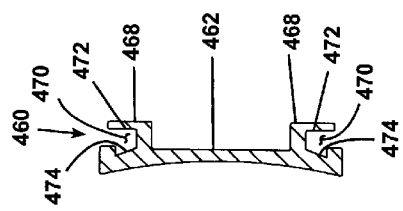
FIG. 45 is a cross sectional view of the adapter rail taken along lines 45–45 of FIG. 44
Figure 43:
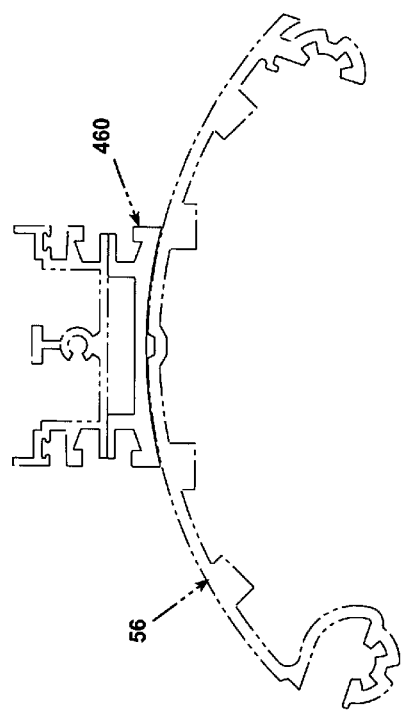
FIG. 43 is a cross-sectional view of an arcuate portion of the column assembly having an adapter rail mounted thereto for interconnecting a panel to the arcuate portion of the column assembly.

It is also an important inventive feature of the workspace definition system 10 described herein that the system 10 be easily connectable and assimilated into other existing office furniture systems, such as the frame-based workspace definition system 34 shown in FIG. 1 which includes frames having tiles removably mounted thereto. FIGS. 43–45 discuss an adapter rail 460 which enables the column-based workspace definition system 10 described herein to be interconnected to another office furniture system, such as one with tiles/panels mounted to a frame.

FIGS. 43–45 show an arcuate portion 58 of the column assembly 12, 50 having the adapter rail 460 mounted thereto for interconnecting a panel to the arcuate portion 58 of the column assembly 12. The adapter rail 460 comprises an elongated member 462 having first and second lateral edges 464 and 466, respectively. The lateral edges 464 and 466 are each provided with a flange 468 is opposed relationship to one another. The flange 468 has a recess 470 therein which is formed by a rectangular portion 472 having an inwardly-extending triangular extension 474. The adapter rail 460 also has a plurality of mounting apertures 476 in a spaced vertical relationship along the longitudinal length of the elongated member 462.

The recesses 470 of the adapter rail 460 mate with corresponding flanges (not shown) on an existing office furniture system, such as that shown in FIG. 1 as is well known in the art. The adapter rail 460 shown in FIGS. 43-45 is for a particular system, but can be altered so that the system 10 can be interfaced with a wide variety of office furniture systems, such as by changing the relationship and spacing of the recess 470.

While particular embodiments of the invention have been shown, it will be understood, of course, that the invention is not limited thereto since modifications may be made by those skilled in the art, particularly in light of the foregoing teachings. Reasonable variation and modification are possible within the scope of the foregoing disclosure of the invention without departing from the spirit of the

What is claimed:

1. A workspace definition system comprising:
a plurality of columns, each comprising a plurality of opaque panels interconnected at lateral edges thereof and defining an enclosure with a substantially uninterrupted hollow interior, at least one of the plurality of opaque panels in at least two of said columns having a first port at an upper portion thereof at an overhead height communicating with the hollow interior, the overhead height being above a height sufficient for anyone using the system to walk upright beneath;
each arcuate wall has a first lateral edge with a first flange forming a portion of a socket and a second lateral edge with a second flange forming another portion of the socket, the socket being located within the first and second flanges when the second flange on one of the at least two arcuate walls is in an interlocked position with the first flange on an adjacent one another of the at least two arcuate walls; and
a rod positioned within the socket to prevent the first and second flanges from becoming dislodged from the interlocked position;
a plurality of overhead beam assemblies having at least one internal channel, each overhead beam assembly mounted between the columns at respective first ports thereof,
wherein the at least one internal channel of each of the plurality of overhead beam assemblies communicates with the hollow interior of the at least two of the columns via the first ports for uninterrupted passage of electrical/data conduit therethrough from the overhead height above any users of the system into the columns.

2. The workspace definition system of claim 1 and further comprising at least one intermediate beam assembly having an internal channel, the at least one intermediate beam assembly mounted between a pair of the plurality of columns at an intermediate height, the internal channel of the at least one intermediate beam assembly also communicating with the hollow interiors of the adjacent pair of columns.

3. The workspace definition system of claim 1 wherein at least one of the plurality of columns has a light fixture mounted thereon.

4. The workspace definition system of claim 3 wherein the light fixture has a reflector for directing light upwardly with respect to the columns.

5. The workspace definition system of claim 4 wherein the light fixture has a channel which communicates with the hollow interior of the column for uninterrupted passage of electrical/data conduit between the light fixture and the column.

6. The workspace definition system of claim 5 wherein:
the at least one of the plurality of columns has an open upper end;
and further comprising a cap mounted to the at least one of the plurality of columns to close the open upper end thereof.

7. The workspace definition system of claim 6 wherein the cap includes an opening for the uninterrupted passage of electrical/data conduit into the open upper end of the at least one of the plurality of columns.

8. The workspace definition system of claim 7 wherein the cap further comprises an upper surface and the light fixture is mounted to the upper surface of the cap.

9. The workspace definition system of claim 1 and further comprising a light fixture mounted to an upper portion of at least one of the columns, wherein the light fixture has a channel which communicates with the hollow interior of the at least one of the columns for uninterrupted passage of electrical/data conduit between the light fixture and the column.

10. The workspace definition system of claim 1 wherein:
at least one of the plurality of columns has an open upper end;
and further comprising a cap mounted to the at least one of the plurality of columns to close the open upper end thereof.

11. The workspace definition system of claim 10 wherein the cap includes an opening for the uninterrupted passage of electrical/data conduit into the open upper end of the at least one of the plurality of columns.

12. The workspace definition system of claim 1 and further comprising an adapter rail mounted to at least one of the columns, wherein the adapter rail has a mounting flange thereon adapted to mount a panel at an edge thereof and a panel mounted to the adapter rail.

13. The workspace definition system of claim 12 wherein the panel is interconnected to an adjacent column at another edge thereof.

14. The workspace definition system of claim 1 and further comprising a plurality of floor-engaging glides mounted within a bottom end of the sockets defined by the interlocked arcuate walls.

15. The workspace definition system of claim 14 wherein the each of the columns comprises four arcuate walls.

16. The workspace definition system of claim 1 wherein the each of the plurality of columns comprises four arcuate walls interlocked together to form a circular configuration.

17. The workspace definition system of claim 1 wherein each of the plurality of columns are open at an upper end thereof and further comprising a trim ring mounted to the open upper end of at least some of the plurality of columns to cover the open upper end of the at least some of the plurality of columns.

18. The workspace definition system of claim 17 wherein the trim ring comprises an opening therein which communicates with the hollow interior of the at least some of the plurality of columns for routing electrical/data conduit from above the at least some of the plurality of columns into the hollow interior thereof.

19. The workspace definition system of claim 18 wherein a cap is mounted to an upper surface of the trim ring.

20. The workspace definition system of claim 18 wherein a light fixture is mounted to an upper surface of the trim ring.

21. The workspace definition system of claim 1 and further comprising a base trim ring assembly comprising:
    an anchor plate mountable to a floor and having a surface thereon adapted to support a lower portion of one of the plurality of columns;
    a stabilizer base positioned within the anchor plate having positioning surfaces thereon; and
    a plurality of glides in retaining contact with the positioning surfaces of the stabilizer base and mounted to the lower portion of the one of the plurality of columns.

22. The workspace definition system of claim 21 wherein the glides are adjustably mounted within the column.

23. The workspace definition system of claim 21 wherein the anchor plate and stabilizer base each have openings in register with the opening in the other which communicate with the hollow interior of the column for the uninterrupted passage of electrical/data conduit into the hollow interior of the column from beneath the base trim ring assembly.

24. The workspace definition system of claim 21 wherein the anchor plate and stabilizer base each have mounting apertures in register with the mounting apertures in the other for fastening the anchor plate and stabilizer base to one another.

25. The workspace definition system of claim 21 wherein the base trim ring assembly further comprises a trim ring mounted around a lower portion of the one of the plurality of columns to conceal the interface between the base trim ring assembly and the lower portion of the one of the plurality of columns.

26. The workspace definition system of claim 21 wherein the anchor plate has at least one recess and the stabilizer base has at least one protrusion in register with and received within the at least one recess to align the stabilizer base with the anchor plate.

27. The workspace definition system of claim 1 wherein at least one of the plurality of columns comprises:
    at least one arcuate wall; and
    at least one bracket mountable to an existing wall in a workspace and mounted to the at least one arcuate wall;
    whereby the assembly of the at least one arcuate wall and the bracket creates an interface with the existing wall.

28. The workspace definition system of claim 27 wherein the bracket comprises at least one flat wall mountable to the existing wall in the workspace, the at least one arcuate wall and the at least one flat wall are interlocked together at lateral edges thereof.

29. The workspace definition system of claim 28 wherein:
    the at least one arcuate wall and the at least one flat wall has a first lateral edge with a first flange forming a portion of a socket and a second lateral edge with a second flange forming another portion of the socket, the socket being located within the first and second flanges when the second flange on one of the at least one arcuate wall and the at least one flat wall is in an interlocked position with the first flange on an adjacent one another of the at least one arcuate wall and the at least one flat wall; and
    a rod positioned within the socket to prevent the first and second flanges from being dislodged from the interlocked position.

30. The workspace definition system of claim 1 wherein each of the plurality of overhead beam assemblies comprises:
    a elongated web defining at least two channels;
    brackets mounted to the elongated web and to the columns; and
    covers removably mounted to the elongated web to enclose the at least two channels.

31. The workspace definition system of claim 30 wherein the brackets have a peripheral rim defining a central opening which interconnects the hollow interior of the column and the at least two channels.

32. The workspace definition system of claim 30 wherein each bracket has a first lateral surface in contact with the column and a second lateral surface in contact with the overhead beam assembly wherein the first lateral surface is shaped complementary to an outer surface of the column.

33. The workspace definition system of claim 32 wherein the elongated web and the covers are substantially flush with the second lateral surface of the bracket.

34. The workspace definition system of claim 30 wherein the at least two channels comprise first, second and third channels.

35. The workspace definition system of claim 34 wherein:
    the first channel is upwardly opening; and
    the second and third channels open laterally in an opposed relationship on either lateral side of the elongated web.

36. The workspace definition system of claim 35 wherein the first channel further comprises an upwardly-opening light fixture for providing ambient light to a workspace.

37. The workspace definition system of claim 34 wherein the elongated web has an opening interconnecting the second and third channels to allow for the uninterrupted passage of electrical/data conduit therethrough.

38. The workspace definition system of claim 34 wherein one of the covers comprises a first cover disposed over the first channel.

39. The workspace definition system of claim 38 wherein the first cover is translucent.

40. The workspace definition system of claim 34 wherein the covers comprise a second and a third cover disposed over the second and third channels.

41. The workspace definition system of claim 40 wherein the second and third covers each comprises an elongated panel having a mounting clip at a lower edge thereof.

42. The workspace definition system of claim 41 wherein the elongated web has flanges at a lower portion thereof adapted to receive the mounting clip on the second and third covers.

43. The workspace definition system of claim 30 wherein:
    the elongated web further comprises a plurality of spaced slotted fastener retainers integrally formed therewith and adapted to retain fasteners; and
    the brackets further comprise several spaced mounting apertures in register with the slotted fastener retainers.

44. The workspace definition system of claim 30 wherein the elongated web comprises a first beam forming a first upwardly-opening channel and a second beam mounted thereto forming second and third laterally-opening channels in cooperation with the first beam.

45. The workspace definition system of claim 44 wherein the first beam comprises a generally horizontal wall having diverging walls extending upwardly at an acute angle with respect to the generally horizontal wall.

46. The workspace definition system of claim 45 wherein the first beam has a depending inverted U-shaped flange adapted to receive an upper edge of the second beam.

47. The workspace definition system of claim 30 wherein an underside of the elongated web comprises an upwardly-extending slot adapted to receive hanging accessories.

48. The workspace definition system of claim 1 and further comprising a plurality of intermediate beam assemblies comprising:

a elongated web defining at least two channels;

brackets mounted to the elongated web and to the columns; and covers removably mounted to the elongated web to enclose the at least two channels.

49. The workspace definition system of claim 48 wherein the brackets have a peripheral rim defining a central opening which interconnects the hollow interior of the column and the at least two channels.

50. The workspace definition system of claim 49 wherein each bracket has a first lateral surface in contact with the column and a second lateral surface in contact with the intermediate beam assembly wherein the first lateral surface is shaped complementary to an outer surface of the column.

51. The workspace definition system of claim 50 wherein the elongated web and the covers are substantially flush with the second lateral surface of the bracket.

52. The workspace definition system of claim 48 wherein the elongated web has at least one opening interconnecting the at least two channels to allow for the uninterrupted passage of electrical/data conduit therethrough.

53. The workspace definition system of claim 52 wherein the at least one opening comprises a plurality of longitudinally spaced openings.

54. The workspace definition system of claim 52 wherein the at least one opening receives an electrical/data block therein whereby electrical/data conduit can be routed through the at least two channels to the electrical/data block disposed in the at least one opening.

55. The workspace definition system of claim 54 and further comprising a first socket mounted to the electrical/data block and accessible in one of the at least two channels.

56. The workspace definition system of claim 55 wherein one of the covers has an opening in register with the first socket.

57. The workspace definition system of claim 56 and further comprising a second socket accessible in the other of the at least two channels whereby electrical/data components can be interconnected to the first and second sockets on either side of the elongated web.

58. The workspace definition system of claim 57 wherein another of the covers has an opening in register with the second socket.

59. The workspace definition system of claim 48 wherein the covers each comprises an elongated panel having a mounting clip at a lower edge thereof.

60. The workspace definition system of claim 59 wherein the elongated web has flanges at a lower portion thereof adapted to receive the mounting clip on the covers.

61. The workspace definition system of claim 48 wherein:

the elongated web further comprises a plurality of spaced slotted fastener retainers integrally formed therewith and adapted to retain fasteners; and the brackets further comprise several spaced mounting apertures in register with the slotted fastener retainers.

62. The workspace definition system of claim 48 wherein the elongated web comprises an I-shaped beam having slotted fastener retainers at outer edges thereof.

63. The workspace definition system of claim 1 wherein first ports not having an overhead beam assembly mounted thereto have a first port cover removably mounted thereto to conceal the first ports not having an overhead beam assembly mounted thereto.

64. The workspace definition system of claim 63 wherein the first port cover comprises an outer surface substantially conforming in curvature to the outer surface of the column.

65. The workspace definition system of claim 63 wherein:

the column has several mounting apertures adjacent to the first port; and the first port cover comprises a rear surface provided with several spaced spring arms in register with the mounting apertures;

wherein the spring arms on the first port cover are urged within the mounting apertures on the column to removably retain the first port cover over the first port.

66. The workspace definition system of claim 65 wherein:

at least two spring arms are in register with each mounting aperture;

the at least two spring arms are resiliently spaced from each other for flexing upon insertion and removal of the first port cover with respect to the first port.

67. The workspace definition system of claim 1 and further comprising a cabinet having a port which receives one of:

a lower portion of one of the plurality of columns, end portion of one of the plurality of overhead beam assemblies and an end portion of one of the plurality of intermediate beam assemblies.

68. The workspace definition system of claim 67 wherein the cabinet has at least one of an electrical receptacle and a data receptacle thereon.

69. The workspace definition system of claim 68 and further comprising an electrical/data conduit passing through the one of the lower portion of the column, the end portion of the overhead beam and the end portion of the intermediate beam assembly and into the cabinet.

70. The workspace definition system of claim 67 and further comprising an electrical/data conduit passing through the one of the lower portion of the column, the end portion of the overhead beam and the end portion of the intermediate beam assembly and into the cabinet.

71. The workspace definition system of claim 13 wherein the panel is interconnected to a frame-based workspace definition system comprising several frames having removable panels thereon at another edge thereof.

72. A workspace definition system comprising:

a plurality of columns having a hollow interior;

a plurality of overhead beam assemblies having at least one internal channel, each overhead beam assembly mounted between adjacent columns at a first height;

a plurality of intermediate beam assemblies having at least one internal channel, each intermediate beam assembly mounted between adjacent columns at a second height, each of the plurality of intermediate beam assemblies comprises a elongated web defining at least two channels, brackets mounted to the elongated web and to the columns, and covers removably mounted to the elongated web to enclose the at least two channels;

wherein the internal channel of each of the overhead and intermediate beam assemblies communicate with the hollow interior of the adjacent columns for uninterrupted passage of electrical/data conduit therethrough.

73. A workspace definition system comprising:

a plurality of columns having a hollow interior;

a plurality of overhead beam assemblies having at least one internal channel, each overhead beam assembly mounted between adjacent columns at a first height, each of the plurality of overhead beam assemblies comprises a elongated web defining at least two channels, brackets mounted to the elongated web and to the columns, and covers removably mounted to the elongated web to enclose the at least two channels;

a plurality of intermediate beam assemblies having at least one internal channel, each intermediate beam assembly mounted between adjacent columns at a second height;

wherein the internal channel of each of the overhead and intermediate beam assemblies communicate with the hollow interior of the adjacent columns for uninterrupted passage of electrical/data conduit therethrough.

74. A workspace definition system comprising:

a plurality of columns, each comprising a plurality of opaque panels interconnected at lateral edges thereof and defining an enclosure with a substantially uninterrupted hollow interior;

a plurality of overhead beam assemblies having at least one internal channel, each overhead beam assembly mounted between adjacent columns at a first height, the plurality of overhead beam assemblies having elongated openings therein allowing access to the internal channel from at least three sides thereof;

a plurality of intermediate beam assemblies having at least one internal channel, each intermediate beam assembly mounted between adjacent columns at a second height, the plurality of intermediate beam assemblies having elongated openings therein allowing access to the internal channel from at least two sides thereof;

wherein the internal channel of each of the overhead and intermediate beam assemblies communicate with the hollow interior of the adjacent columns for uninterrupted passage of electrical/data conduit therethrough.

75. The workspace definition system of claim 74 wherein each of the columns comprises at least two arcuate walls which are interlocked together at lateral edges thereof.

76. The workspace definition system of claim 75 wherein:

each arcuate wall has a first lateral edge with a first flange forming a portion of a socket and a second lateral edge with a second flange forming another portion of the socket, the socket being located within the first and second flanges when the second flange on one of the at least two arcuate walls is in an interlocked position with the first flange on an adjacent one of the at least two arcuate walls; and a rod positioned within the socket to prevent the first and second flanges from becoming dislodged from the interlocked position.

77. The workspace definition system of claim 74 wherein the each of the plurality of columns comprises four arcuate walls interlocked together to form a circular configuration.

78. The workspace definition system of claim 74 wherein at least one of the plurality of columns comprises a half-column assembly comprising:

at least one arcuate wall; and at least one bracket mountable to an existing wall in a workspace and mounted to the at least one arcuate wall;

whereby the assembly of the at least one arcuate wall and the bracket creates an interface with the existing wall.

79. The workspace definition system of claim 74 wherein each of the plurality of overhead beam assemblies comprises:

a elongated web defining at least two channels;

brackets mounted to the elongated web and to the columns; and covers removably mounted to the elongated web to enclose the at least two channels.

80. The workspace definition system of claim 74 wherein each of the plurality of intermediate beam assemblies comprises:

a elongated web defining at least two channels;

brackets mounted to the elongated web and to the columns; and covers removably mounted to the elongated web to enclose the at least two channels.

81. The workspace definition system of claim 74 wherein each of the plurality of columns includes a first port at an upper end thereof, wherein the first port includes a first port cover removably mounted thereto.

82. The workspace definition system of claim 74 and further comprising a cabinet having a port which receives one of:

a lower portion of one of the plurality of columns, an end portion of one of the plurality of overhead beam assemblies and an end portion of one of the plurality of intermediate beam assemblies.

83. A workspace definition system comprising:

a plurality of columns, each comprising a plurality of opaque panels interconnected at lateral edges thereof and defining an enclosure with a substantially uninterrupted hollow interior;

a plurality of overhead beam assemblies having at least one internal channel, each overhead beam assembly mounted between adjacent columns at a first height;

a plurality of intermediate beam assemblies having at least one internal channel, each intermediate beam assembly mounted between adjacent columns at a second height;

wherein the internal channel of each of the overhead and intermediate beam assemblies communicate with the hollow interior of the adjacent columns for uninterrupted passage of electrical/data conduit therethrough; and wherein at least one of the plurality of columns has a first light fixture mounted thereon and at least one of the plurality of overhead beam assemblies has an upwardly-facing opening and second light fixture mounted in the at least one internal channel and aligned to direct light out of the opening for providing ambient lighting to the workspace in cooperation with the first light fixture in the at least one of the plurality of columns.

84. The workspace definition system of claim 83 wherein the light fixture has a reflector for directing light upwardly with respect to the columns.

85. The workspace definition system of claim 83 wherein the light fixture has a channel which communicates with the hollow interior of the column for uninterrupted passage of electrical/data conduit between the light fixture and the column.

86. The workspace definition system of claim 83 wherein:

at least one of the plurality of columns has an open upper end;

and further comprising a cap mounted to the at least one of the plurality of columns to close the open upper end thereof.

87. The workspace definition system of claim 86 wherein the cap includes an opening for the uninterrupted passage of electrical/data conduit into the open upper end of the at least one of the plurality of columns.

88. The workspace definition system of claim 87 wherein the cap further comprises an upper surface and the light fixture is mounted to the upper surface of the cap.

89. A workspace definition system comprising:

a plurality of columns having a hollow interior;

a plurality of overhead beam assemblies, each overhead beam assembly mounted between a pair of the plurality of columns at a first height, wherein each of the plurality of overhead beam assemblies comprises:

a elongated web defining a first upwardly opening channel, and a second and third laterally opening channels in an opposed relationship on either lateral side of the elongated web;

brackets mounted to the elongated web and to the pair of the plurality of columns;

covers removably mounted to the elongated web to enclose the second and third laterally opening channels; and a light fixture located in the first upwardly opening channel for providing ambient light to a workspace.

90. The workspace definition system of claim 89 wherein the brackets have a peripheral rim defining a central opening which interconnects the hollow interior of the column and the channels.

91. The workspace definition system of claim 89 wherein each bracket has a first lateral surface in contact with the column and a second lateral surface in contact with the overhead beam assembly wherein the first lateral surface is shaped complementary to an outer surface of the column.

92. The workspace definition system of claim 91 wherein the elongated web and the covers are substantially flush with the second lateral surface of the bracket.

93. A workspace definition system comprising:

a plurality of columns, each comprising a plurality of panels interconnected at lateral edges thereof and defining an enclosure with a substantially uninterrupted hollow interior, and wherein each of the plurality of columns are open at an upper end thereof and further comprising a trim ring mounted to the open upper end of at least some of the plurality of columns to cover the open upper end of the at least some of the plurality of columns, wherein the trim ring further comprises an aperture aligned with each of the interconnections between adjacent panels and a fastener disposed through the opening and engaging the lateral interconnection;

a plurality of overhead beam assemblies having at least one internal channel, each overhead beam assembly mounted between a pair of the plurality of columns at a first height; and a plurality of intermediate beam assemblies having at least one internal channel, each intermediate beam assembly mounted between a pair of the plurality of columns at a second height.

94. The workspace definition system of claim 93 wherein the trim ring comprises an opening therein which communicates with the hollow interior of the at least some of the plurality of columns for routing electrical/data conduit from above the at least some of the plurality of columns into the hollow interior thereof.

95. The workspace definition system of claim 93 wherein a cap is mounted to an upper surface of the trim ring.

96. The workspace definition system of claim 93 wherein a light fixture is mounted to an upper surface of the trim ring.

97. A workspace definition system comprising:

a plurality of columns having a hollow interior;

a plurality of overhead beam assemblies having at least one internal channel, each overhead beam assembly mounted between adjacent columns at a first height;

a plurality of intermediate beam assemblies having at least one internal channel, each intermediate beam assembly mounted between adjacent columns at a second height; and a base trim ring assembly comprising:

an anchor plate mountable to a floor and having a surface thereon adapted to support a lower portion of one of the plurality of columns;

a stabilizer base positioned within the anchor plate having positioning surfaces thereon; and a plurality of glides in retaining contact with the positioning surfaces of the stabilizer base and mounted to the lower portion of the one of the plurality of columns.

98. The workspace definition system of claim 97 wherein the glides are adjustably mounted within the column.

99. The workspace definition system of claim 97 wherein the anchor plate and stabilizer base each have openings in register with the opening in the other which communicate with the hollow interior of the column for the uninterrupted passage of electrical/data conduit into the hollow interior of the column from beneath the base trim ring assembly.

100. The workspace definition system of claim 97 wherein the anchor plate and stabilizer base each have mounting apertures in register with the mounting apertures in the other for fastening the anchor plate and stabilizer base to one another.

101. The workspace definition system of claim 97 wherein the base trim ring assembly further comprises a trim ring mounted around a lower portion of the one of the plurality of columns to conceal the interface between the base trim ring assembly and the lower portion of the one of the plurality of columns.

102. The workspace definition system of claim 97 wherein the anchor plate has at least one recess and the stabilizer base has at least one protrusion in register with and received within the at least one recess to align the stabilizer base with the anchor plate.

103. A workspace definition system comprising a plurality of columns having a hollow interior, wherein at least one of the plurality of columns comprises at least one arcuate wall and at least one plate mountable to an existing wall in a workspace; wherein first lateral edge flanges on the at least one arcuate wall are interlocked to second lateral edge flanges of the plate whereby the assembly of the at least one arcuate wall and the plate creates an interface with the existing wall.

104. The workspace definition system of claim 103 wherein the plate comprises at least one flat wall mountable to the existing wall in the workspace.

105. The workspace definition system of claim 104 wherein:

the at least one arcuate wall further comprises at least two arcuate walls;

the first lateral edge flange of each of the at least two arcuate walls forms a portion of a socket and the second lateral edge flange of the bracket forms another portion of the socket, the socket being located within the first and second flanges when the second flange on one of the at least two arcuate walls is in an interlocked position with the first flange on another of the at least two arcuate walls; and a rod positioned within the socket to prevent the first and second flanges from becoming dislodged from the interlocked position.

106. A workspace definition system comprising:

a plurality of columns, each comprising a plurality of opaque panels interconnected at lateral edges thereof and defining an enclosure with a substantially uninterrupted hollow interior;

a plurality of overhead beam assemblies having at least one internal channel, each overhead beam assembly mounted between a pair of the plurality of columns at a first height, wherein each of the plurality of overhead beam assemblies comprises:

a elongated web defining at least two channels;

brackets mounted to the elongated web and to the pair of the plurality of columns; and covers removably mounted to the elongated web to enclose the at least two channels; wherein one of the at least two channels further comprises an upwardly-opening light fixture for providing ambient light to a workspace.

107. The workspace definition system of claim 106 wherein the brackets have a peripheral rim defining a central opening which interconnects the hollow interior of the column and the at least two channels.

108. The workspace definition system of claim 106 wherein each bracket has a first lateral surface in contact with the column and a second lateral surface in contact with the overhead beam assembly wherein the first lateral surface is shaped complementary to an outer surface of the column.

109. The workspace definition system of claim 108 wherein the elongated web and the covers are substantially flush with the second lateral surface of the bracket.

110. The workspace definition system of claim 106 wherein the at least two channels comprise first, second and third channels.

111. The workspace definition system of claim 110 wherein:

the first channel is upwardly opening; and the second and third channels open laterally in an opposed relationship on either lateral side of the elongated web.

112. The workspace definition system of claim 110 wherein the elongated web has an opening interconnecting the second and third channels to allow for the uninterrupted passage of electrical/data conduit therethrough.

113. The workspace definition system of claim 110 wherein one of the covers comprises a first cover disposed over the first channel.

114. The workspace definition system of claim 113 wherein the first cover is translucent.

115. The workspace definition system of claim 115 wherein the covers comprise a second and a third cover disposed over the second and third channels.

116. The workspace definition system of claim 116 wherein the second and third covers each comprises an elongated panel having a mounting clip at a lower edge thereof.

117. The workspace definition system of claim 116 wherein the elongated web has flanges at a lower portion thereof adapted to receive the mounting clip on the second and third covers.

118. The workspace definition system of claim 106 wherein:

the elongated web further comprises a plurality of spaced slotted fastener retainers integrally formed therewith and adapted to retain fasteners; and the brackets further comprise several spaced mounting apertures in register with the slotted fastener retainers.

119. The workspace definition system of claim 106 wherein the elongated web comprises a first beam forming a first upwardly-opening channel and a second beam mounted thereto forming second and third laterally-opening channels in cooperation with the first beam.

120. The workspace definition system of claim 119 wherein the first beam comprises a generally horizontal wall having diverging walls extending upwardly at an acute angle with respect to the generally horizontal wall.

121. The workspace definition system of claim 119 wherein the first beam has a depending inverted U-shaped flange adapted to receive an upper edge of the second beam.

122. The workspace definition system of claim 119 wherein an underside of the elongated web comprises an upwardly-extending slot adapted to receive hanging accessories.

123. A workspace definition system comprising:

a plurality of columns having a hollow interior, wherein each of the plurality of columns comprises at least two arcuate walls which are interlocked together at lateral edges thereof, each arcuate wall has a first lateral edge with a first flange forming a portion of a socket and a second lateral edge with a second flange forming another portion of the socket, the socket being located within the first and second flanges when the second flange on one of the at least two arcuate walls is in an interlocked position with the first flange on an adjacent one of the at least two arcuate walls, and a rod positioned within the socket to prevent the first and second flanges from becoming dislodged from the interlocked position;

a plurality of overhead beam assemblies having at least one internal channel, each overhead beam assembly mounted between a pair of the plurality of columns at a first height; and a plurality of intermediate beam assemblies having at least one internal channel, each intermediate beam assembly mounted between a pair of the plurality of columns at a second height.

124. The workspace definition system of claim 173 and further comprising a plurality of floor-engaging glides mounted within a bottom end of the sockets defined by the interlocked arcuate walls.

125. A workspace definition system comprising:

a plurality of columns, each comprising a plurality of panels interconnected at lateral edges thereof and defining an enclosure with a substantially uninterrupted hollow interior;

a plurality of intermediate beam assemblies having at least one internal channel, each intermediate beam assembly mounted between adjacent columns at a height, wherein each of the plurality of intermediate beam assemblies comprises:

a elongated web defining at least two channels, the web having a central wall separating the at least two channels from one another, wherein the web has at least one opening interconnecting the at least two channels and adapted to receive a power block assembly therein, wherein the elongated web comprises an I-shaped beam having slotted fastener retainers at outer edges thereof;

brackets mounted to the elongated web and to the adjacent columns; and covers removably mounted to the elongated web to enclose the at least two channels.

126. The workspace definition system of claim 125 wherein each bracket has a first lateral surface in contact with the column and a second lateral surface in contact with the intermediate beam assembly wherein the first lateral surface is shaped complementary to an outer surface of the column.

127. The workspace definition system of claim 126 wherein the elongated web and the covers are substantially flush with the second lateral surface of the bracket.

128. The workspace definition system of claim 125 wherein the brackets have a peripheral rim defining a central opening which interconnects the hollow interior of the column and the at least two channels.

129. The workspace definition system of claim 125 wherein the at least one opening comprises a plurality of longitudinally spaced openings.

130. The workspace definition system of claim 125 wherein the at least one opening receives an electrical/data block therein whereby electrical/data conduit can be routed through the at least two channels to the electrical/data block disposed in the at least one opening.

131. The workspace definition system of claim 130 and further comprising a first socket mounted to the electrical/data block and accessible in one of the at least two channels.

132. The workspace definition system of claim 131 wherein one of the covers has an opening in register with the first socket.

133. The workspace definition system of claim 132 and further comprising a second socket accessible in the other of the at least two channels whereby electrical/data components can be interconnected to the first and second sockets on either side of the elongated web.

134. The workspace definition system of claim 133 wherein another of the covers has an opening in register with the second socket.

135. The workspace definition system of claim 125 wherein the covers each comprises an elongated panel having a mounting clip at a lower edge thereof.

136. The workspace definition system of claim 135 wherein the elongated web has flanges at a lower portion thereof adapted to receive the mounting clip on the covers.

137. The workspace definition system of claim 125 wherein:
the elongated web further comprises a plurality of spaced slotted fastener retainers integrally formed therewith and adapted to retain fasteners; and
the brackets further comprise several spaced mounting apertures in register with the slotted fastener retainers.

138. A workspace definition system comprising:
a plurality of columns, each comprising a plurality of panels interconnected at lateral edges thereof and defining an enclosure with a substantially uninterrupted hollow interior and the plurality of panels have ports at a height;
a plurality of beam assemblies having at least one internal channel;
each beam assembly mounted between some of the ports of the plurality of columns at the height; and
other of the ports have a port cover removably mounted thereto, wherein the port cover has at least one vertical groove in an exterior surface thereof in vertical alignment with at least one interconnection between adjacent panels for an aesthetically-pleasing outer appearance thereof when the port cover is mounted to the column.

139. The workspace definition system of claim 138 wherein the port cover comprises an outer surface substantially conforming in curvature to the outer surface of the column.

140. The workspace definition system of claim 139 wherein:
the column has several mounting apertures adjacent to the port; and
the port cover comprises a rear surface provided with several spaced spring arms in register with the mounting apertures;
wherein the spring arms on the port cover are urged within the mounting apertures on the column to removably retain the port cover over the port.

141. The workspace definition system of claim 140 wherein:
at least two spring arms are in register with each mounting aperture;
the at least two spring arms are resiliently spaced from each other for flexing upon insertion and removal of the port cover with respect to the port.

142. A workspace definition system comprising:
a plurality of columns, each comprising at least two arcuate walls interconnected at lateral edges thereof and defining an enclosure with a substantially uninterrupted hollow interior;
a plurality of overhead beam assemblies having at least one internal channel, each overhead beam assembly mounted between a pair of the plurality of columns at a first height; and
a plurality of intermediate beam assemblies having at least one internal channel, each intermediate beam assembly mounted between a pair of the plurality of columns at a second height;
each arcuate wall has a first lateral edge with a first flange forming a portion of a socket and a second lateral edge with a second flange forming another portion of the socket, the socket being located within the first and second flanges when the second flange on one of the at least two arcuate walls is in an interlocked position with the first flange on an adjacent one of the at least two arcuate walls; and
a rod positioned within the socket to prevent the first and second flanges from becoming dislodged from the interlocked position.

143. The workspace definition system of claim 142 and further comprising a plurality of floor-engaging glides mounted within a bottom end of the sockets defined by the interlocked arcuate walls.

144. The workspace definition system of claim 142 wherein the at least two arcuate walls comprises four arcuate walls interlocked together in a circular configuration.

145. A workspace definition system comprising:
a plurality of columns having a hollow interior, each column having a first port at an upper portion thereof at an overhead height communicating with the hollow interior, the overhead height being above a height sufficient for anyone using the system to walk upright beneath, wherein each of the columns comprises at least two arcuate walls which are interlocked together at lateral edges thereof, each arcuate wall has a first lateral edge with a first flange forming a portion of a socket and a second lateral edge with a second flange forming another portion of the socket, the socket being located within the first and second flanges when the second flange on one of the at least two arcuate walls is in an interlocked position with the first flange on an adjacent one of the at least two arcuate walls; and a rod positioned within the socket to prevent the first and second flanges from becoming dislodged from the interlocked position;
a plurality of overhead beam assemblies having at least one internal channel, each overhead beam assembly mounted between the columns at at least some of the first ports thereof, wherein the at least one internal channel of each of the plurality of overhead beam assemblies communicates with the hollow interior of the plurality of columns via the ports for uninterrupted passage of electrical/data conduit therethrough from the overhead height above any users of the system into the columns.

146. The workspace definition system of claim 145 and further comprising a plurality of floor-engaging glides mounted within a bottom end of the sockets defined by the interlocked arcuate walls.

147. The workspace definition system of claim 146 wherein the each of the columns comprises four arcuate walls.

148. A workspace definition system comprising:
a plurality of columns having a hollow interior, each column having a first port at an upper portion thereof at an overhead height communicating with the hollow interior, the overhead height being above a height sufficient for anyone using the system to walk upright beneath, wherein at least one of the plurality of columns comprises at least one arcuate wall, and at least one bracket mountable to an existing wall in a workspace and mounted to the at least one arcuate wall, wherein the bracket comprises at least one flat wall mountable to the existing wall in the workspace, the at least one arcuate wall and the at least one flat wall are interlocked together at lateral edges thereof, whereby the assembly of the at least one arcuate wall and the bracket creates an interface with the existing wall;
a plurality of overhead beam assemblies having at least one internal channel, each overhead beam assembly mounted between the columns at at least some of the first ports thereof,
wherein the at least one internal channel of each of the plurality of overhead beam assemblies communicates with the hollow interior of the plurality of columns via the ports for uninterrupted passage of electrical/data conduit therethrough from the overhead height above any users of the system into the columns.

149. The workspace definition system of claim 148 wherein the at least one arcuate wall and the at least one flat wall has a first lateral edge with a first flange forming a portion of a socket and a second lateral edge with a second flange forming another portion of the socket, the socket being located within the first and second flanges when the second flange on one of the at least one arcuate wall and the at least one flat wall is in an interlocked position with the first flange on an adjacent one of the at least one arcuate wall and the at least one flat wall, and a rod positioned within the socket to prevent the first and second flanges from being dislodged from the interlocked position.

150. A workspace definition system comprising:
a plurality of columns having a hollow interior, each column having a first port at an upper portion thereof at an overhead height communicating with the hollow interior, the overhead height being above a height sufficient for anyone using the system to walk upright beneath;
a plurality of overhead beam assemblies having at least one internal channel, each overhead beam assembly mounted between the columns at at least some of the first ports thereof, wherein each of the plurality of overhead beam assemblies includes an elongated web comprising a first beam forming a first upwardly-opening channel and a second beam mounted thereto forming second and third laterally-opening channels in cooperation with the first beam defining at least two channels, brackets mounted to the elongated web and to the columns, and covers removably mounted to the elongated web to enclose the channels;
wherein the at least one internal channel of each of the plurality of overhead beam assemblies communicates with the hollow interior of the plurality of columns via the ports for uninterrupted passage of electrical/data conduit therethrough from the overhead height above any users of the system into the columns.

151. The workspace definition system of claim 150 wherein the first beam comprises a generally horizontal wall having diverging walls extending upwardly at an acute angle with respect to the generally horizontal wall.

152. The workspace definition system of claim 151 wherein the first beam has a depending inverted U-shaped flange adapted to receive an upper edge of the second beam.

153. A workspace definition system comprising:
a plurality of columns having a hollow interior, each column having a first port at an upper portion thereof at an overhead height communicating with the hollow interior, the overhead height being above a height sufficient for anyone using the system to walk upright beneath;
a plurality of overhead beam assemblies comprising an elongated web defining at least one internal channel, each overhead beam assembly mounted between the columns at at least some of the first ports thereof, the at least one internal channel being divided into an upwardlyopening portion and a pair of opposed laterally-opening portions located beneath the upwardlyopening portion;
a plurality of intermediate beam assemblies having an elongated web defining at least two opposed laterally-opening channels, brackets mounted to the elongated web and to the plurality of columns, and covers removably mounted to the elongated web to enclose the at least two channels;
wherein the at least one internal channel of each of the plurality of overhead beam assemblies communicates with the hollow interior of the plurality of columns via the ports for uninterrupted passage of electrical/data conduit therethrough from the overhead height above any users of the system into the columns.

154. The workspace definition system of claim 153 wherein the brackets have a peripheral rim defining a central opening which interconnects the hollow interior of the column and the at least two channels.

155. The workspace definition system of claim 154 wherein each bracket has a first lateral surface in contact with the column and a second lateral surface in contact with the intermediate beam assembly wherein the first lateral surface is shaped complementary to an outer surface of the column.

156. The workspace definition system of claim 155 wherein the elongated web and the covers are substantially flush with the second lateral surface of the bracket.

157. The workspace definition system of claim 153 wherein the elongated web has at least one opening interconnecting the at least two channels to allow for the uninterrupted passage of electrical/data conduit therethrough.

158. The workspace definition system of claim 157 wherein the at least one opening comprises a plurality of longitudinally spaced openings.

159. The workspace definition system of claim 157 wherein the at least one opening receives an electrical/data block therein whereby electrical/data conduit can be routed through the at least two channels to the electrical/data block disposed in the at least one opening.

160. The workspace definition system of claim 159 and further comprising a first socket mounted to the electrical/data block and accessible in one of the at least two channels.

161. The workspace definition system of claim 160 wherein one of the covers has an opening in register with the first socket.

162. The workspace definition system of claim 161 and further comprising a second socket accessible in the other of the at least two channels whereby electrical/data components can be interconnected to the first and second sockets on either side of the elongated web.

163. The workspace definition system of claim 162 wherein another of the covers has an opening in register with the second socket.

164. The workspace definition system of claim 153 wherein the covers each comprises an elongated panel having a mounting clip at a lower edge thereof.

165. The workspace definition system of claim 164 wherein the elongated web has flanges at a lower portion thereof adapted to receive the mounting clip on the covers.

166. The workspace definition system of claim 153 wherein:
the elongated web further comprises a plurality of spaced slotted fastener retainers integrally formed therewith and adapted to retain fasteners; and
the brackets further comprise several spaced mounting apertures in register with the slotted fastener retainers.

167. The workspace definition system of claim 153 wherein the elongated web comprises an I-shaped beam having slotted fastener retainers at outer edges thereof.

168. A workspace definition system comprising:
a plurality of columns having a hollow interior, each of the plurality of columns comprises at least two arcuate walls which are interlocked together at lateral edges thereof, each arcuate wall has a first lateral edge with a first flange forming a portion of a socket and a second lateral edge with a second flange forming another portion of the socket, the socket being located within the first and second flanges when the second flange on one of the at least two arcuate walls is in an interlocked position with the first flange on an adjacent one of the at least two arcuate walls, and a rod positioned within the socket to prevent the first and second flanges from becoming dislodged from the interlocked position;
a plurality of overhead beam assemblies having at least one internal channel, each overhead beam assembly mounted between adjacent columns at a first height;
a plurality of intermediate beam assemblies having at least one internal channel, each intermediate beam assembly mounted between adjacent columns at a second height;
wherein the internal channel of each of the overhead and intermediate beam assemblies communicate with the hollow interior of the adjacent columns for uninterrupted passage of electrical/data conduit therethrough.

169. The workspace definition system of claim 168 wherein the at least two arcuate walls comprises four arcuate walls interlocked together to form a circular configuration.

170. The workspace definition system of claim 168 wherein at least one of the plurality of columns comprises a half-column assembly comprising at least one arcuate wall, and at least one bracket mountable to an existing wall in a workspace and mounted to the at least one arcuate wall, whereby the assembly of the at least one arcuate wall and the bracket creates an interface with the existing wall.

171. A workspace definition system comprising a plurality of columns having a hollow interior, wherein at least one of the plurality of columns comprises at least two arcuate walls; and at least one bracket mountable to an existing wall in a workspace, wherein the at least two arcuate walls is interlocked to the bracket at lateral edges thereof whereby the assembly of the at least one arcuate wall and the bracket creates an interface with the existing wall, each of the at least two arcuate wall has a first lateral edge with a first flange forming a portion of a socket and a second lateral edge with a second flange forming another portion of the socket, the socket being located within the first and second flanges when the second flange on one of the at least two arcuate walls is in an interlocked position with the first flange on an adjacent wall of the at least two arcuate walls, and a rod positioned within the socket to prevent the first and second flanges from becoming dislodged from the interlocked position.

172. The workspace definition system of claim 171 wherein the bracket comprises at least one flat wall mountable to the existing wall in the workspace.

* * * * *